US012479799B2

(12) United States Patent
Madder et al.

(10) Patent No.: US 12,479,799 B2
(45) Date of Patent: Nov. 25, 2025

(54) BIOCONJUGATION REAGENT AND METHODS

(71) Applicant: Universiteit Gent, Ghent (BE)

(72) Inventors: Annemieke Madder, Massemen (BE); Ewout De Geyter, Laarne (BE); Eirini Antonatou, Ghent (BE); Sabina Smolen, Pawonkow (PL); Dimitris Kalaitzakis, Iraklion (GR); Georgios Vassilikogiannakis, Iraklion (GR)

(73) Assignee: Universiteit Gent, Ghent (BE)

( * ) Notice: Subject to any disclaimer, the term of this patent is extended or adjusted under 35 U.S.C. 154(b) by 919 days.

(21) Appl. No.: 17/434,882

(22) PCT Filed: Feb. 28, 2020

(86) PCT No.: PCT/EP2020/055287
§ 371 (c)(1),
(2) Date: Aug. 30, 2021

(87) PCT Pub. No.: WO2020/174086
PCT Pub. Date: Sep. 3, 2020

(65) Prior Publication Data
US 2022/0169604 A1    Jun. 2, 2022

(30) Foreign Application Priority Data
Feb. 28, 2019   (EP) .................................. 19160048

(51) Int. Cl.
| | |
|---|---|
| *C07D 207/38* | (2006.01) |
| *A61K 47/60* | (2017.01) |
| *C07D 207/44* | (2006.01) |
| *C07D 207/48* | (2006.01) |

(52) U.S. Cl.
CPC ............ *C07D 207/38* (2013.01); *A61K 47/60* (2017.08); *C07D 207/44* (2013.01); *C07D 207/48* (2013.01)

(58) Field of Classification Search
CPC ..... C07D 207/38; C07D 207/44; A61K 47/60
See application file for complete search history.

(56) References Cited

U.S. PATENT DOCUMENTS

2006/0009590 A1    1/2006    Kozlowski et al.

FOREIGN PATENT DOCUMENTS

| JP | 06199782 A | 7/1994 |
| WO | 2018114596 A1 | 6/2018 |

OTHER PUBLICATIONS

John Baker et al, "Characterization of the urinary metabolites of primaquine in rats", Jan. 1, 1986 (Jan. 1, 1986), pp. 132-141.
John F. Bower et al, "Reactivity of cyclic sulfamidates towards sulfur-stabilised enolates Stereocontrolled synthesis of functionalised lactams", Organic & Biomolecular Chemistry, vol. 4, No. 10, Jan. 1, 2006 (Jan. 1, 2006), p. 1868-1877.
Reddy R et al, "Bisphosphonated Benzoxazinorifamycin Prodrugs for the Prevention and Treatment of Osteomyelitis", Dec. 1, 2008 (Dec. 1, 2008), vol. 3, No. 12, p. 1863-1868.
Shi Yan-Ni et al, "Bioactive compounds from the insect *Aspongopus chinensis*", Bioorganic & Medicinal Chemistry Letters, Pergamon, Amsterdam, NL, vol. 24, No. 22, Oct. 6, 2014 (Oct. 6, 2014), p. 5164-5169.
Dimitris Kalaitzakis et al, "Methylene Blue as a Photosensitizer and Redox Agent: Synthesis of 5-Hydroxy-1 H -pyrrol-2(5 H )-ones from Furans", Angewandte Chemie, International Edition, vol. 54, No. 21, May 18, 2015 (May 18, 2015), pp. 6283-6287.
Georgios I. Ioannou et al, "Singlet-Oxygen-Initiated Tandem Transformation of 2-Hexylfuran to the Natural Alkaloids Glochidine and Glochidicine", European Journal of Organic Chemistry, vol. 2016, No. 20, Jul. 1, 2016 (Jul. 1, 2016), p. 3304-3306.
Manojkumar G. Kalshetti et al, "Total Synthesis of ( )/(+)- Subincanadine E and Determination of Absolute Configuration", Journal of Organic Chemistry, vol. 82, No. 20, Oct. 20, 2017 (Oct. 20, 2017), pp. 11126-11133.
International Search Report and Written Opinion dated Aug. 28, 2020 in related International Application No. PCT/EP2020/055287.
Invitation to Pay Additional Fees and Partial International Search Report dated May 26, 2020 in related International Application No. PCT/EP2020/055287.
Yingqian Zhang et al, "Cysteine-specific protein multi-functionalization and disulfide bridging using 3-bromo-5-methylene pyrrolones", Nature Communications, vol. 11, No. 1, Feb. 1, 2020 (Feb. 1, 2020).
Extended European Search Report dated Sep. 13, 2019 in related European Application 19160048.5.
Bonete P et al, "Lithiated 3-Tosylpropanal and 4-Tosyl-2-butanone Dimethyl Acetals as @b-Acylvinyl Anion Equivalents for the Synthesis of Unsaturated 1,4-Dicarbonyl Compounds and @a,@b-Butenolides", Tetrahedron, Elsevier Science Publishers, Amsterdam, NL, vol. 51, No. 9, Feb. 27, 1995 (Feb. 27, 1995), pp. 2763-2776.
Kenichi Yakushijin et al, "Ring transformation of 2-furylcarbamates to 5-hydroxy-3-pyrrolin-2-ones.", Chemical and Pharmaceutical Bulletin, vol. 34, No. 5, Jan. 1, 1986 (Jan. 1, 1986), pp. 2049-2055.
Kenichi Yakushijin et al, "Ring transformation of 2-furylcarbamates to 5-hydroxy-3-pyrrolin-2-ones. Effects of substitution in the benzene ring on the N-carbobenzyloxy-5-hydroxy-5-phenyl-3-pyrroline-2-one-cis-.GAMMA.-Ketoamide equilibrium.", Chemical and Pharmaceutical Bulletin, vol. 29, No. 9, Jan. 1, 1981 (Jan. 1, 1981), p. 2420-2430.

(Continued)

*Primary Examiner* — Kamal A Saeed
(74) *Attorney, Agent, or Firm* — DINSMORE & SHOHL LLP

(57) ABSTRACT

The present invention in general relates to the field of bioconjugation. More in particular, the invention relates to novel bioconjugation reactants based on an α,β unsaturated γ-hydroxylactam structure, amongst others allowing a higher degree of functionalization compared to classical bioconjugation reactants such as maleimide. The present invention also provides methods of preparing the novel bioconjugation reactants, as well as uses thereof in human and/or veterinary medicine; and conjugation processes.

12 Claims, 7 Drawing Sheets

(56) References Cited

OTHER PUBLICATIONS

Yamamoto, Shigeo et al, "Immunoassay with anti-pyrrolidone polycarboxylates antibody for detection of Vibrio parahaemolyticus", CA1995, retrieved from STNDatabase accession No. 1995:216736 Retrieved from the Internet: URL:Chemical Abstracts Service, Columbus, Ohio, US XP002793909.

BIOCONJUGATION REAGENT AND METHODS

CROSS REFERENCES TO RELATED APPLICATIONS

This application is a national-stage application under 35 U.S.C. § 371 of International Application No. PCT/EP2020/055287, filed Feb. 28, 2020, which International Application claims benefit of priority to European Application No. 19160048.5, filed Feb. 28, 2019.

FIELD OF THE INVENTION

The present invention in general relates to the field of bioconjugation. More in particular, the invention relates to novel bioconjugation reactants based on an α,β unsaturated γ-hydroxylactam structure, amongst others allowing a higher degree of functionalization compared to classical bioconjugation reactants such as maleimide. The present invention also provides methods of preparing the novel bioconjugation reactants, as well as uses thereof in human and/or veterinary medicine; and conjugation processes.

BACKGROUND TO THE INVENTION

The usefulness of bioconjugates for pharmaceutical applications has already been proven in multiple areas of research. This intensive research activity, being one of the most extensively developing current fields, clearly demonstrates the desire of the medical world to implement these bioconjugates into advanced healthcare applications in a diagnostic or therapeutic context.

The main conceptual approach of bioconjugation is to link a biomolecule with another molecule to enhance its physical properties like stability, solubility, specific targeting and/or visualisation. This can be especially useful for therapeutic agents (be it small molecules or macromolecules) since stability, solubility and targeting properties can all be adjusted to increase the effectiveness of medical treatments or the robustness of a diagnostic assay.

Bioconjugates are mainly synthesized using linking molecules. A frequently used linking molecule is maleimide. It can undergo Michael addition in presence of a thiol to its double bond to form a succinimidyl thioether. This method, however, has several disadvantages as illustrated in FIG. 1; in particular side reactions often occur, such as hydrolysis, retro-Michael reaction, thiol exchange.

Due to these side reactions, an alternative for maleimide-based bioconjugation might be very useful towards further advanced medical treatments. In that respect, the current application describes the development of new conjugation reagents, based on an α,β unsaturated γ-hydroxylactam structure, as potential alternatives to maleimide, which can be used for multi-functional bioconjugations. Conjugation with proteins takes place via Michael addition of a cysteine thiol group present in the protein, as further discussed in the experimental part. An alternative bioconjugation strategy has recently been published (Zhang et al., 2020—Nature communications 11:1015), underscoring the relevance of this kind of technologies in the field. However, the bioconjugation strategy disclosed in Zhang et al., 2020 is less versatile compared to the strategy disclosed herein. Next to a more versatile and straightforward synthesis route towards the bioconjugation reagents, the here disclosed strategy allows for the introduction of two property enhancing moieties in one step onto a biomolecule of choice. While Zhang et al. claim multifunctionalisation of cysteine residues is possible, two separate and subsequent conjugation steps are required to achieve this and each of those steps requires a thiol functionality.

These novel conjugation reagents do not only allow to circumvent the issues of side-reactions typically observed with maleimide-based conjugates, but also allow a higher degree of functionalization to be achieved in one conjugation reaction.

SUMMARY OF THE INVENTION

In a first aspect, the present invention provides a compound of formula (I) thereof;

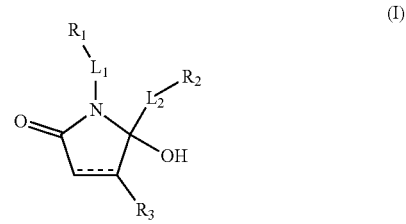

(I)

wherein:
$L_1$ is either absent or a linker moiety; wherein said linker moiety is optionally further substituted with —S—$R_5$;
$L_2$ is either absent or a linker moiety; wherein said linker moiety is optionally further substituted with —S—$R_6$;
$R_3$ is selected from the list comprising: —H and —S—$R_4$;
$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and —S—$R_4$, —S—$R_5$, and —S—$R_6$, each independently represent any thiol containing moiety;
wherein when $R_3$ is —H then either -$L_1$-$R_1$ is not -benzyl or -$L_2$-$R_2$ is not —$CH_2$—$CH_2$—$CO_2$Et.

In another aspect, the present invention provides a compound of formula (I);

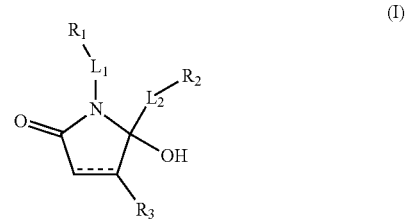

(I)

wherein:
$L_1$ is either absent or a linker moiety; wherein said linker moiety is optionally further substituted with —S—$R_5$;
$L_2$ is either absent or a linker moiety; wherein said linker moiety is optionally further substituted with —S—$R_6$;
$R_3$ is selected from the list comprising: —H and —S—$R_4$;
$R_1$ and $R_2$ represent any carbon-containing moiety;
wherein at least one of the following applies:

R₁ is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, dyes, fluorizers, steroids and saturated alkyl chains;

R₂ is selected from the list comprising: small molecules; biomolecules; macromolecules; and functional groups selected from the list comprising: carboxylic acids, maleimides, alkynes, azides, tetrazines, dienes, small heterocycles, alkoxyamines, (poly)aromatics, dyes, fluorizers, steroids and saturated alkyl chains; and —S—R₄, —S—R₅, and —S—R₆, each independently represent any thiol containing moiety.

In yet a further embodiment, the present invention provides a compound as represented by formula (Ib);

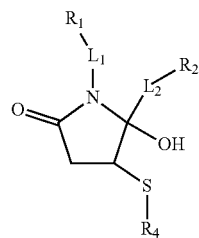

(Ib)

wherein:
L₁ is either absent or a linker moiety; wherein said linker moiety is optionally further substituted with —S—R₅;
L₂ is either absent or a linker moiety; wherein said linker moiety is optionally further substituted with —S—R₆;
R₁ and R₂ represent any carbon-containing moiety; wherein at least one of said R₁ and R₂ moieties is selected from the list comprising: small molecules; biomolecules; macromolecules; and functional groups; and
—S—R₄, —S—R₅, and —S—R₆, each independently represent any thiol containing moiety.

In a particular embodiment of the present invention, R₄ is selected from the list comprising small molecules, biomolecules, functional groups and macromolecules.

In yet a further embodiment, the present invention provides a compound as represented by formula (Ia);

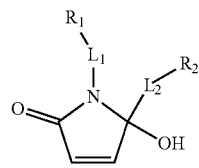

(Ia)

wherein:
L₁ is either absent or a linker moiety; wherein said linker moiety is optionally further substituted with —S—R₅;
L₂ is either absent or a linker moiety; wherein said linker moiety is optionally further substituted with —S—R₆;
R₁ and R₂ represent any carbon-containing moiety; wherein at least one of said R₁ and R₂ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and —S—R₄, —S—R₅, and —S—R₆, each independently represent any thiol containing moiety;

wherein when R₃ is —H then either -L₁-R₁ is not -benzyl or -L₂-R₂ is not —CH₂—CH₂—CO₂Et.

In another particular embodiment of the present invention, R₅ and R₆ are each independently selected from the list comprising small molecules, biomolecules, functional groups and macromolecules.

In yet a further embodiment of the present invention, L₁ and L₂ are each independently selected from the list comprising: alkyl chains, small peptide sequences, polyethylene (glycol) and polyamines.

In a further embodiment of the current invention, said biomolecules are each independently selected from the list comprising: peptides, oligonucleotides, proteins, dyes, drugs, small molecules, metal complexes, fatty acids, nucleic acids, carbohydrates, biotins, PEG, synthetic polymers and natural polymers.

In a further embodiment of the current invention, said macromolecules are each independently selected from the list comprising: oligonucleotides, proteins, dyes, drugs, metal complexes, fatty acids, nucleic acids, carbohydrates, synthetic polymers and natural polymers.

The present invention further provides a pharmaceutical composition comprising one or more compounds as defined herein and one or more pharmaceutically acceptable excipients, carriers or diluents. Said pharmaceutical composition may be suitable for use in the diagnosis and/or treatment of disorders.

In addition, the present invention provides the compounds and (pharmaceutical) compositions as defined herein in human and/or veterinary medicine.

The present invention also provides a kit comprising a compound or a pharmaceutical composition as defined herein.

The compounds of the present invention are in particular suitable in a (bio) conjugation process, therefore, the present invention further provides the use of a compound or composition as defined herein in a conjugation process of one or more small molecules, biomolecules, functional groups and macromolecules; more in particular in a (bio) conjugation process for linking two or more small molecules, biomolecules, functional groups and macromolecules; or in a (bio) conjugation process for attaching one or more small molecules, biomolecules, functional groups and macromolecules to a substrate or surface.

The present invention also provides the use of a compound of formula (I);

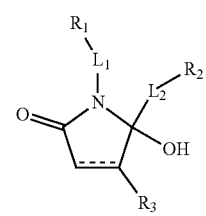

(I)

wherein:

$L_1$ is either absent or a linker moiety; wherein said linker moiety is optionally further substituted with —S—$R_5$;

$L_2$ is either absent or a linker moiety; wherein said linker moiety is optionally further substituted with —S—$R_6$;

$R_3$ is selected from the list comprising: —H and —S—$R_4$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and —S—$R_4$, —S—$R_5$, and —S—$R_6$, each independently represents any thiol containing moiety;

in a conjugation process of one or more small molecules, biomolecules, functional groups and macromolecules; more in particular in a conjugation process for linking two or more small molecules, biomolecules, functional groups and macromolecules; or in a conjugation process for attaching one or more small molecules, biomolecules, functional groups and macromolecules to a substrate or surface.

In a further aspect, the present invention provides a method for the preparation of a compound of formula (II);

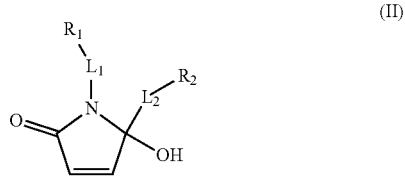

(II)

said method comprising the steps of:
providing a compound of formula (IIa) and

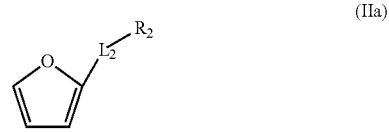

(IIa)

reacting said compound of formula (IIa) with a compound of formula $R_1$-$L_1$-$NH_2$ under atmospheric conditions in the presence of a photosensitizer, thereby obtaining the compound of formula (II);

wherein:

$L_1$ is either absent or a linker moiety;

$L_2$ is either absent or a linker moiety;

$R_1$ and $R_2$ represent any carbon-containing moiety; wherein at least one of said $R_1$ and $R_2$ is selected from the list comprising: small molecules, biomolecules, functional groups and macromolecules;

In yet a further aspect, the present invention provides a method for the preparation of a compound of formula (III);

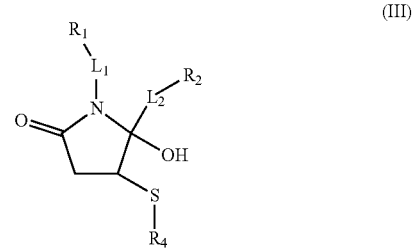

(III)

said method comprising the steps of:
providing a compound of formula (IIa);
reacting said compound of formula (IIa) with HS—$R_4$ in an organic or aqueous solvent in the presence of catalytic amount EDTA$Na_4$ or aqueous solution without catalyst thereby obtaining a compound of formula (III);

wherein:

$L_1$ is either absent or a linker moiety;

$L_2$ is either absent or a linker moiety;

$R_1$ and $R_2$ represent any carbon-containing moiety; wherein at least one of said $R_1$ and $R_2$ is selected from the list comprising: small molecules, biomolecules, functional groups and macromolecules; and —S—$R_4$ represents any thiol containing moiety.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and ready description of the principles and conceptual aspects of the invention. In this regard no attempt is made to show structural details of the invention in more detail than is necessary for a fundamental understanding of the invention. The description taken with the drawings make apparent to those skilled in the art how the several forms of the invention may be embodied in practice.

DETAILED DESCRIPTION OF THE INVENTION

Figure 1:
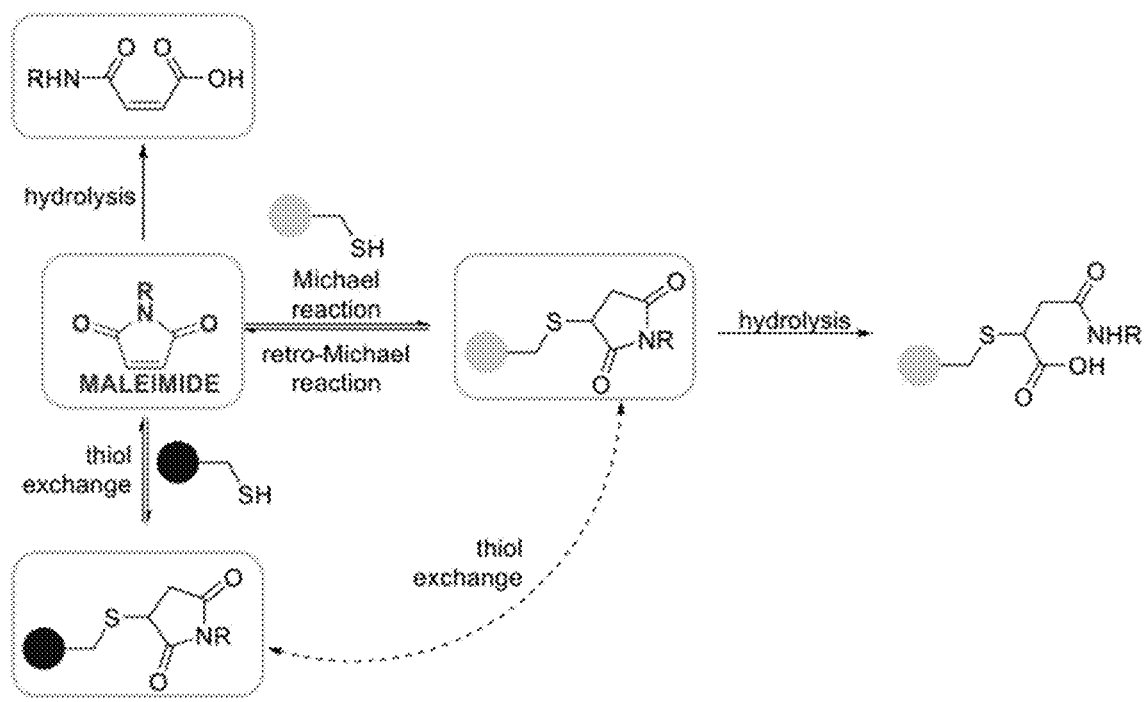
FIG. 1: Disadvantages of maleimide-based bioconjugation processes

As already detailed herein above, the present invention relates to novel crosslinking/bioconjugation reagents based on an α,β unsaturated γ-hydroxylactam structure, as alternatives to maleimides, wherein said novel crosslinking reagents do not only allow avoiding the issues of side-reactions as observed with maleimides, but also allow a higher degree of functionalization. Specific advantages of the bioconjugation reagents of the present invention are the following:

- fast and mild preparation from a variety of furans and amines
- significantly improved stability compared to maleimides even after 24 h
- reactive conjugations
- compatible with water and oxygen
- suitable for use in an organic as well as a biological context.

Hence, the present invention provides a compound of formula (I)

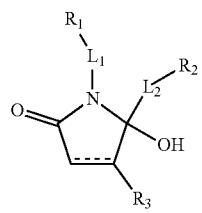

(I)

wherein:
- $L_1$ is either absent or a linker moiety; wherein said linker moiety is optionally further substituted with $—S—R_5$;
- $L_2$ is either absent or a linker moiety; wherein said linker moiety is optionally further substituted with $—S—R_6$;
- $R_3$ is selected from the list comprising: $—H$ and $—S—R_4$;
- $R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and
- $—S—R_4$, $—S—R_5$, and $—S—R_6$, each independently represents any thiol containing moiety;
- wherein when $R_3$ is $—H$ then either $-L_1-R_1$ is not -benzyl or $-L_2-R_2$ is not $—CH_2—CH_2—CO_2Et$.

In an alternative embodiment, the present invention provides a compound of formula (I)

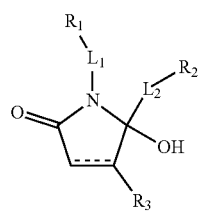

(I)

wherein:
- $L_1$ is either absent or a linker moiety; wherein said linker moiety is optionally further substituted with $—S—R_5$;
- $L_2$ is either absent or a linker moiety; wherein said linker moiety is optionally further substituted with $—S—R_6$;
- $R_3$ is selected from the list comprising: $—H$ and $—S—R_4$;
- $R_1$ and $R_2$ represent any carbon-containing moiety;
- wherein at least one of the following applies:
  - $R_1$ is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, dyes, fluorizers, steroids and saturated alkyl chains;
  - $R_2$ is selected from the list comprising: small molecules; biomolecules; macromolecules; and functional groups selected from the list comprising: carboxylic acids, maleimides, alkynes, azides, tetrazines, dienes, small heterocycles, alkoxyamines, (poly)aromatics, dyes, fluorizers, steroids and saturated alkyl chains; and
- $—S—R_4$, $—S—R_5$, and $—S—R_6$, each independently represents any thiol containing moiety.

In a specific embodiment, the present invention provides a compound of formula (Ia)

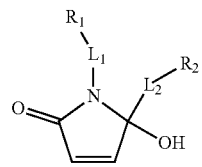

(Ia)

- $L_1$ is a linker moiety selected from the list comprising: alkyl chains, small peptide sequences, polyethylene (glycol) and polyamines; wherein said linker moiety is optionally further substituted with $—S—R_5$;
- $L_2$ is either absent or a linker moiety; wherein said linker moiety is optionally further substituted with $—S—R_6$;
- $R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and
- $R_5$ and $R_6$ are each independently selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains.
- either $-L_1-R_1$ is not -benzyl or $-L_2-R_2$ is not $—CH_2—CH_2—CO_2Et$.

In the context of the present invention, the term "linker moiety" is meant to be any moiety capable of linking, connecting, attaching and/or associating the moieties at both ends of the linker to one another. In a specific embodiment of the present invention, said linker moiety may each independently be selected from the list comprising: alkyl chains, small peptide sequences, polyethylene(glycol) and polyamines. Hence, in a specific embodiment of the present invention, $L_1$ and $L_2$ are each independently selected from the list comprising: alkyl chains, small peptide sequences, polyethylene(glycol) and polyamines. In a preferred embodiment, $L_1$ is an alkyl linker moiety, such as selected from the list comprising: $C_{1\text{-}20}$alkyl, $C_{2\text{-}20}$alkylene. In another preferred embodiment, in particular for conjugated molecules, in the event that $L_2$ is an alkyl linker, it preferably comprises at least 2 C atoms, such as selected from $C_{2\text{-}20}$alkyl, $C_{2\text{-}20}$alkylene. Alternatively, the linker moiety may be selected from the list comprising alkyl chains, aryl moieties, heteroatoms, small peptide sequences, polyethylene(glycol) and polyamines. In a particular embodiment, $L_1$ does not comprise a —(C=O)— moiety.

In a further embodiment, the present invention provides a compound of formula (Ia) wherein:
  $L_1$ is a linker moiety selected from the list comprising: alkyl chains, small peptide sequences, polyethylene (glycol) and polyamines; wherein said linker moiety is optionally further substituted with —S—$R_5$;
  $L_2$ is either absent or a linker moiety selected from the list comprising: alkyl chains, small peptide sequences, polyethylene(glycol) and polyamines; wherein said linker moiety is optionally further substituted with —S—$R_6$;
  $R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and
  $R_5$ and $R_6$ are each independently selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; wherein either -$L_1$-$R_1$ is not -benzyl, or -$L_2$-$R_2$ is not —$CH_2$—$CH_2$—$CO_2$Et.

It is evident that the compounds of the present may be suitable for linking any 2 or more organic moieties to one another of which some specific examples include but are not limited to small molecules; biomolecules; macromolecules; and functional groups.

In the context of the present invention, the term "small molecule" is meant to be any molecule having a low molecular weight (typically less than 900 Da), such as is the case for most pharmaceutical drugs. In pharmacology, the term "small molecules" is typically used for molecules that bind specific biological macromolecules and act as an effector, altering the activity or function of the target.

In the context of the present invention, the term "macromolecule" is meant to be any molecule having a high molecular weight (typically more than 900 Da). Typical macromolecules encompass biopolymers such as nucleic acids, proteins, carbohydrates and lipids; as well as large non-polymeric molecules. It may also encompass synthetic macromolecules such as plastics and synthetic fibers. In a specific embodiment of the present invention, said macromolecules may be selected from the list comprising oligonucleotides, proteins, dyes, drugs, metal complexes, fatty acids, nucleic acids, carbohydrates (e.g. sugars), synthetic polymers and natural polymers.

In the context of the present invention, the term "biomolecule" or alternatively "biological molecule" is meant to be a molecule or substance which is produced by a cell or living organism or a synthetically produced equivalent or mimic thereof. Typical classes of biomolecules include carbohydrates, lipids, oligonucleotides/nucleic acids and peptides/proteins. In a more particular embodiment, said biomolecules may each be independently selected from the list comprising: peptides, oligonucleotides, proteins, dyes, drugs, small molecules, metal complexes, fatty acids, nucleic acids, carbohydrates, biotins, PEG, synthetic polymers and natural polymers.

In the context of the present invention, the term "functional moiety" or "functional group" is meant to be moieties/parts of a molecule which are responsible for the characteristic chemical reactions of those molecule, i.e. they are centers of chemical reactivity. In the context of the present invention, the functional groups may in particular be selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains.

In a specific embodiment of the present invention, the functional group may be selected from the list comprising: carboxylic acids, maleimides, alkynes, azides, tetrazines, dienes, small heterocycles, alkoxyamines, dyes, fluorizers, steroids and saturated alkyl chains. In a specific embodiment, the functional group may be selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated or unsaturated alkyl chains.

In a very specific embodiment of the present invention, the functional groups of $R_1$ may be selected from the list comprising: carboxylic acids, esters, maleimides, alkynes, azides, tetrazines, dienes, small heterocycles, alkoxyamines, dyes, fluorizers, steroids and saturated alkyl chains;

In another very specific embodiment of the present invention, the functional groups of $R_2$ is selected from the list comprising: carboxylic acids, maleimides, alkynes, azides, tetrazines, dienes, small heterocycles, alkoxyamines, (poly)aromatics, dyes, fluorizers, steroids and saturated alkyl chains.

Alternatively, the functional groups of anyone of $R_1$ or $R_2$ may be independently selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated alkyl chains.

Alternatively, the functional groups of anyone of $R_4$, $R_5$ or $R_6$ may be independently selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated alkyl chains.

In a further embodiment of the present invention, and in the event that $R_3$ is —H then $R_1$ is preferably not-phenyl and $R_2$ is preferably not —$CO_2$Et. Moreover, in such event, $L_1$ also preferably does not comprise a —(C=O)—; more specifically, $L_1$ preferably does not comprise a —(C=O)— moiety coupled to the N atom in the disclosed compound structures.

The term "alkyl" by itself or as part of another substituent refers to a fully saturated hydrocarbon of Formula $C_xH_{2x+1}$ wherein x is a number greater than or equal to 1. Generally, alkyl groups of this invention comprise from 1 to 20 carbon atoms; more in particular at least 4 carbon atoms. Alkyl groups may be linear or branched and may be substituted as indicated herein. When a subscript is used herein following a carbon atom, the subscript refers to the number of carbon atoms that the named group may contain. Thus, for example, $C_{1-4}$alkyl means an alkyl of one to four carbon atoms. Examples of alkyl groups are methyl, ethyl, n-propyl, i-propyl, butyl, and its isomers (e.g. n-butyl, i-butyl and t-butyl); pentyl and its isomers, hexyl and its isomers, heptyl and its isomers, octyl and its isomers, nonyl and its isomers; decyl and its isomers. $C_1$-$C_6$ alkyl includes all linear, branched, or cyclic alkyl groups with between 1 and 6 carbon atoms, and thus includes methyl, ethyl, n-propyl, i-propyl, butyl and its isomers (e.g. n-butyl, i-butyl and t-butyl); pentyl and its isomers, hexyl and its isomers, cyclopentyl, 2-, 3-, or 4-methylcyclopentyl, cyclopentylmethylene, and cyclohexyl.

The term "alkynyl", or "alkyne" as used herein, unless otherwise indicated, means straight-chain or branched-chain hydrocarbon moieties containing at least one carbon-carbon triple bond. Examples of alkynyl moieties include ethynyl, E- and Z-propynyl, isopropynyl, E- and Z-butynyl, E- and Z-isobutynyl, E- and Z-pentynyl, E, Z-hexynyl, and the like.

The terms "heterocyclic" or "heterocycle" as used herein by itself or as part of another group refer to non-aromatic, fully saturated or partially unsaturated cyclic groups (for example, 3 to 13 member monocyclic, 7 to 17 member bicyclic, or 10 to 20 member tricyclic ring systems, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from nitrogen atoms, oxygen atoms and/or sulfur atoms, where the nitrogen and sulfur heteroatoms may optionally be oxidized and the nitrogen heteroatoms may optionally be quaternized. The heterocyclic group may be attached at any heteroatom or carbon atom of the ring or ring system, where valence allows. The rings of multi-ring heterocycles may be fused, bridged and/or joined through one or more spiro atoms. An optionally substituted heterocyclic refers to a heterocyclic having optionally one or more substituents (for example 1 to 4 substituents, or for example 1, 2, 3 or 4), selected from those defined above for substituted aryl.

Exemplary heterocyclic groups include piperidinyl, azetidinyl, imidazolinyl, imidazolidinyl, isoxazolinyl, oxazolidinyl, isoxazolidinyl, thiazolidinyl, isothiazolidinyl, piperidyl, succinimidyl, 3H-indolyl, isoindolinyl, chromenyl, isochromanyl, xanthenyl, 2H-pyrrolyl, 1-pyrrolinyl, 2-pyrrolinyl, 3-pyrrolinyl, pyrrolidinyl, 4H-quinolizinyl, 4aH-carbazolyl, 2-oxopiperazinyl, piperazinyl, homopiperazinyl, 2-pyrazolinyl, 3-pyrazolinyl, pyranyl, dihydro-2H-pyranyl, 4H-pyranyl, 3,4-dihydro-2H-pyranyl, phthalazinyl, oxetanyl, thietanyl, 3-dioxolanyl, 1,3-dioxanyl, 2,5-dioximidazolidinyl, 2,2,4-piperidonyl, 2-oxopiperidinyl, 2-oxopyrrolodinyl, 2-oxoazepinyl, indolinyl, tetrahydropyranyl, tetrahydrofuranyl, tetrehydrothienyl, tetrahydroquinolinyl, tetrahydroisoquinolinyl, thiomorpholinyl, thiomorpholinyl sulfoxide, thiomorpholinyl sulfone, 1,3-dioxolanyl, 1,4-oxathianyl, 1,4-dithianyl, 1,3,5-trioxanyl, 6H-1,2,5-thiadiazinyl, 2H-1,5,2-dithiazinyl, 2H-oxocinyl, 1H-pyrrolizinyl, tetrahydro-1,1-dioxothienyl, N-formylpiperazinyl, and morpholinyl.

The term "aryl" or "(poly)aromate" as used herein refers to a polyunsaturated, aromatic hydrocarbyl group having a single ring (i.e. phenyl) or multiple aromatic rings fused together (e.g. naphthalene or anthracene) or linked covalently, typically containing 6 to 10 atoms; wherein at least one ring is aromatic. The aromatic ring may optionally include one to three additional rings (either cycloalkyl, heterocyclyl, or heteroaryl) fused thereto. Aryl is also intended to include the partially hydrogenated derivatives of the carbocyclic systems enumerated herein. Non-limiting examples of aryl comprise phenyl, biphenylyl, biphenylenyl, 5- or 6-tetralinyl, 1-, 2-, 3—, 4-, 5-, 6-, 7-, or 8-azulenyl, 1- or 2-naphthyl, 1-, 2—, or 3-indenyl, 1-, 2—, or 9-anthryl, 1-, 2-, 3-, 4-, or 5-acenaphtylenyl, 3-, 4-, or 5-acenaphtenyl, 1-, 2-, 3—, 4-, or 10-phenanthryl, 1- or 2-pentalenyl, 1, 2-, 3-, or 4-fluorenyl, 4- or 5-indanyl, 5-, 6-, 7-, or 8-tetrahydronaphthyl, 1,2,3,4-tetrahydronaphthyl, 1,4-dihydronaphthyl, dibenzo[a,d]cylcoheptenyl, and 1-, 2-, 3—, 4-, or 5-pyrenyl.

The "(poly)aromates" may optionally contain heteroatoms, in which they may be conveniently termed "heteroaryl". The term "heteroaryl" as used herein by itself or as part of another group refers but is not limited to 5 to 12 carbon-atom aromatic rings or ring systems containing 1 to 3 rings which are fused together or linked covalently, typically containing 5 to 8 atoms; at least one of which is aromatic in which one or more carbon atoms in one or more of these rings can be replaced by oxygen, nitrogen or sulfur atoms where the nitrogen and sulfur heteroatoms may optionally be oxidized and the nitrogen heteroatoms may optionally be quaternized. Such rings may be fused to an aryl, cycloalkyl, heteroaryl or heterocyclyl ring. Non-limiting examples of such heteroaryl, include: pyrrolyl, furanyl, thiophenyl, pyrazolyl, imidazolyl, oxazolyl, isoxazolyl, thiazolyl, isothiazolyl, triazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo[2,1-b][1,3]thiazolyl, thieno[3,2-b]furanyl, thieno[3,2-b]thiophenyl, thieno[2,3-d][1,3]thiazolyl, thieno[2,3-d]imidazolyl, tetrazolo[1,5-a]pyridinyl, indolyl, indolizinyl, isoindolyl, benzofuranyl, benzopyranyl, 1 (4H)-benzopyranyl, 1 (2H)-benzopyranyl, 3,4-dihydro-1(2H)-benzopyranyl, 3,4-dihydro-1(2H)-benzopyranyl, isobenzofuranyl, benzothiophenyl, isobenzothiophenyl, indazolyl, benzimidazolyl, 1,3-benzoxazolyl, 1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, thienopyridinyl, purinyl, imidazo[1,2-a]pyridinyl, 6-oxo-pyridazin-1(6H)-yl, 2-oxopyridin-1(2H)-yl, 6-oxo-pyridazin-1(6H)-yl, 2-oxopyridin-1(2H)-yl, 1,3-benzodioxolyl, quinolinyl, isoquinolinyl, cinnolinyl, quinazolinyl, quinoxalinyl, 7-azaindolyl, 6-azaindolyl, 5-azaindolyl, 4-azaindolyl.

The term "alkoxy" or "alkyloxy" as used herein refers to a group consisting of an oxygen atom attached to one optionally substituted straight or branched alkyl group, cycloalkyl group, aryl, or cycloalkylalkyl group; in other words, it refers to a moiety having the Formula —OR$^b$ wherein R$^b$ is alkyl. Preferably, alkoxy is $C_1$-$C_{10}$ alkoxy, $C_1$-$C_6$ alkoxy, or $C_1$-$C_4$ alkoxy. Non-limiting examples of suitable alkoxy include methoxy, ethoxy, propoxy, isopropoxy, butoxy, isobutoxy, sec-butoxy, tert-butoxy, pentyloxy and hexyloxy. Where the oxygen atom in an alkoxy group is substituted with sulfur, the resultant moiety is referred to as thioalkoxy. "Haloalkoxy" is an alkoxy group wherein one or more hydrogen atoms in the alkyl group are substituted with halogen. Non-limiting examples of suitable haloalkoxy include fluoromethoxy, difluoromethoxy, trifluoromethoxy, 2,2,2-trifluoroethoxy, 1,1,2,2-tetrafluoroethoxy, 2-fluoroethoxy, 2-chloroethoxy, 2,2-difluoroethoxy, 2,2,2-trichloroethoxy; trichloromethoxy, 2-bromoethoxy, pentafluoroethyl, 3,3,3-trichloropropoxy, 4,4,4-trichlorobutoxy.

The term "alkoxyamine" by itself or as part of another substituent refers to an alkoxy group linked to an amine moiety i.e. to form —R'ONR$^e$, wherein R$^e$ is as defined above for alkyl.

The term "carboxy" or "carboxyl" or "hydroxycarbonyl" by itself or as part of another substituent refers to the group —CO$_2$H. Thus, a carboxyalkyl is an alkyl group as defined above having at least one substituent that is —CO$_2$H.

The term "ester" by itself or as part of another substituent refers to a chemical moiety derived from an acid in which at least one-OH group is replaced by an alkoxy group, i.e. to form —R—(C=O)—OR'.

The term "maleimide" by itself or as part of another substituent refers to a chemical moiety with the formula H$_2$C$_2$(CO)$_2$NH and as represented by the below structure. Maleimide and its derivatives are typically prepared from maleic anhydride by treatment with amines followed by dehydration.

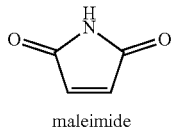

maleimide

When using a maleimide reagent, typically the H from the NH group will be replaced by an alkyl or aryl substituent.

The term "azide" by itself or as part of another substituent refers to a chemical moiety with the formula N$_3$. It is the conjugate base of hydrazoic acid (HN$_3$). The azide functional group can be represented by several resonance structures including N$^-$=N$^+$=N.

The term "tetrazine" by itself or as part of another substituent refers to a chemical moiety that comprises a six-membered aromatic ring containing four nitrogen atoms with the molecular formula C$_2$H$_2$N$_4$. In particular, 3 core-ring isomers exist: 1,2,3,4-tetrazines, 1,2,3,5-tetrazines and 1,2,4,5-tetrazines.

The term "diene" by itself or as part of another substituent refers to a hydrocarbon moiety that contains 2 carbon double bonds, such as for example in 1,3-butadiene: CH$_2$=CH—CH=CH$_2$. Compounds which contain more than 2 double bonds are called polyenes, and are equally suitable within the context of the invention.

As used herein, the term "dye" refers to a compound which allows visualization of the moiety to which the dye is attached. An exemplary dye in the context of the invention, may be a fluorizer, which allows visualization of the moiety to which it is attached, as a consequence of UV/VIS absorption with concomitant fluorescence or light emission.

As used herein, the term "fluorescent moiety" refers to a moiety which contains electrons that can absorb a photon and briefly enter an excited state before dispersing the energy non-radiatively or emitting it as a photon, but with a lower energy, i.e. at a longer wavelength.

As used herein, the term "steroid" refers to an organic compound composed of four rings The steroid core structure is composed of seventeen carbon atoms, bound in four "fused" rings: three six-membered cyclohexane rings (rings A, B and C) and one five-membered cyclopentane ring (the D ring). Steroids vary by the functional groups attached to this four-ring core and by the oxidation state of the rings. Sterols are forms of steroids with a hydroxyl group at position three and a skeleton derived from cholestane. Steroids can also be more drastically modified, such as by changes to the ring structure, for example, cutting one of the rings. Cutting Ring B produces secosteroides one of which is vitamin D3.

As used herein, the term "thiol" is an organosulfur compound that contains a carbon-bound sulfhydryl (—SH) group, i.e. R—SH or R—S—R. Thiols represent the sulfur analogues of alcohols (i.e. sulfur takes the place of oxygen in the hydroxyl group of an alcohol). After conjugation, the compounds contain a sulphur group, so instead of "thiol-containing moiety", also the term "sulphur-containing moiety" can suitably be used.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation to a useful degree of purity from a reaction mixture, and formulation into a therapeutic agent.

Where groups may be optionally substituted, such groups may be substituted once or more, and preferably once, twice or thrice. Substituents may be selected from, for example, the group comprising thiol, halogen, hydroxyl, oxo, nitro, amido, carboxy, amino, cyano haloalkoxy, and haloalkyl.

As used herein the terms such as "alkyl, aryl, or cycloalkyl, each being optionally substituted with" or "alkyl, aryl, or cycloalkyl, optionally substituted with" refers to optionally substituted alkyl, optionally substituted aryl and optionally substituted cycloalkyl.

In the context of the present invention, the term "compound" is meant to encompass a stereoisomer, tautomer, racemic, metabolite, pro- or predrug, salt, hydrate, N-oxide form or solvate of such compound; in as far as applicable.

As described herein, some of the compounds of the invention may contain one or more asymmetric carbon atoms that serve as a chiral center, which may lead to different optical forms (e.g. enantiomers or diastereoisomers). The invention comprises all such optical forms in all possible configurations, as well as mixtures thereof.

More generally, from the above, it will be clear to the skilled person that the compounds of the invention may exist in the form of different isomers and/or tautomers, including but not limited to geometrical isomers, conformational isomers, E/Z-isomers, stereochemical isomers (i.e. enantiomers and diastereoisomers) and isomers that correspond to the presence of the same substituents on different positions of the rings present in the compounds of the invention. All such possible isomers, tautomers and mixtures thereof are included within the scope of the invention.

Whenever used in the present invention the term "compounds of the invention" or a similar term is meant to include the compounds of general Formula I, II, III, IV as well as any subgroup thereof, such as Ia, Ib, Ic, Id and IIa. This term also refers to the compounds as defined in the examples part herein below, their derivatives, N-oxides, salts, solvates, hydrates, stereoisomeric forms, racemic mixtures, tautomeric forms, optical isomers, analogues, prodrugs, esters, and metabolites, as well as their quaternized nitrogen analogues. The N-oxide forms of said compounds are meant to comprise compounds wherein one or several nitrogen atoms are oxidized to the so-called N-oxide.

As used in the specification and the appended claims, the singular forms "a", "an", and "the" include plural referents unless the context clearly dictates otherwise. By way of example, "a compound" means one compound or more than one compound.

The terms described above and others used in the specification are well understood to those in the art.

In a further embodiment, the present invention provides a compound represented by formula (IV)

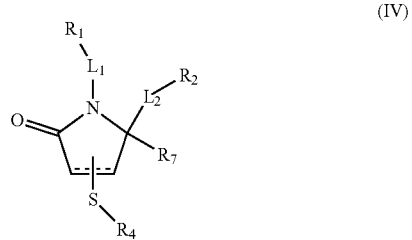

(IV)

wherein:
- $L_1$ is either absent or a linker moiety selected from the list comprising: alkyl chains, small peptide sequences, polyethylene(glycol) and polyamines; wherein said linker moiety is optionally further substituted with —S—$R_5$;
- $L_2$ is either absent or a linker moiety selected from the list comprising: alkyl chains, small peptide sequences, polyethylene(glycol) and polyamines; wherein said alkyl chain comprises at least 2 C atoms wherein said linker moiety is optionally further substituted with —S—$R_6$;
- $R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated and unsaturated alkyl chains;
- $R_4$, $R_5$ and $R_6$ are each independently selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids, saturated and unsaturated alkyl chains; and
- $R_7$ is selected from —H and —OH.

In a particular embodiment, the present invention provides a compound as represented by formula (Ib)

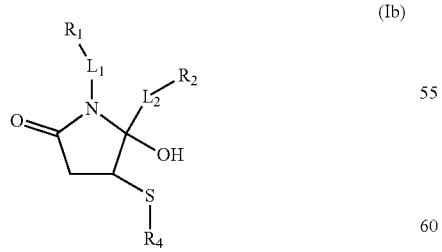

(Ib)

wherein:
- $L_1$ is either absent or a linker moiety; wherein said linker moiety is optionally further substituted with —S—$R_5$;
- $L_2$ is either absent or a linker moiety; wherein said linker moiety is optionally further substituted with —S—$R_6$;
- $R_1$ and $R_2$ represent any carbon-containing moiety; wherein at least one of said $R_1$ and $R_2$ moieties is selected from the list comprising: small molecules; biomolecules; macromolecules; and functional groups; and
- —S—$R_4$, —S—$R_5$, and —S—$R_6$, each independently represents any thiol containing moiety.

Alternatively, the present invention provides a compound represented by formula (Ib);

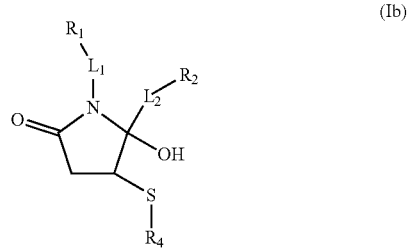

(Ib)

wherein:
- $L_1$ is either absent or a linker moiety; wherein said linker moiety is optionally further substituted with —S—$R_5$;
- $L_2$ is either absent or a linker moiety; wherein said linker moiety is optionally further substituted with —S—$R_6$;
- $R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated and unsaturated alkyl chains; and
- $R_4$, $R_5$ and $R_6$ are each independently selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains.

The present invention also provides a compound represented by formula (Ic);

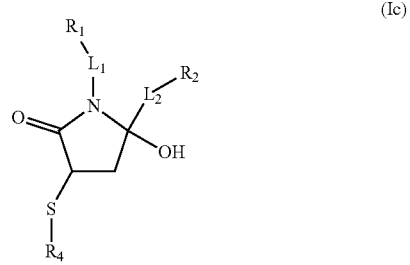

(Ic)

wherein:
- $L_1$ is either absent or a linker moiety selected from the list comprising: alkyl chains, small peptide sequences, polyethylene(glycol) and polyamines; wherein said linker moiety is optionally further substituted with —S—$R_5$;
- $L_2$ is either absent or a linker moiety selected from the list comprising: alkyl chains, small peptide sequences, polyethylene(glycol) and polyamines; wherein said alkyl chain comprises at least 2 C atoms wherein said linker moiety is optionally further substituted with —S—$R_6$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated and unsaturated alkyl chains;

$R_4$, $R_5$ and $R_6$ are each independently selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids, saturated and unsaturated alkyl chains; and $R_7$ is selected from —H and —OH.

The present invention further provides a compound represented by formula (Id);

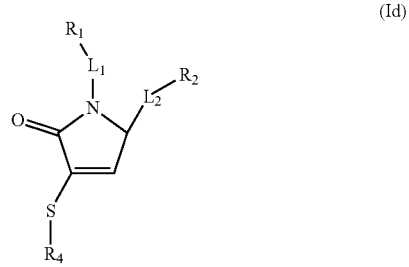

(Id)

wherein:

$L_1$ is either absent or a linker moiety selected from the list comprising: alkyl chains, small peptide sequences, polyethylene(glycol) and polyamines; wherein said linker moiety is optionally further substituted with —S—$R_5$;

$L_2$ is either absent or a linker moiety selected from the list comprising: alkyl chains, small peptide sequences, polyethylene(glycol) and polyamines; wherein said alkyl chain comprises at least 2 C atoms wherein said linker moiety is optionally further substituted with —S—$R_6$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids and saturated and unsaturated alkyl chains;

$R_4$, $R_5$ and $R_6$ are each independently selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids, saturated and unsaturated alkyl chains; and $R_7$ is selected from —H and —OH.

In a specific embodiment of the compounds of the present invention, $R_4$ is selected from the list comprising small molecules, biomolecules, functional groups and macromolecules; more in particular small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorescent moieties, steroids and saturated alkyl chains. Alternatively, $R_4$ is selected from the list comprising small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorescent moieties, steroids, saturated and unsaturated alkyl chains.

In another particular embodiment the present invention provides a compound represented by formula (Ia)

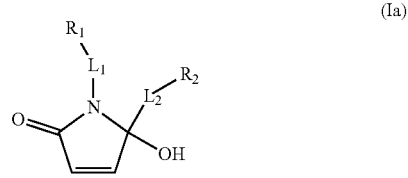

(Ia)

wherein:

$L_1$ is either absent or a linker moiety; wherein said linker moiety is optionally further substituted with —S—$R_5$;

$L_2$ is either absent or a linker moiety; wherein said linker moiety is optionally further substituted with —S—$R_6$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorescent moieties, steroids and saturated alkyl chains; and —S—$R_4$, —S—$R_5$, and —S—$R_6$, each independently represents any thiol containing moiety;

wherein $R_1$ is not-phenyl and $R_2$ is not-$CO_2Et$.

Alternatively, the present invention provides a compound represented by formula (Ia)

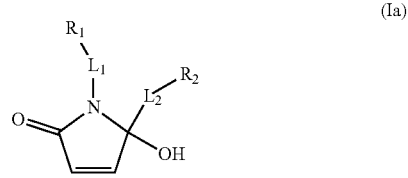

(Ia)

wherein:

$L_1$ is either absent or a linker moiety; wherein said linker moiety is optionally further substituted with —S—$R_5$;

$L_2$ is either absent or a linker moiety; wherein said linker moiety is optionally further substituted with —S—$R_6$;

R₁ and R₂ represent any carbon-containing moiety;
wherein at least one of the following applies:
- R₁ is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, dyes, fluorescent moieties, steroids and saturated alkyl chains;
- R₂ is selected from the list comprising: small molecules; biomolecules; macromolecules; and functional groups selected from the list comprising: carboxylic acids, maleimides, alkynes, azides, tetrazines, dienes, small heterocycles, alkoxyamines, (poly)aromatics, dyes, fluorescent moieties, steroids and saturated alkyl chains; and
- —S—R₄, —S—R₅, and —S—R₆, each independently represents any thiol containing moiety.

In yet a further embodiment of the present invention R₅ and R₆ are each independently selected from the list comprising small molecules, biomolecules, functional groups and macromolecules; more in particular small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorescent moieties, steroids and saturated alkyl chains.

The present invention further provides a pharmaceutical composition comprising one or more compounds as defined herein and one or more pharmaceutically acceptable excipients, carriers or diluents.

In another aspect, the present invention provides the compounds and compositions of the present invention for use in human and/or veterinary medicine. Stated another way, the present invention thus also provides the use of the compounds and compositions disclosed herein in human and/or veterinary medicine, such as in the preparation of a medicament for the treatment of disorders.

The present invention further provides a kit comprising a compound and/or composition as defined herein, as well as instructions for use thereof.

The present invention also provides the use of a compound or composition as defined herein, in a conjugation process of one or more small molecules, biomolecules, functional groups and macromolecules; more in particular in a conjugation process for linking two or more small molecules, biomolecules, functional groups and macromolecules to one another; or in a conjugation process for attaching one or more small molecules, biomolecules, functional groups and macromolecules to a substrate or surface.

In a specific embodiment, the present invention provides the use of a compound of formula (I);

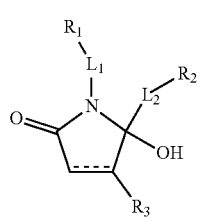

(I)

wherein:
- L₁ is either absent or a linker moiety; wherein said linker moiety is optionally further substituted with —S—R₅;
- L₂ is either absent or a linker moiety; wherein said linker moiety is optionally further substituted with —S—R₆;
- R₃ is selected from the list comprising: —H and —S—R₄;
- R₁ and R₂ represent any carbon-containing moiety; wherein at least one of said R₁ and R₂ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and
- —S—R₄, —S—R₅, and —S—R₆, each independently represents any thiol containing moiety; in a conjugation process of one or more small molecules, biomolecules, functional groups and macromolecules; more in particular in a conjugation process for linking two or more small molecules, biomolecules, functional groups and macromolecules; or in a conjugation process for attaching one or more small molecules, biomolecules, functional groups and macromolecules to a substrate or surface.

In a specific embodiment, the present invention provides the use of a compound of formula (I);

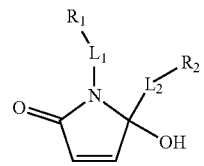

(Ia)

wherein:
- L₁ is either absent or a linker moiety; wherein said linker moiety is optionally further substituted with —S—R₅;
- L₂ is either absent or a linker moiety; wherein said linker moiety is optionally further substituted with —S—R₆;
- R₃ is selected from the list comprising: —H and —S—R₄;
- R₁ and R₂ represent any carbon-containing moiety; wherein at least one of said R₁ and R₂ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and
- —S—R₄, —S—R₅, and —S—R₆, each independently represents any thiol containing moiety;

in a conjugation process of one or more small molecules, biomolecules, functional groups and macromolecules; more in particular in a conjugation process for linking two or more small molecules, biomolecules, functional groups and macromolecules; or in a conjugation process for attaching one or more small molecules, biomolecules, functional groups and macromolecules to a substrate or surface.

In another specific embodiment, the present invention provides the use of a compound of formula (Ia);

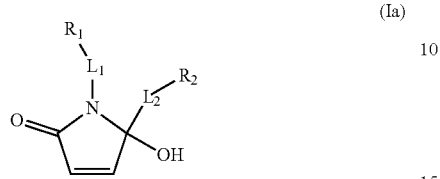

wherein:

$L_1$ is a linker moiety selected from the list comprising: alkyl chains, small peptide sequences, polyethylene (glycol) and polyamines; wherein said linker moiety is optionally further substituted with —S—$R_5$;

$L_2$ is either absent or a linker moiety; wherein said linker moiety is optionally further substituted with —S—$R_6$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and $R_5$ and $R_6$ are each independently selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains;

wherein either -$L_1$-$R_1$ is not -benzyl or -$L_2$-$R_2$ is not —$CH_2$—$CH_2$—$CO_2Et$;

in a conjugation process of one or more small molecules, biomolecules, functional groups and macromolecules; more in particular in a conjugation process for linking two or more small molecules, biomolecules, functional groups and macromolecules; or in a conjugation process for attaching one or more small molecules, biomolecules, functional groups and macromolecules to a substrate or surface.

In another specific embodiment, the present invention provides the use of a compound of formula (Ia);

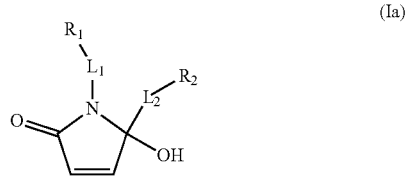

wherein:

$L_1$ is a linker moiety selected from the list comprising: alkyl chains, small peptide sequences, polyethylene (glycol) and polyamines; wherein said linker moiety is optionally further substituted with —S—$R_5$;

$L_2$ is either absent or a linker moiety selected from the list comprising: alkyl chains, small peptide sequences, polyethylene(glycol) and polyamines; wherein said alkyl chain comprises at least 2 C atoms; wherein said linker moiety is optionally further substituted with —S—$R_6$;

$R_1$ and $R_2$ represent any carbon-containing moiety; wherein at least one of said $R_1$ and $R_2$ moieties is selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains; and $R_5$ and $R_6$ are each independently selected from the list comprising: small molecules; biomolecules; macromolecules; and functional groups selected from the list comprising: carboxylic acids, esters, maleimides, alkynes, azides, tetrazines, dienes, small heterocycles, alkoxyamines, (poly)aromatics, dyes, fluorizers, steroids and saturated alkyl chains;

wherein either -$L_1$-$R_1$ is not -benzyl or -$L_2$-$R_2$ is not —$CH_2$—$CH_2$—$CO_2Et$;

in a conjugation process of one or more small molecules, biomolecules, functional groups and macromolecules; more in particular in a conjugation process for linking two or more small molecules, biomolecules, functional groups and macromolecules; or in a conjugation process for attaching one or more small molecules, biomolecules, functional groups and macromolecules to a substrate or surface.

The term "conjugation" is meant to be a chemical strategy intended to form a stable covalent link between 2 or more molecules. In particular in a "bioconjugation" process, at least one of these molecules is selected from the list comprising: small molecules; biomolecules; macromolecules; and functional groups. Bioconjugation is a crucial strategy which is suitable for linking (modified) biomolecules to substrates or surfaces.

Exemplary substrates suitable for use within the context of the present invention include but are not limited to: PEG chains, fluorizers or any other visualisation/tracking moiety, drug molecules, peptides/proteins/protein mimics, an oligonucleotide or a nucleic acid, carbohydrates, radioactive ligands, steroids, alkyl chains, half-life extension moieties, and albumin binding moieties.

Exemplary surfaces suitable for use within the context of the present invention include but are not limited to: Elisa plates, Glass plates, Nitrocellulose, Lateral flow devices, Microarrays, Nanoparticles, Au surfaces, and Electrode surfaces.

In a further aspect the present invention provides a method for the preparation of the compounds of the present invention. As further detailed in the examples part, the compounds of the invention can be prepared in accordance with the following reaction scheme:

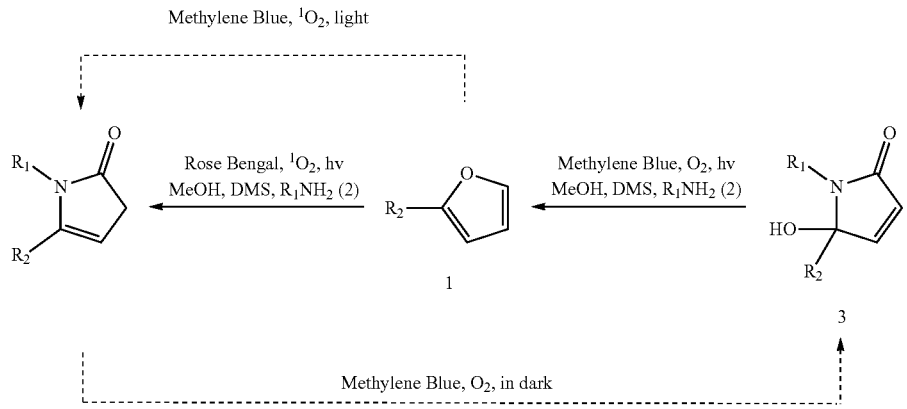

More in particular the present invention provides a method for the preparation of a compound of formula (II);

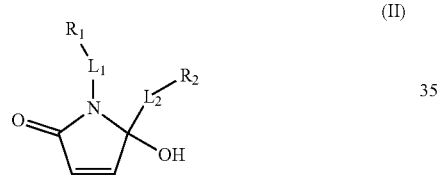

(II)

said method comprising the steps of:
  providing a compound of formula (IIa); and

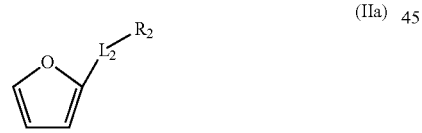

(IIa)

reacting said compound of formula (IIa) with a compound of formula $R_1$-$L_1$-$NH_2$ under atmospheric conditions in the presence of a photosensitizer, thereby obtaining the compound of formula (II);
wherein:
$L_1$ is either absent or a linker moiety;
$L_2$ is either absent or a linker moiety;
$R_1$ and $R_2$ represent any carbon-containing moiety; wherein at least one of said $R_1$ and $R_2$ is selected from the list comprising: small molecules, biomolecules, functional groups and macromolecules.

The compounds of formula (II) may be considered as intermediate compounds in the preparation of the compounds of formula (III), but they may also have value on their own.

The present invention further provides a method for the preparation of a compound of formula (Ic);

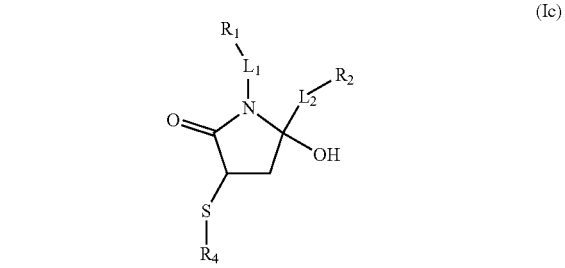

(Ic)

said method comprising the steps of:
  providing a compound of formula (II);
  reacting said compound of formula (II) with HS—$R_4$ in an organic or aqueous solvent in the presence of catalytic amount EDTANa$_4$ or aqueous solution without catalyst thereby obtaining a compound of formula (Ic);
wherein:
$L_1$ is either absent or a linker moiety;
$L_2$ is either absent or a linker moiety;
$R_1$ and $R_2$ represent any carbon-containing moiety; wherein at least one of said $R_1$ and $R_2$ is selected from the list comprising: small molecules, biomolecules, functional groups and macromolecules; and
—S—$R_4$ represents any thiol containing moiety; specifically, $R_4$ is selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids, saturated and unsaturated alkyl chains.

In addition, the present invention provides a method for the preparation of a compound of formula (Id)

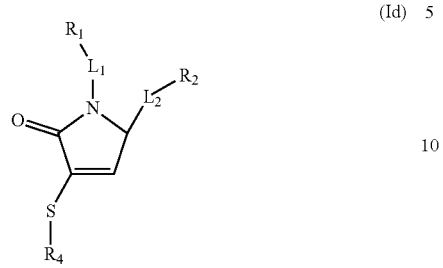

said method comprising the steps of:
  providing a compound of formula (Ic);
  subjecting said compound of formula (Ic) to an acid treatment or temperature increase thereby obtaining a compound of formula (Id);
wherein:
$L_1$ is either absent or a linker moiety;
$L_2$ is either absent or a linker moiety;
$R_1$ and $R_2$ represent any carbon-containing moiety; wherein at least one of said $R_1$ and $R_2$ is selected from the list comprising: small molecules, biomolecules, functional groups and macromolecules; and
—S—$R_4$ represents any thiol containing moiety, specifically $R_4$ is selected from the list comprising: small molecules; biomolecules; macromolecules; and functional groups selected from the list comprising: carboxylic acids, esters, ethers, amides, maleimides, alkynes, azides, tetrazines, dienes, small heterocycles, alkoxyamines, (poly)aromatics, dyes, fluorizers, steroids, saturated and unsaturated alkyl chains.

The present invention also provides a method for the preparation of a compound of formula (III);

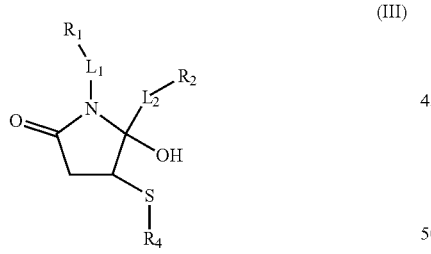

said method comprising the steps of:
  providing a compound of formula (IIa);
  reacting said compound of formula (IIa) with HS—$R_4$ in an organic or aqueous solvent in the presence of catalytic amount EDTANa$_4$ or aqueous solution without catalyst thereby obtaining a compound of formula (III);
wherein:
$L_1$ is either absent or a linker moiety,
$L_2$ is either absent or a linker moiety,
$R_1$ and $R_2$ represent any carbon-containing moiety; wherein at least one of said $R_1$ and $R_2$ is selected from the list comprising: small molecules, biomolecules, functional groups and macromolecules; and
—S—$R_4$ represents any thiol containing moisty.

Figure 2:
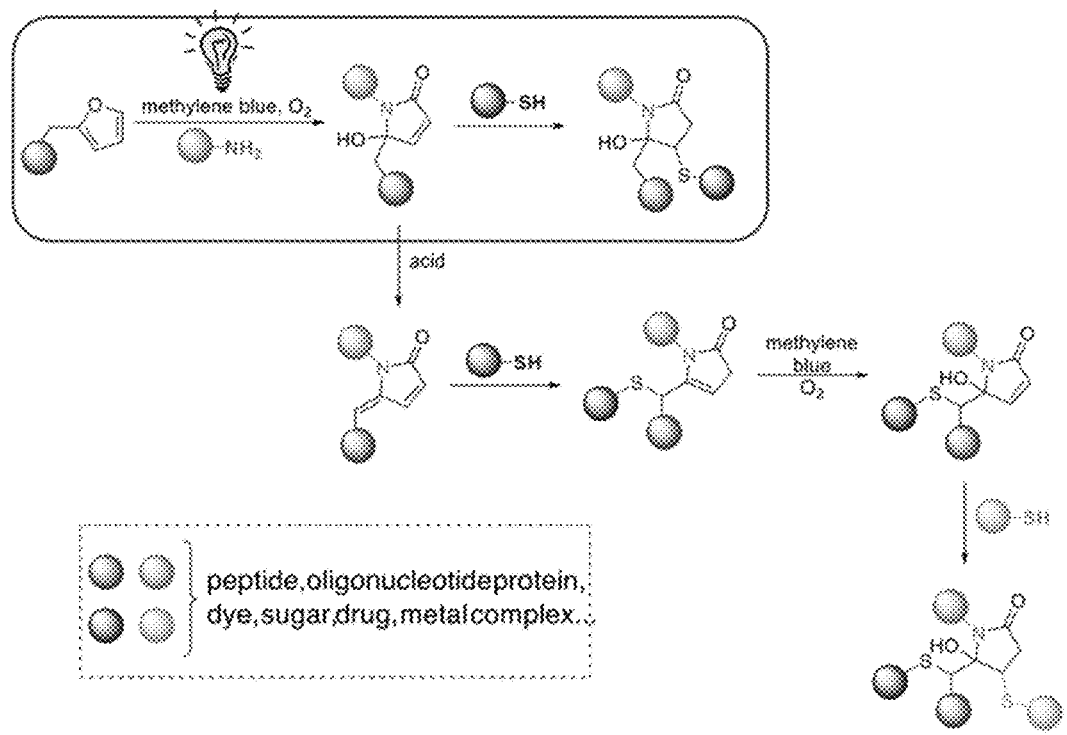
FIG. 2: General concept of potential bioconjugation processes using the reagents of the present invention
Figure 3:
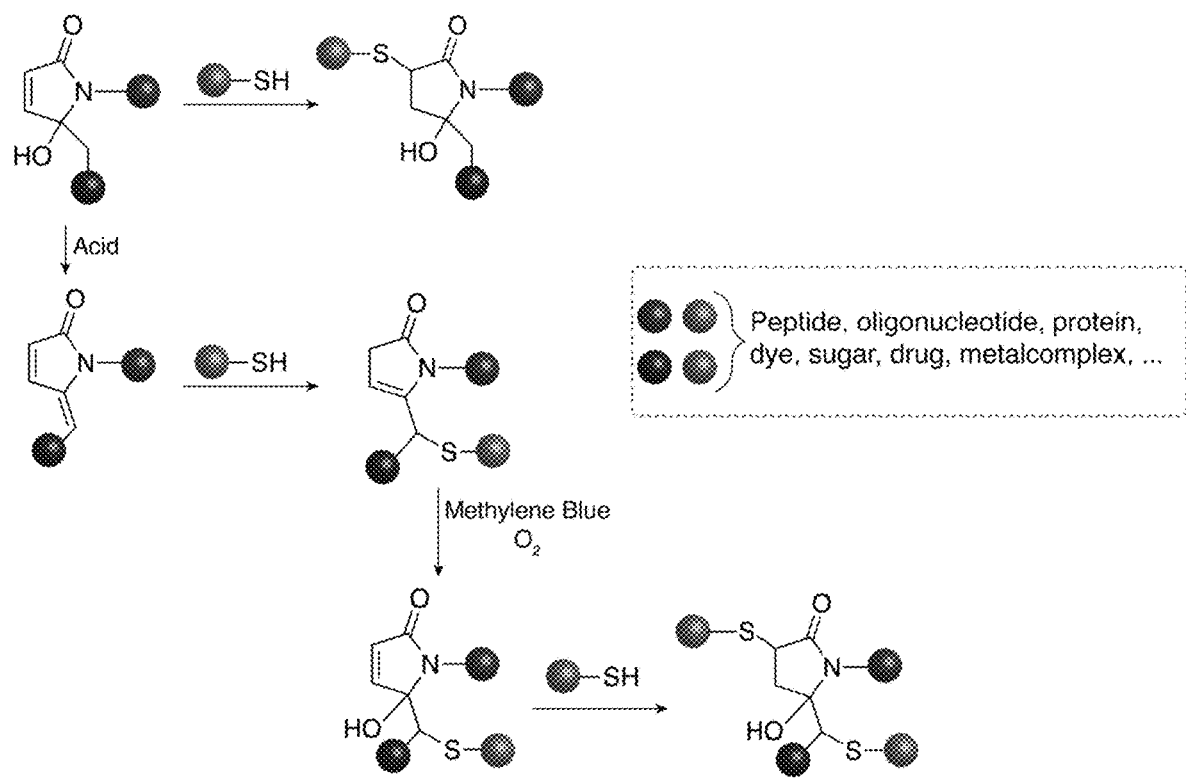
FIG. 3: General concept of potential bioconjugation processes using the reagents of the present invention FIGS. 4A abd 4B.

A schematic overview of some potential bioconjugation routes in the context of the present invention, is depicted in FIG. 2. However, the reagents may also be conveniently used in other types of bioconjugation processes.

EXAMPLES

Example 1: Bioconjugation Reagents According to the Present Invention

This example briefly outlines the synthesis process of some exemplary bioconjugation reagents according to the present invention.

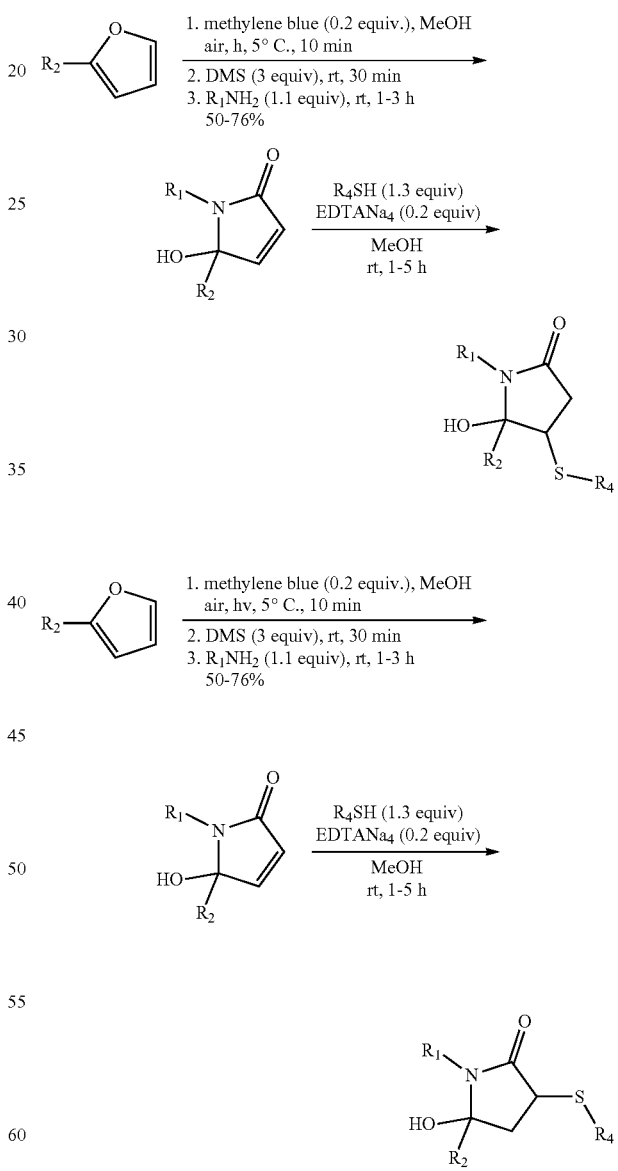

The molecules as depicted herein above, may optionally further comprise a linker moiety between the 5-membered heterocycle and the $R_1$ and/or $R_2$ moieties, such as $L_1$-$R_1$ or $L_2$-$R_2$.

Example 2: Synthesis of 5-hydroxy-pyrrolidin-2-ones

General Synthesis Route

General procedure for the preparation of 5-hydroxy-1H-pyrrol-2 (5H)-ones of type 3 (3aa, 3ab, 3ac, 3ba and 3ca)

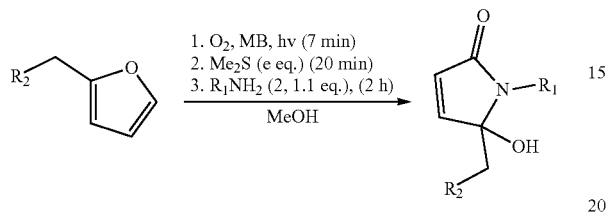

Substituted furans (1.0 mmol, 90 µL for 1a, 138 mg for 1b or 0.5 mmol, 125 mg for 1c) were dissolved in methanol (6 mL) containing catalytic amounts of methylene blue (2 mol %, 6 mg for 1a and 1b or 3 mg for 1c). The solutions were cooled with an ice bath. Oxygen was gently bubbled through the solutions while they were irradiated with a xenon Variac Eimac Cermax 300 W lamp. The reactions were monitored by tlc. After completion of the reactions (7 min), the solutions were warmed to rt and Me$_2$S (3.0 mmol, 219 µL for 1a, 1b or 1.5 mmol, 109 µL for 1c) was added. The reactions were stirred for 20 min. Then, the appropriate amine (1.1 mmol, 120 µL of 2a, or 70 µL of 2b, or 0.55 mmol, 294.5 mg of neutralised 2c (using 3.0 equiv. of Et$_3$N at 0° C.), was added and the mixtures stirred for a further 2 h at rt. The mixtures were concentrated in vacuo and the final products 5-hydroxy-1H-pyrrol-2 (5H)-ones were purified by flash column chromatography (silica gel, petroleum ether: EtOAc, 5:1→2:1→1:1 for 3aa-3ac and 3ca and 10:1→5:1→1:1 for 3ba).

Characterisation details of synthesized 5-hydroxy-pyrrolidin-2-ones 1-Benzyl-5-hydroxy-5-methyl-1H-pyrrol-2 (5H)-one (3aa)

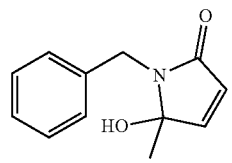

This example provides a synthesis route for a comparative example in which the R$_1$ and/or R$_2$ groups represent a carbon-containing moiety (i.e. alkyl moiety) and a (poly) aromatic compound (functional moiety). Other than being a comparative example, said compound may als be used in further bioconjugation methods according to the invention.

Yield 44% (90 mg). $^1$H NMR (500 MHz, CDCl$_3$): δ=7.28 (m, 4H), 7.23 (m, 1H), 6.90 (d, J=6.0 Hz, 1H), 6.02 (d, J=6.0 Hz, 1H), 4.68 (d, J=15.6 Hz, 1H), 4.39 (d, J=15.6 Hz, 1H), 1.23 (s, 3H) ppm; $^{13}$C NMR (125 MHz, CDCl$_3$): δ=169.6, 150.8, 138.2, 128.5 (2C), 127.8 (2C), 127.2, 125.6, 90.3, 41.5, 23.2 ppm; HRMS (TOF ESI): calcd for C$_{12}$H$_{14}$NO$_2$$^+$: 204.1019 [M+H]$^+$; found: 204.1026.

5-Hydroxy-5-methyl-1-(prop-2-yn-1-yl)-1H-pyrrol-2 (5H)-one (3ab)

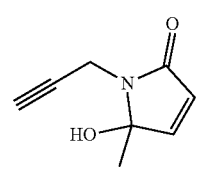

This example provides a synthesis route for a compound of the invention in which the R$_1$ and/or R$_2$ groups represent a carbon-containing moiety (i.e. alkyl moiety) and an alkyne moiety (functional moiety).

Yield 45% (68 mg). $^1$H NMR (500 MHz, CDCl$_3$): δ=6.94 (dd, J$_1$=6.0 Hz, J$_2$=1.2 Hz, 1H), 5.96 (m, 1H), 4.16 (dd, J$_1$=6.0 Hz, J$_2$=1.2 Hz, 1H), 4.12 (dd, J$_1$=2.5 Hz, J$_2$=1.5 Hz, 1H), 2.15 (t, J=2.5 Hz, 1H), 1.60 (s, 3H) ppm; $^{13}$C NMR (125 MHz, CDCl$_3$): δ=168.7, 151.3, 125.3, 90.0, 79.2, 70.7, 26.5, 26.7 ppm; HRMS (TOF ESI): calcd for C$_8$H$_{10}$NO$_2$$^+$: 152.0706 [M+H]$^+$; found: 152.0704.

5-Hydroxy-5-methyl-1-(pyren-2-ylmethyl)-1H-pyrrol-2 (5H)-one (3ac)

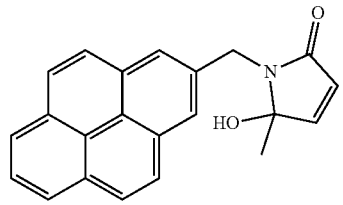 [SMILES: CC1(O)C=CC(=O)N1Cc1cc2ccc3cccc4ccc(c1)c2c34]

This example provides a synthesis route for a compound of the invention in which the R$_1$ and/or R$_2$ groups represent a carbon-containing moiety (i.e. alkyl moiety) and a (poly) aromatic compound (functional moiety).

Yield 45% (68 mg). $^1$H NMR (500 MHz, CHCl$_3$): 8.14 (m, 2H), 8.07 (m, 2H), 8.00 (d, J=4.0 Hz, 2H), 7.97 (m, 3H), 6.81 (d, J=6.0 Hz, 1H), 6.06 (d, J=6.0 Hz, 1H), 5.30 (d, J=15.6 Hz, 1H), 5.23 (d, J=15.6 Hz, 1H), 1.16 (s, 3H) ppm; $^{13}$C NMR: not available.

1-Benzyl-5-hydroxy-5-pentyl-1H-pyrrol-2 (5H)-one (3ba)

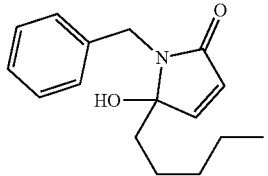 [SMILES: CCCCCC1(O)C=CC(=O)N1Cc1ccccc1]

This example provides a synthesis route for a comparative example in which the $R_1$ and/or $R_2$ groups represent a carbon-containing moiety (i.e. alkyl moiety) and a (poly) aromatic compound (functional moiety). Other than being a comparative example, said compound may als be used in further bioconjugation methods according to the invention.

Yield 51% (132 mg). $^1$H NMR (500 MHz, CHCl$_3$): 7.41 (d, J=7.2 Hz, 2H), 7.30 (m, 1H), 6.88 (d, J=6.0 Hz, 1H), 6.15 (d, J=6.0 Hz, 1H), 4.59 (d, J=15.2 Hz, 1H), 4.47 (d, J=15.2 Hz, 1H), 2.57 (brs, 1H), 1.82 (m, 1H), 1.69 (m, 1H), 1.15-1.01 (m, 4H), 0.92-0.86 (m, 1H), 0.84-0.80 (m, 1H), 0.73 (t, J=7.1 Hz, 3H) ppm; $^{13}$C NMR (125 MHz, CDCl$_3$): δ=169.7, 149.2, 138.2, 128.4 (4C), 127.3, 127.0, 93.0, 41.7, 35.4, 31.4, 23.1, 22.3, 13.8 ppm.

1-benzyl-5-hydroxy-5-(4-iodobutyl)-1H-pyrrol-2 (5H)-one (3ca)

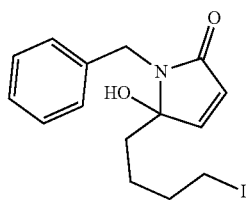 [SMILES: O=C1C=CC(O)(CCCCI)N1Cc1ccccc1]

This example provides a synthesis route for a comparative example in which the $R_1$ and/or $R_2$ groups represent a carbon-containing moiety (i.e. alkyl moiety) and a (poly) aromatic compound (functional moiety). Other than being a comparative example, said compound may als be used in further bioconjugation methods according to the invention.

Yield 46% (85 mg). $^1$H NMR (500 MHz, CDCl$_3$): δ=7.38 (d, J=7.1, 2H), 7.29 (m, 4H), 6.86 (d, J=6.0, 1H), 6.09 (d, J=6.0, 1H), 4.70 (d, J=15.2, 1H), 4.30 (d, J=15.2, 1H), 2.87 (dtd, J$_1$=19.3 Hz, J$_2$=9.6 Hz, J$_3$=7.0 Hz, 2H), 1.78 (m, 1H), 1.60 (m, 1H), 1.53-1.44 (m, 1H), 1.32-1.24 (m, 1H), 1.19-1.09 (m, 1H), 0.81-0.72 (m, 1H) ppm; $^{13}$C NMR (125 MHz, CDCl$_3$): δ=169.9, 149.2, 138.1, 132.1, 128.6, 128.4 (2C), 127.4, 126.9, 92.7, 41.6, 34.4, 32.8, 24.5, 5.9 ppm.

Additional Examples and Characterisation Details of Synthesized 5-Hydroxy-Pyrrolidin-2-ones Detailed Synthesis Route for Fatty Amine Analogue This example provides a synthesis route for compounds of the invention in which the $R_1$ and/or $R_2$ groups represent a fatty acid (biomolecule), i.e. oleylamine; and a carbon-containing moiety, i.e. ester moiety.

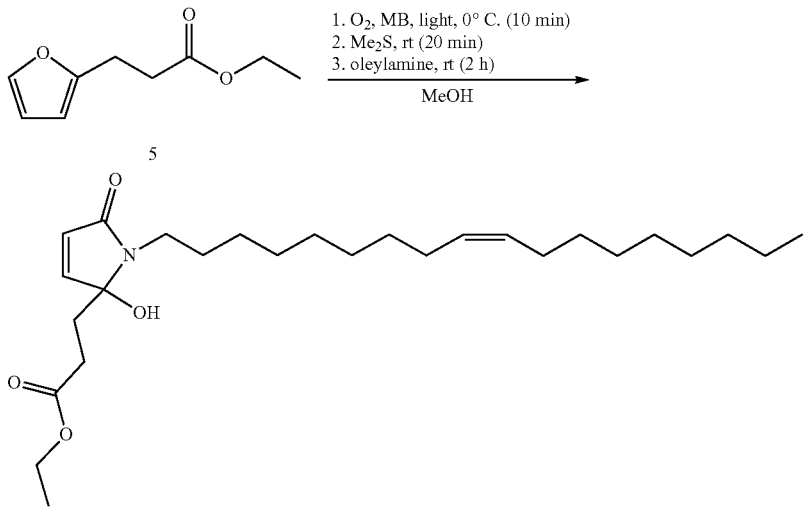

Compound 6 was synthesised from 5 (1 mmol, 0.160 mL) and oleylamine (1.1 mmol, 0.362 mL) according to the general procedure. A normal phase chromatographic column (stationary phase: silica; gradient elution: a proportion of hexane (50% till 40%) and EtOAc (50% till 60%) and a reversed phase automatic column (C18 12 g column, gradient elution of water and acetonitrile, presence: 100% acetonitrile) were used for the purification. Product 6 was obtained (0.1855 g, 41%) as a light yellow oil.

1H NMR (400 MHz, DMSO) § 6.95 (d, J=6.0 Hz, 1H, CHCHCONR2), 6.03 (d, J=6.0 Hz, 1H, CHCHCONR2), 5.38-5.27 (m, 2H, (CH2)5CH2(CH) 2CH2(CH2)5), 4.06-3.97 (m, 2H, COOCH2CH3), 3.18 (ddd, J=15.2, 9.5, 5.9 Hz, 1H) and 3.05-2.95 (m, 1H) (CHCHCONRCH2CH2(CH2) 5), 2.16-2.06 (m, 2H, CH2CH2COOCH2CH3), 2.04-1.87 (m, 6H, CqCH2CH2COOCH2CH3 and (CH2)5CH2(CH) 2CH2(CH2)5), 1.56-1.43 (m, 2H, CHCHCONRCH2CH2 (CH2)5), 1.26 (d, J 21.8 Hz, 22H, CONRCH2CH2(CH2)

5CH2(CH) 2CH2(CH2) 6CH3), 1.15 (t, J=7.1 Hz, 3H, COOCH2CH3), 0.85 (t, J=6.8 Hz, 3H, CH2(CH) 2CH2 (CH2) 6CH3).

13C NMR (101 MHz, DMSO) δ 172.29, 168.60, 149.12, 129.44, 126.13, 90.65, 59.56, 39.84, 39.63, 39.42, 39.21, 39.00, 38.79, 38.58, 37.33, 30.96, 30.37, 28.80, 28.52, 28.26, 26.45, 26.27, 21.77, 13.79.

LCMS: m/z [M+H–H$_2$O] calculated for compound 6:432.3315, found: 432.3; m/z [M+H] calculated for compound 6:450.3505, found: 450.3

Detailed Synthesis Route for Fatty Acid Analogues

This example provides a synthesis route for compounds of the invention in which the R$_1$ and/or R$_2$ groups represent a fatty acid (biomolecule), i.e. aminocaproic acid; and a carbon-containing moiety, i.e. amide moiety.

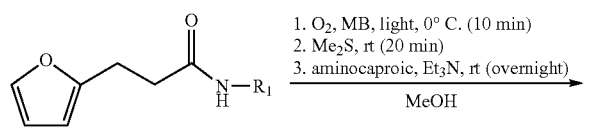

R$_1$ = C$_{18}$H$_{35}$ (7)
R$_1$ = C$_{12}$H$_{25}$ (8)

1. O$_2$, MB, light, 0° C. (10 min)
2. Me$_2$S, rt (20 min)
3. aminocaproic, Et$_3$N, rt (overnight)

MeOH

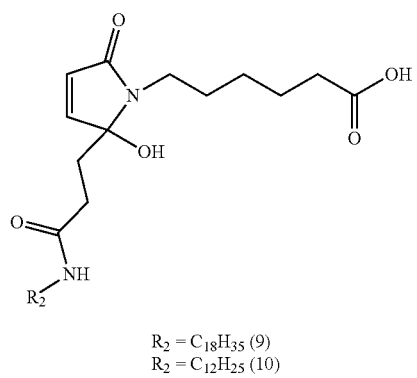

R$_2$ = C$_{18}$H$_{35}$ (9)
R$_2$ = C$_{12}$H$_{25}$ (10)

Synthesis of 9:

Compound 9 was prepared from 7 (0.4739 mmol, 0.1847 g) by the above described general procedure. In the last step aminocaproic acid (0.52 mmol, 0.068 g) and triethylamine (1.02 mmol, 0.072 mL) were added. A different solvent system for the TLC was used, eluent: 80% EtOAc/20% MeOH. A reversed phase automatic column (Generic C18 12 g column, gradient elution with water and acetonitrile, presence: 100% acetonitrile) gave the product (0.0536 g, 21%) as a yellow-green oil. Further purification was not necessary.

1H NMR (300 MHz, DMSO) δ 7.74 (t, J=5.6 Hz, 1H), 6.90 (s, 1H), 6.01 (d, J=6.0 Hz, 1H), 5.33 (dd, J=10.0, 5.0 Hz, 2H), 4.03 (q, J=7.1 Hz, 1H), 3.00 (d, J=18.7 Hz, 4H), 2.19 (t, J=7.8 Hz, 4H), 2.04-1.87 (m, 6H), 1.50 (dt, J=15.1, 7.4 Hz, 4H), 1.40-1.10 (m, 26H), 0.85 (t, J=6.6 Hz, 3H).

LCMS: m/z [M–H] calculated for compound 9:533.4033, found 533.30.

Synthesis of 10:

Compound 10 was prepared from 8 (0.688 mmol, 0.2116 g) according to the general procedure. Aminocaproic acid (0.757 mmol, 0.0993 g) and triethylamine (1.257 mmol, 0.175 mL) were added to the solution. A reversed phase automatic column (generic C18 4 g column, gradient elution with water and acetonitrile, presence: 66% acetonitrile) gave the product (0.0755 g, 24%) as a brown oil. Compound 8 was used as reagent for the synthesis of 9. No further purification.

1H NMR (300 MHz, DMSO) δ 7.74 (t, J=5.5 Hz, 1H, CONH), 6.92 (d, J=6.0 Hz, 1H, CHCHCONR2), 6.01 (d, J=6.0 Hz, 1H, CHCHCONR2), 3.05-2.93 (m, 4H, CONRCH2CH2 and CONHCH2CH2), 2.19 (t, J=7.3 Hz, 2H, CH2CH2COOH), 1.89 (d, J=10.4 Hz, 2H, CH2CH2COOH), 1.60-1.41 (m, 4H, CqCH2CH2CONH), 1.24 (s, 22H, CONHCH2(CH2)10CH3 and CH2CH2CH2CH2COOH), 0.86 (t, J=6.7 Hz, 3H, CONHCH2(CH2)10CH3).

LCMS: m/z [M–H] calculated for compound 10:451.3250, found: 451.3.

Detailed Synthesis Route for PEG Analogue

This example provides a synthesis route for compounds of the invention in which the R$_1$ and/or R$_2$ groups represent a PEG analogue (biomolecule); and a carbon-containing moiety, i.e. alkyl moiety.

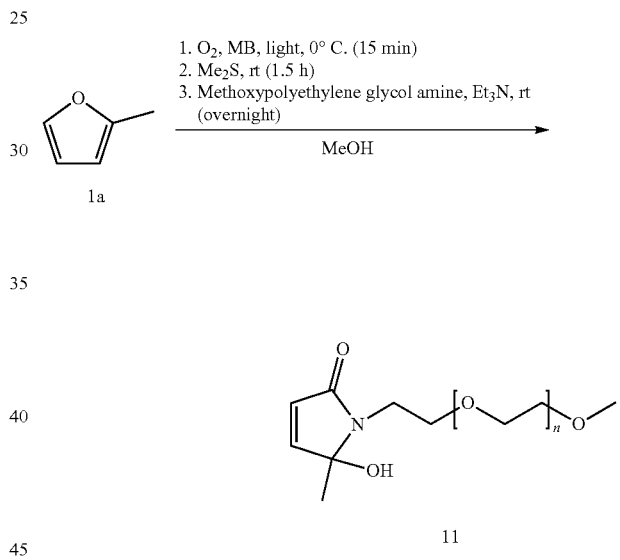

1a

1. O$_2$, MB, light, 0° C. (15 min)
2. Me$_2$S, rt (1.5 h)
3. Methoxypolyethylene glycol amine, Et$_3$N, rt (overnight)

MeOH

11

82.1 mg of 2-methylfuran (1 mmol) was dissolved in 10 mL of MeOH together with 7.4 mg of Methylene Blue (0.02 mmol) in a test tube. The reaction mixture was cooled in an ice bath, while air was being bubbled through an the mixture was being irradiated by a strong lamp for 15 minutes. After this 0.148 mL of DMS (2 mmol) was added and the mixture was stirred for 1.5 hours at room temperature, protected from light by alumina foil. 0.200 ml of Et$_3$N (1.44 mmol) and an excess of the methoxypolyethylene glycol amine were added, mixture was stirred overnight. Purification: Flash column (Reversed Phase, from 100% ACN to 100% H2O). Concentration: co-evaporation with desinfectol. Yield: 29.2 mg NMR: 10a-10e, 1H NMR (400 MHz, D2O) δ 7.08 (s, 1H), 6.06 (s, 1H), 3.84 (s, 2H), 3.66 (s, 238H), 3.57 (s, 2H), 3.39 (s, 3H), 1.55 (s, 3H).

MS: 11, exact mass calculated (compound (n=35)—H+, negative mode): 1755.0328, masses detected: 1754.8, a lot of other peaks due to distribution of amount of PEG-chain-links.

Detailed Synthesis Route for PEG Analogue

This example provides a synthesis route for compounds of the invention in which the $R_1$ and/or $R_2$ groups represent a PEG analogue (biomolecule); and a carbon-containing moiety, i.e. ester moiety.

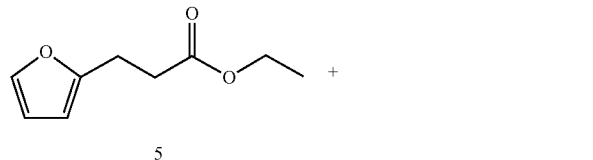

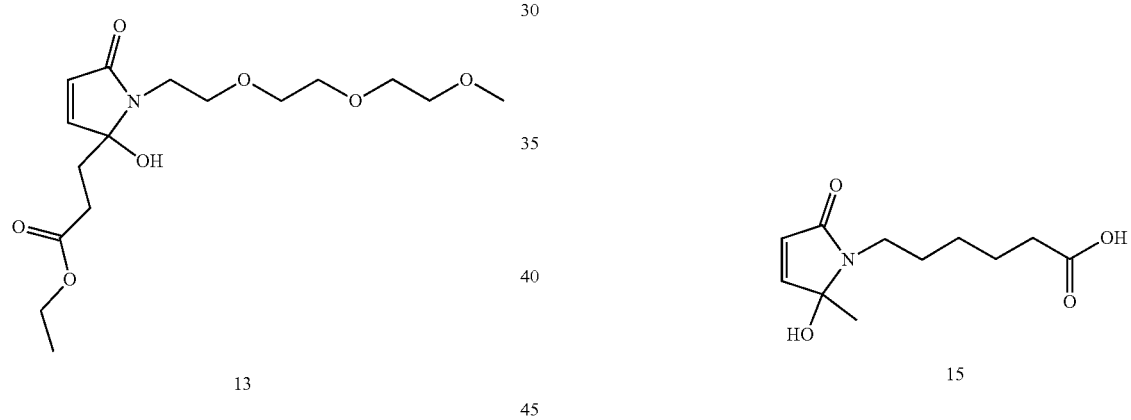

Further Examples

This example provides a synthesis route for compounds of the invention in which the $R_1$ and/or $R_2$ groups represent a fatty acid (biomolecule), i.e. aminocaproic acid; and a carbon-containing moiety. i.e. alkyl moiety.

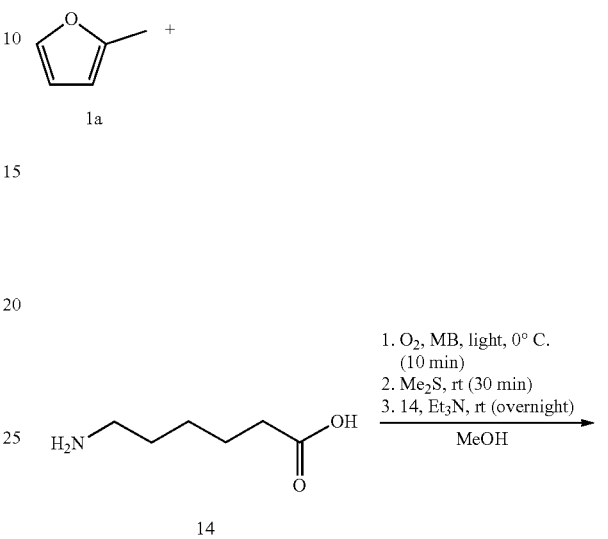

168 mg of 5 (1 mmol) was dissolved in 10 mL of MeOH together with 7.5 mg of Methylene Blue (0.02 mmol) in a test tube. The reaction mixture was cooled in an ice bath, while air was being bubbled through and the mixture was being irradiated by a strong lamp for 15 minutes. After this 0,147 mL of DMS (2 mmol) was added and the mixture was stirred for 1.5 hours at room temperature, protected from light by alumina foil. 180 mg of 12 (1.1 mmol) was added, mixture was stirred overnight. Purification: Flash column (Reversed Phase, product came in 100% H2O). Next purification: flash chromatographic column, eluens: 4% MeOH in EtOAc. Yield: 23% (80.1 mg, oil).

NMR: 1H NMR (400 MHz, MeOD) δ 6.99 (s, 1H), 6.06 (s, 1H), 4.08 (s, 2H), 3.60 (s, 10H), 3.53 (s, 3H), 3.30 (s, 2H), 2.18 (s, 4H), 1.22 (s, 3H).

LCMS after flash chromatographic column: 4b, exact mass calculated (compound+H+): 346.1788, masses detected: 328.1 (=compound+H+−H2O)

2-methylfuran (1.0 mmol, 90 μL) was dissolved in MeOH (10 mL) containing catalytic amounts of methylene blue (2 mol %, 7.5 mg). The solution was cooled with an ice bath. Oxygen was gently bubbled through the solution while irradiated with a xenon Variac Eimac Cermax 300 W lamp. The reaction was monitored by TLC. After completion of the reaction (10 min), the solution was warmed to rt and Me₂S (2 mmol, 146 μL) was added. The reaction was stirred for 30 min. Then, 6-aminohexanoic acid (1.1 mmol, 145 mg) and Et₃N (2 mmol, 140 μL) were added and the mixture was stirred overnight at rt. The mixture was concentrated in vacuo and the final product (40% yield) was obtained by preparative RP-HPLC.

NMR: 1H NMR (400 MHz, DMSO-d6) δ 7.02 (d, 1H), 5.98 (d, 1H), 3.09 (m, 2H), 2.17 (t, 2H), 1.50 (m, 4H), 1.39 (s, 3H), 1.28 (m, 2H).

Calculated exact mass: 227.12, mass detected: 226.1 (=compound−H⁺).

This example provides a synthesis route for a compound of the invention in which the $R_1$ and/or $R_2$ groups represent a carbon-containing moiety (i.e. alkyl moiety) and a fluorizer moiety (functional moiety).

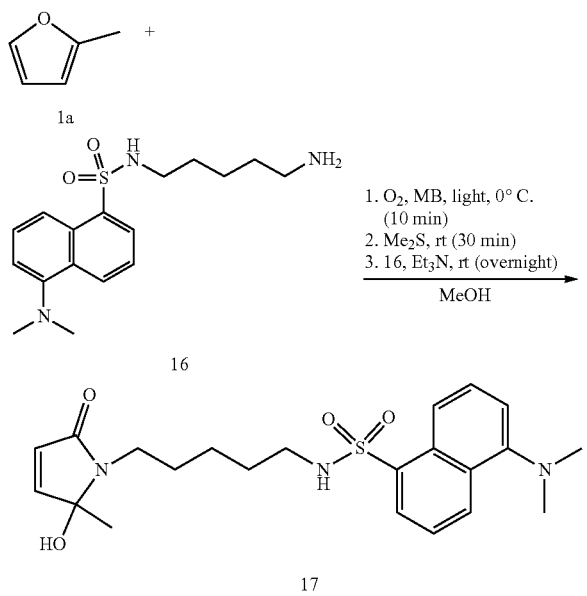

2-methylfuran (0.25 mmol, 22.5 μL) was dissolved in MeOH (2.5 mL) containing catalytic amounts of methylene blue (2 mol %, 1.875 mg). The solution was cooled with an ice bath. Oxygen was gently bubbled through the solution while irradiated with a xenon Variac Eimac Cermax 300 W lamp. The reaction was monitored by TLC. After completion of the reaction (10 min), the solution was warmed to rt and $Me_2S$ (0.75 mmol, 55 μL) was added. The reaction was stirred for 30 min. Then, dansylcadaverine (0.275 mmol, 92 mg) and $Et_3N$ (0.25 mmol, 25 mg) were added and the mixture was stirred overnight at rt. The mixture was concentrated in vacuo and the final product (60% yield) was obtained by preparative RP-HPLC.

NMR: 1H NMR (400 MHz, MeOD) δ 8.56 (d, 1H), 8.36 (d, 1H), 8.19 (dd, 1H), 7.58 (q, 2H), 7.28 (d, 1H), 6.99 (d, 1H), 5.98 (d, 1H), 3.11 (m, 2H), 2.88 (s, 6H), 2.85 (t, 2H), 1.42 (s, 3H), 1.36 (m, 4H), 1.17 (m, 2H).

Calculated exact mass: 431.19, mass detected: 432.2 (=compound+H+) and 414.2 (=compound+H$^+$–$H_2O$).

This example provides a synthesis route for a compound of the invention in which the $R_1$ and/or $R_2$ groups represent a carbon-containing moiety (i.e. alkyl moiety) and a fatty acid (biomolecule), i.e. oleylamine.

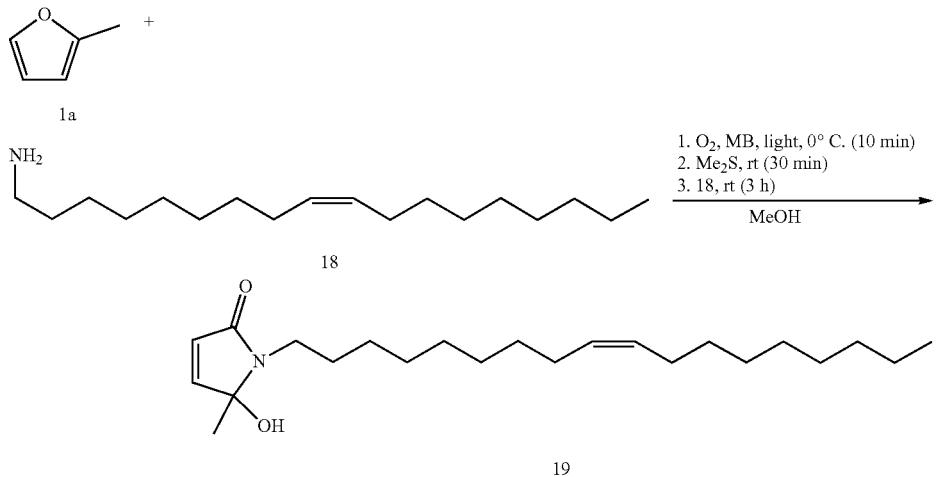

2-methylfuran (0.5 mmol, 45 μL) was dissolved in MeOH (5 mL) containing catalytic amounts of methylene blue (2 mol %, 3.75 mg). The solution was cooled with an ice bath. Oxygen was gently bubbled through the solution while irradiated with a xenon Variac Eimac Cermax 300 W lamp. The reaction was monitored by TLC. After completion of the reaction (10 min), the solution was warmed to rt and $Me_2S$ (1.5 mmol, 110 μL) was added. The reaction was stirred for 30 min. Then, 80-90% oleylamine (0.55 mmol, 147 mg) was added and the mixture was stirred for 3 h at rt. The mixture was concentrated in vacuo and the final product was obtained by flash column chromatography (silica gel, hexane: EtOAc).

Calculated exact mass: 363.31, mass detected: 364.3 (=compound+H$^+$) and 346.3 (=compound+H$^+$–$H_2O$).

Example 3: Conjugation of 5-hydroxy-pyrrolidin-2-ones to thiols
General Synthesis Route
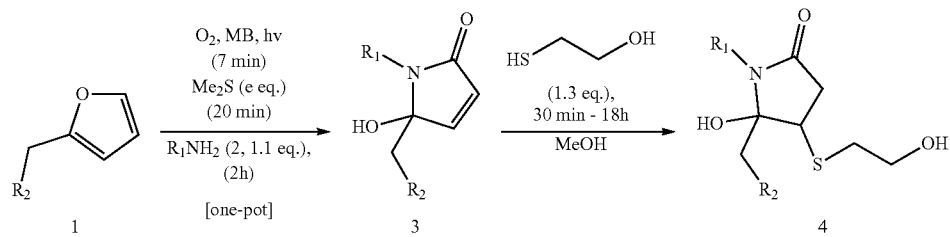
| Entry | Furan | Amine | Lactam | (isolated yield) | Conjugate | (isolated yield) |
|---|---|---|---|---|---|---|
| 1 | 1a | 2a | 3aa | (44%) | 4aa | (one isomer, 51%)[b] |
| 2 | 1a | 2b | 3ab | (45%) | 4ab | (mixture, 50%)[b] |
| 3 | 1a | 2c | 3ac | (45%) | 4ac | (one isomer, 30%)[c] |
| 4 | 1b | 2a | 3ba | (51%) | 4ba | (mixture 28%)[c] |
| 5 | 1c | 2a | 3ca | (46%) | 4ca | (one isomer, 25%)[c] |

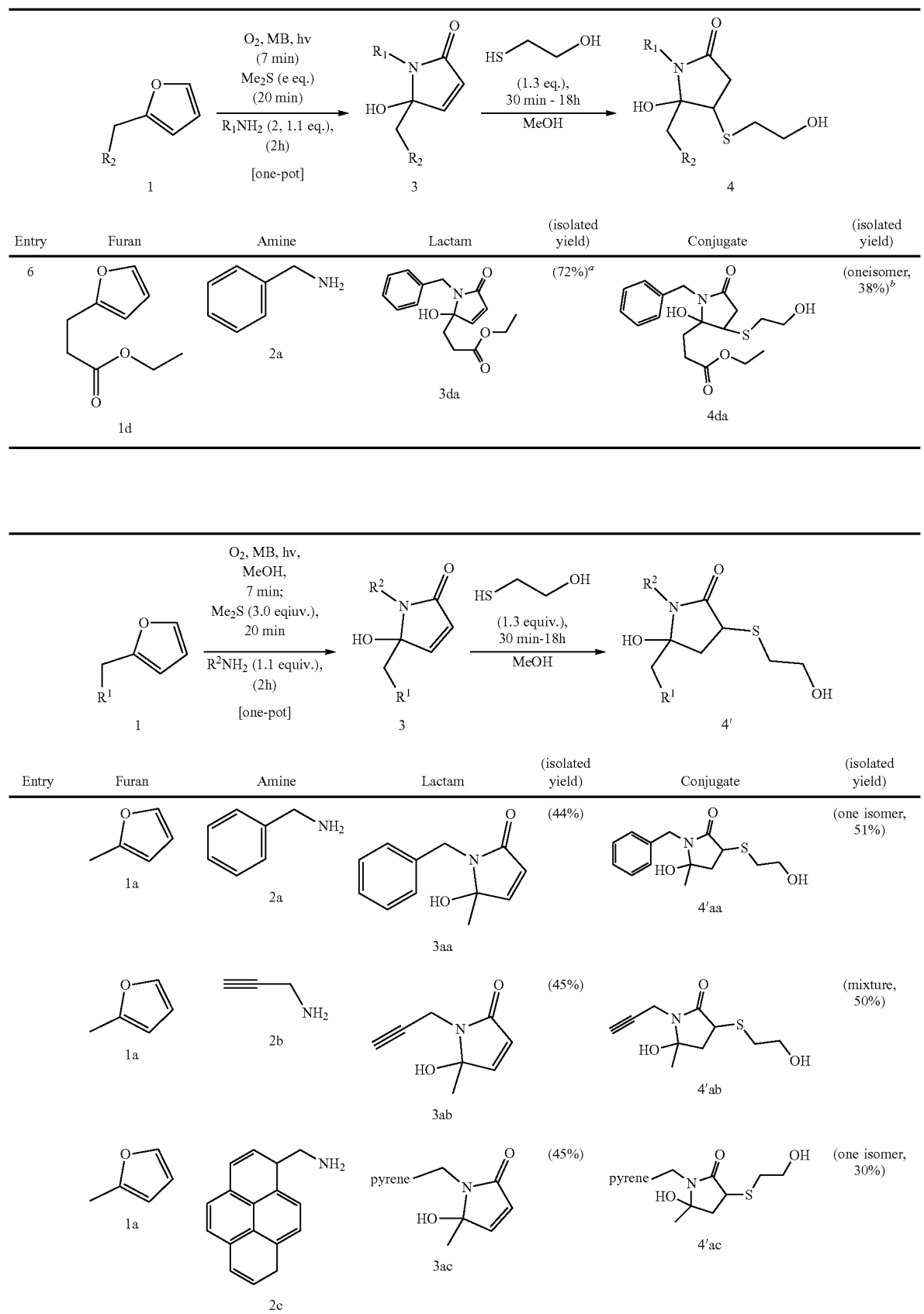

-continued

| Entry | Furan | Amine | Lactam | (isolated yield) | Conjugate | (isolated yield) |
|---|---|---|---|---|---|---|
| | 1b | 2a | 3ba | (51%) | 4'ba | (mixture 28%) |
| | 1c | 2a | 3ca | (46%) | 4'ca | (one isomer, 25%) |
| | 1d | 2a | 3da | (72%) | 4'da | (oneisomer, 38%) |

[b]Method A; [c]Method c

[b]Method A; [c]Method c

Detailed Synthesis Route

General Procedure for the Preparation of 5-hydroxy-4-((2-hydroxyethyl)thio)-pyrrolidin-2-ones of type 5.5

Method A: The purified lactams (0.12 mmol, 25 mg for 3aa, 0.15 mmol, 23 mg for 3ab and 0.17 mmol or 50 mg for 3da 292) were dissolved in MeOH (2 mL) and mercaptoethanol (0.16 mmol, 11.2 μL for 3aa, 0.19 mmol, 14 μL for 3ab or 0.22 mmol, 16 μL for 3da) was added. The mixtures were left for 18 h stirring and then they were concentrated in vacuo. Conjugates 4aa, 4ab and 4da were purified by flash column chromatography (silica gel, petroleum ether: EtOAc, 2:1→1:1→1:2).

Method B: The purified lactams (0.06 mmol, 18 mg for 3ac, 0.05 mmol, 13 mg for 3ba or 0.05 mmol, 20 mg for 3ca) were dissolved in MeOH (2 mL) and pretreated mercaptoethanol (0.07 mmol, 4.8 μL for 3ac, 3ba and 3ca) with TCEP (0.05 mmol, 14 mg for 3ac, 3ba and 3ca) for 30 min, was added. TCEP-HCl was neutralized with 10% NaOH prior to its use. The mixture was left to react for 30 min for the preparation of 4ac or 1 h for 4ba and 4ca. After completion of the reactions, as indicated by tlc analysis, the mixtures were concentrated in vacuo and washed with EtOAc or CH2Cl2/Brine. Conjugates 4ac and 4ca, were purified by flash column chromatography (silica gel, petroleum ether: EtOAc, 2:1→1:1→1:2), whereas for 4ba the crude mixture was characterised.

Characterisation Details of synthesized 5-hydroxy-pyrrolidin-2-ones 1-benzyl-5-hydroxy-4-((2-hydroxyethyl)thio)-5-methylpyrrolidin-2-one (4aa)(4'aa)

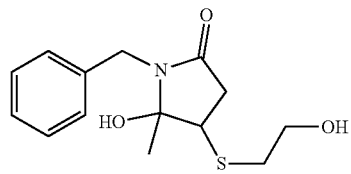

-continued

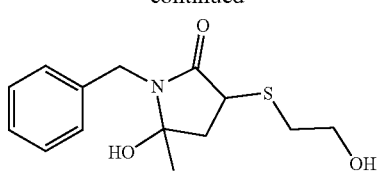

This example provides a compound of the invention in which the $R_1$, $R_2$ and/or $R_3$ groups represent a carbon-containing moiety (i.e. alkyl moiety); a (poly)aromatic moiety (functional group), and a thiol containing moiety.

Compound 4aa was produced as a separable 1.6:1 mixture of diastereoisomers.

Yield 51% (25 mg) for the major isomer. $^1$H NMR (500 MHz, CDCl$_3$): δ=7.30 (m, 1H), 7.24 (m, 1H), 6.05 (brs, 1H), 4.68 (d, J=15.5 Hz, 1H), 4.54 (brs, 1H), 4.36 (d, J=15.5 Hz, 1H), 3.84 (brs, 1H), 3.73 (t, J=8.9 Hz, 1H), 2.95 (td, J$_1$=15.0 Hz, J$_2$=3.8 Hz, 1H), 2.79 (m, 1H), 2.66 (dd, J$_1$=14.1 Hz, J$_2$=9.3 Hz, 1H), 1.96 (dd, J$_1$=14.1 Hz, J$_2$=8.5 Hz, 1H), 1.36 (s, 3H) ppm; $^{13}$C NMR (125 MHz, CDCl$_3$): δ=176.7, 137.6, 128.7 (2C), 127.6 (2C), 127.4, 88.2, 63.1, 43.8, 42.8, 43.4, 42.8, 27.1 ppm; HRMS (TOF ESI): calcd for C$_{14}$H$_{20}$NO$_3$S$^+$: 282.1158 [M+H]$^+$; found: 282.1172.

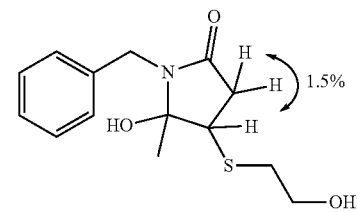

0.5% and 0.3%

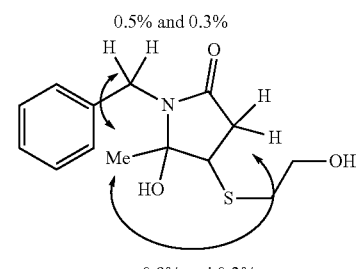

0.9% and 0.3%

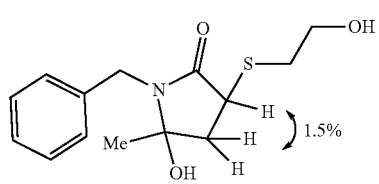

1.5%

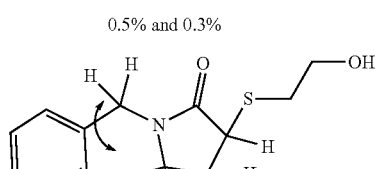

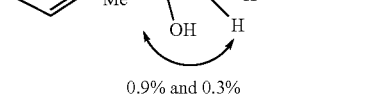

0.9% and 0.3%

5-hydroxy-4-((2-hydroxyethyl)thio)-5-methyl-1-(prop-2-yn-1-yl)pyrrolidin-2-one (4ab)(4'ab)

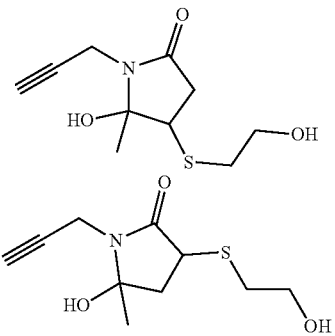

This example provides a compound of the invention in which the $R_1$, $R_2$ and/or $R_3$ groups represent a carbon-containing moiety (i.e. alkyl moiety); an alkyne moiety (functional group), and a thiol containing moiety.

Compound 4ab was produced as an inseparable 1.4:1 mixture of diastereoisomers. Yield 50% (17 mg). $^1$H NMR (500 MHz, CDCl$_3$): δ=5.52 (brs, 1H for one diastereoisomers), 4.62 (brs, 1H for one diastereoisomer), 4.15 (dd, J$_1$=17.7 Hz, J$_2$=2.5 Hz, 1H for one diastereoisomer), 4.10 (t, J=2.4 Hz, 2H for one diastereoisomer), 4.02 (dd, J$_1$=17.7 Hz, J$_2$=2.5 Hz, 1H for one diastereoisomer), 3.83 (m, 2H for both diastereoisomer), 3.72 (t, J=8.9, 1H for one diastereoisomers), 4.62 (dd, J$_1$=9.0 Hz, J$_2$=4.9 Hz, 1H for one diastereoisomer), 3.04 (dt, J$_1$=14.6 Hz, J$_2$=5.2 Hz, 1H for one diastereoisomer), 2.93 (m, 1H for one diastereoisomers), 2.81 (m, 2H for both diastereoisomers), 2.65 (m, 2H for both diastereoisomers), 2.24 (t, J=2.5, 1H for one diastereoisomer), 2.20 (t, J=2.5, 1H for one diastereoisomer), 2.05 (dd, J$_1$=14.2 Hz, J$_2$=4.9 Hz, 1H for one diastereoisomer), 1.96 (dd, J$_1$=14.0 Hz, J$_2$=8.7 Hz, 1H for one diastereoisomer), 1.63 (s, 3H for one diastereoisomer), 1.59 (s, 3H for one diastereoisomer) ppm; $^{13}$C NMR (125 MHz, CDCl$_3$): δ=175.4, 173.2, 88.6, 87.9, 79.0, 78.9, 71.6, 71.2, 62.7, 62.2, 60.3, 43.4, 43.0, 42.9, 41.6, 41.2, 37.6, 36.0, 28.0, 27.8, 26.5, 25.8; HRMS (TOF ESI): calcd for C$_{10}$H$_{16}$NO$_3$S$^+$: 230.0845 [M+H]$^+$; found: 230.0840.

5-hydroxy-4-((2-hydroxyethyl)thio)-5-methyl-1-(pyren-2-ylmethyl)pyrrolidin-2-one (4ac)(4'ac)

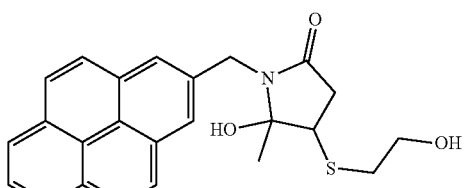

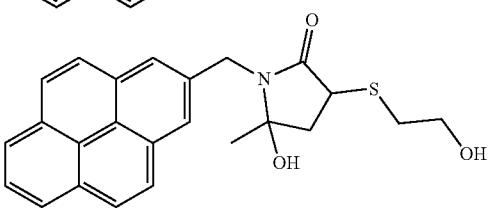

This example provides a compound of the invention in which the $R_1$, $R_2$ and/or $R_3$ groups represent a carbon-containing moiety (i.e. alkyl moiety); a (poly)aromatic moiety (functional group), and a thiol containing moiety.

Compound 4ac was produced as a separable 1.3:1 mixture of diastereoisomers.

Yield 30% (6.6 mg), for the major isomer. $^1$H NMR (500 MHz, CHCl$_3$): δ=8.40 (d, J=9.3 Hz, 1H), 8.21 (d, J=4.2 Hz, 1H), 8.19 (d, J=4.2 Hz, 1H), 8.16 (d, J=9.3 Hz, 1H), 8.13 (d, J=7.8 Hz, 1H), 8.04 (m, 3H), 7.96 (d, J=7.8 Hz, 1H), 5.35 (d, J=6.4 Hz, 1H), 5.30 (d, J=6.4 Hz, 1H), 4.03-3.83 (m, 2H), 3.84 (dd, J$_1$=8.6 Hz, J$_2$=3.2 Hz, 1H), 3.23 (ddd, J$_1$=14.7 Hz, J$_2$=6.5 Hz, J$_3$=3.7 Hz, 1H), 2.95-2.87 (m, 2H), 2.62 (dd, J$_1$=14.4 Hz, J$_2$=8.6 Hz, 1H), 2.08 (dd, J$_1$=14.4 Hz, J$_2$=3.2 Hz, 1H), 1.28 (s, 3H) ppm; $^{13}$C NMR (125 MHz, CDCl$_3$): δ=174.1, 131.3, 130.9, 130.7, 130.6, 128.5, 128.1, 127.4 (2C), 126.14, 126.1, 125.4, 125.3, 124.9, 124.7, 122.7, 89.7, 62.8, 42.9, 41.1, 40.9, 36.1, 26.2 ppm.

1-Benzyl-5-hydroxy-4-((2-hydroxyethyl)thio)-5-pentylpyrrolidin-2-one (4ba)(4'ba)

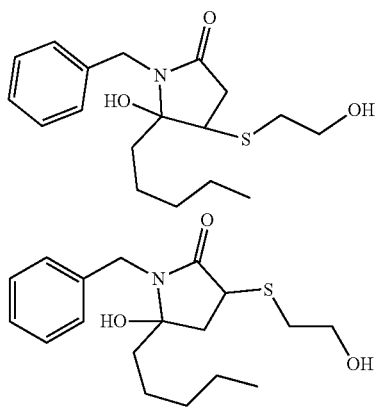

This example provides a compound of the invention in which the $R_1$, $R_2$ and/or $R_3$ groups represent a carbon-containing moiety (i.e. alkyl moiety); a (poly)aromatic moiety (functional group), and a thiol containing moiety.

Compound 4ba was produced as an inseparable 4:1 mixture of diastereoisomers. Yield 25% (4.6 mg). $^1$H NMR (500 MHz, CDCl$_3$): $^1$H NMR (500 MHz, CDCl$_3$): δ=7.29 (m, 5H for both diastereoisomers), 4.57 (d, J=6.8, 1H for both diastereoisomers), 4.43 (m, 2H for both diastereoisomers), 3.86 (m, 2H for both diastereoisomers), 3.74 (t, J=9.0 Hz, 1H for one diastereoisomer), 3.65 (m, 1H for one diastereoisomer), 3.08 (m, 1H for one diastereoisomer), 2.94 (m, 1H for one diastereoisomer), 2.87-2.73 (m, 2H for one diastereoisomer), 2.66 (dd, J$_1$=14.5 Hz, J$_2$=9.0 Hz, 1H for one diastereoisomer), 2.54 (dd, J$_1$=14.2 Hz, J$_2$=9.4 Hz, 1H for one diastereoisomer), 1.98 (dd, J$_1$=14.2 Hz, J$_2$=9.0 Hz, 1H for one diastereoisomer), 1.92 (dd, J$_1$=14.5 Hz, J$_2$=4.4 Hz, 1H for one diastereoisomer), 1.74 (m, 2H for both diastereoisomers), 1.45 (m, 2H for both diastereoisomers), 1.28 (m, 2H for both diastereoisomers), 1.15 (m, 2H for both diastereoisomers), 1.02 (brs, 2H for both diastereoisomers), 0.89 (t, J=6.9, 3H for one diastereoisomer), 0.80 (t, J=6.8, 3H for one diastereoisomer) ppm; $^{13}$C NMR: not available 1-Benzyl-5-hydroxy-4-((2-hydroxyethyl)thio)-5-(4-iodobutyl)pyrrolidin-2-one (4ca)(4'ca)

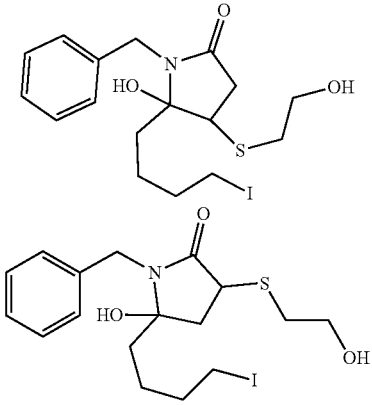

This example provides a compound of the invention in which the $R_1$, $R_2$ and/or $R_3$ groups represent a carbon-containing moiety (i.e. alkyl moiety); a (poly)aromatic moiety (functional group), and a thiol containing moiety.

Compound 4ca was produced as a separable 4:1 mixture of diastereoisomers.

Yield 25% (5.6 mg), for the major isomer. $^1$H NMR (500 MHz, CDCl$_3$): δ=7.32 (m, 5H), 4.57 (d, J=15.3, 1H), 4.45 (d, J=15.3, 1H), 3.9 (m, 2H), 3.73 (t, J=9.0, 1H), 3.68 (m, 2H), 3.38 (brs, 1H), 2.98 (dt, J$_1$=15.2 Hz, J$_2$=4.0 Hz, 1H), 2.85 (m, 1H), 2.67 (t, J=5.9, 2H), 2.54 (dd, J$_1$=14.2 Hz, J$_2$=9.4 Hz, 1H), 2.37 (t, J=5.9, 2H), 2.00 (dd, J$_1$=14.2 Hz, J$_2$=8.4 Hz, 1H), 1.78 (td, J$_1$=13.1 Hz, J$_2$=3.9 Hz, 1H), 1.27 (m, 1H), 1.19 (m, 1H), 0.88 (m, 1H) ppm; $^{13}$C NMR: not available.

Ethyl 3-(1-benzyl-2-hydroxy-3-((2-hydroxyethyl)thio)-5-oxopyrrolidin-2-yl) propanoate (4da)(4'da)

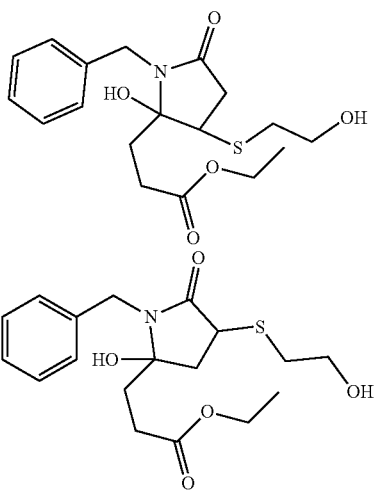

This example provides a compound of the invention in which the $R_1$, $R_2$ and/or $R_3$ groups represent a carbon-containing moiety (i.e. ester moiety); a poly(aromatic) moiety (functional group), and a thiol containing moiety.

Compound 4da was produced as a separable 1.2:1 mixture of diastereoisomers.

Yield 38% (24 mg), for the major isomer. $^1$H NMR (500 MHz, CDCl$_3$): δ=7.31 (m, 5H), 4.57 (d, J=15.3, 1H), 5.58 (brs, 1H), 4.76 (brs, 1H), 4.68 (d, J=15.5, 1H), 4.35 (d, J=15.5, 1H), 4.09 (q, J=7.2, 2H), 3.85 (brs, 1H), 3.74 (t, J=8.8, 1H), 2.97 (td, J$_1$=14.9 Hz, J$_2$=4.1 Hz, 1H), 2.82 (td, J$_1$=14.9 Hz, J$_2$=5.7 Hz, 1H), 2.78-2.70 (m, 1H), 2.38 (td, J$_1$=16.8 Hz, J$_2$=7.8 Hz, 1H), 2.24 (m, 1H), 2.17 (m, 1H), 1.92 (dd, J$_1$=14.0 Hz, J$_2$=8.2 Hz, 1H), 1.72 (m, 1H), 1.22 (t, J=15.5, 3H); $^{13}$C NMR (125 MHz, CDCl$_3$): δ=176.7, 173.7, 137.5, 128.7 (2C), 127.8 (2C), 127.5, 89.9, 62.9, 61.0, 42.9, 42.8, 41.0, 37.8, 34.2, 28.8, 14.1 ppm.

Stereochemical Analysis

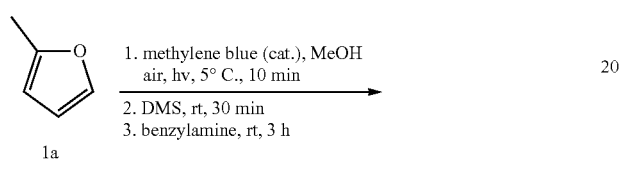

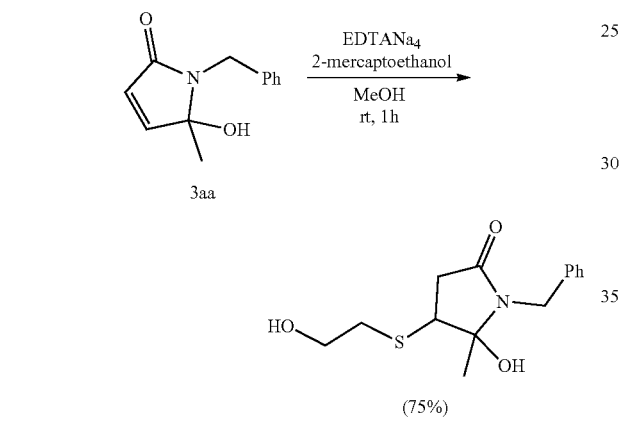

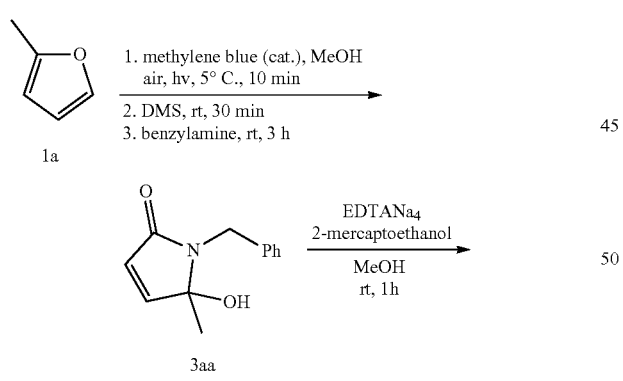

A mixture of the following isomers is obtained (data not shown):

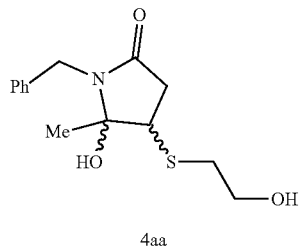

4aa

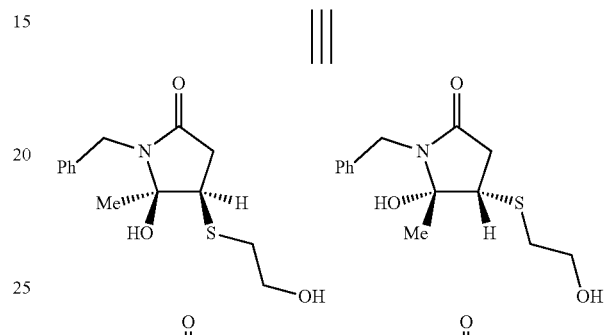

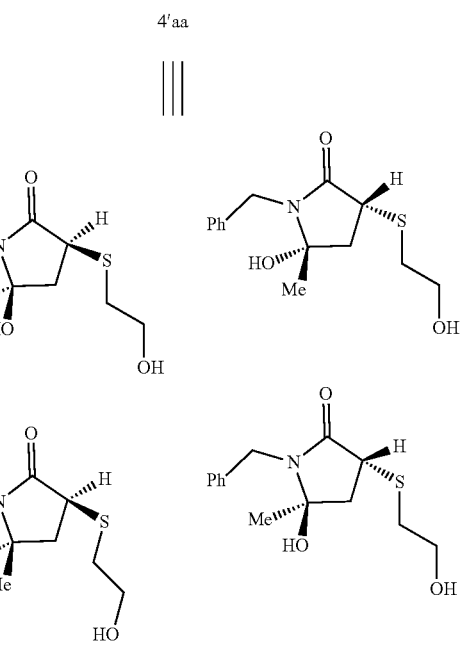

4'aa

The isomerization occurs very fast. After 2 h In a mixture of MeOH/water (1:1) at 37° C. one can observe that the ratio between isomers is 1:1 (data not shown).

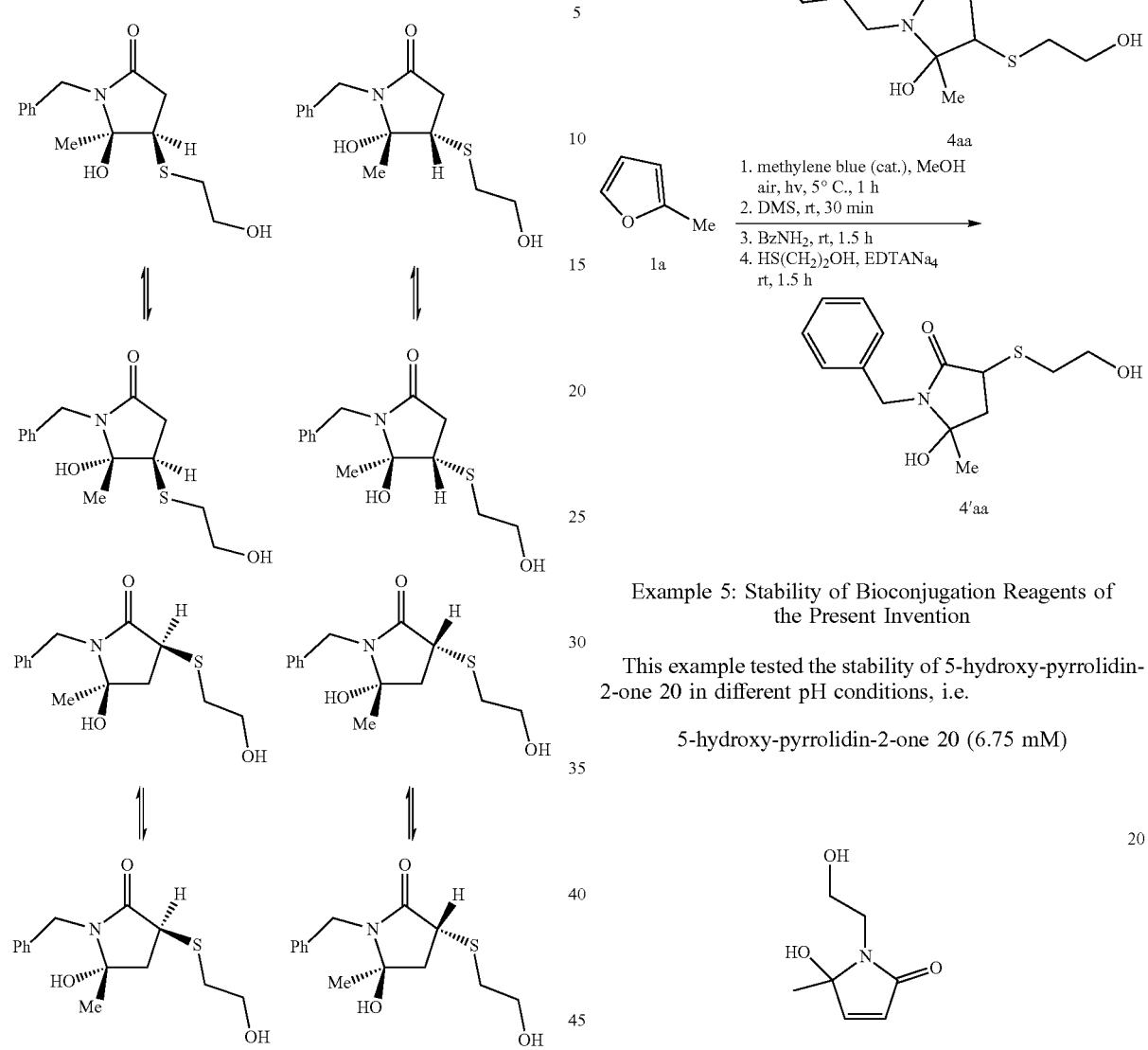

Stability Studies of the Thiol Adducts

To check the stability, one of the isomers of 17 was dissolved in appropriate buffer, incubated in 37° C. for 24 hours). According to HPLC after 24 hours at each pH compound 17 is stable, no hydrolysis, elimination of water or retro-Michael reaction was observed (data not shown).

Example 4: One-pot synthesis of 5-hydroxy-4-thiopyrrolidin-2-ones

General Synthesis Route

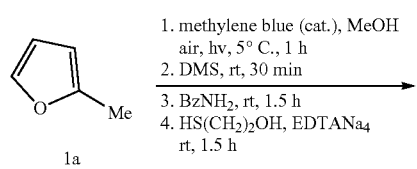

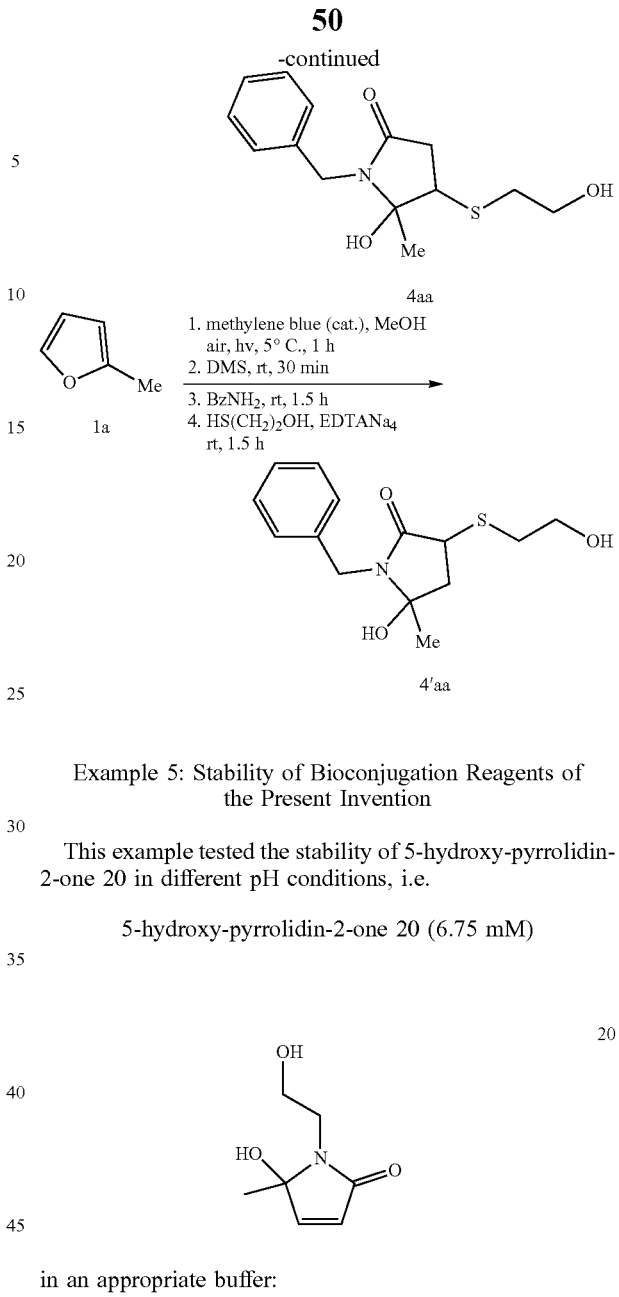

Example 5: Stability of Bioconjugation Reagents of the Present Invention

This example tested the stability of 5-hydroxy-pyrrolidin-2-one 20 in different pH conditions, i.e.

5-hydroxy-pyrrolidin-2-one 20 (6.75 mM)

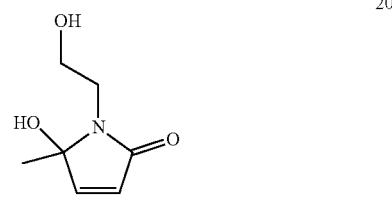

in an appropriate buffer:
A) MES (pH=6.0; 0.1 M),
B) sodium phosphate buffer (pH=7.0; 0.1 M),
C) sodium borate buffer (pH=8.0; 0.1 M) incubated at 37° C.

Compound 20 was dissolved in appropriate buffers pH 6, 7 and 8, incubated at 37° C. and shaken in the dark for 24 h. The stability was checked using HPLC [Phenomenex Luna C18 column using a flow rate of 1 mL/min; H$_2$O method: 3 minutes column flushing with 100% H$_2$O, then a gradient from 0 to 100% ACN in 20 minutes, followed by 5 minutes of flushing with 100% ACN]. The corresponding chromatograms illustrated the stability of compound 20 under various pH conditions (data not shown).

Example 6: Experiments with Peptides

This example provides a synthesis route for a compound of the invention in which the R$_1$, R$_2$ and/or R$_3$ groups represent a carbon-containing moiety (i.e. alkyl moiety); a PEG moiety (biomolecule), and a thiol containing moiety.

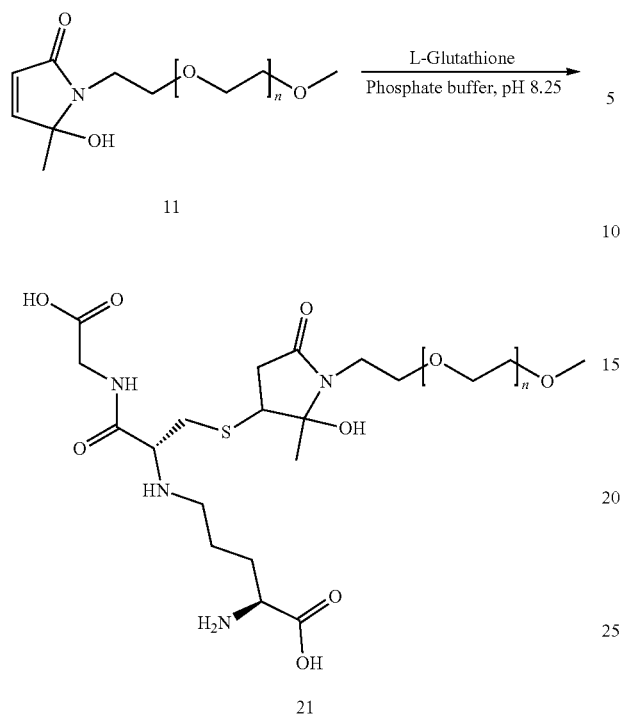

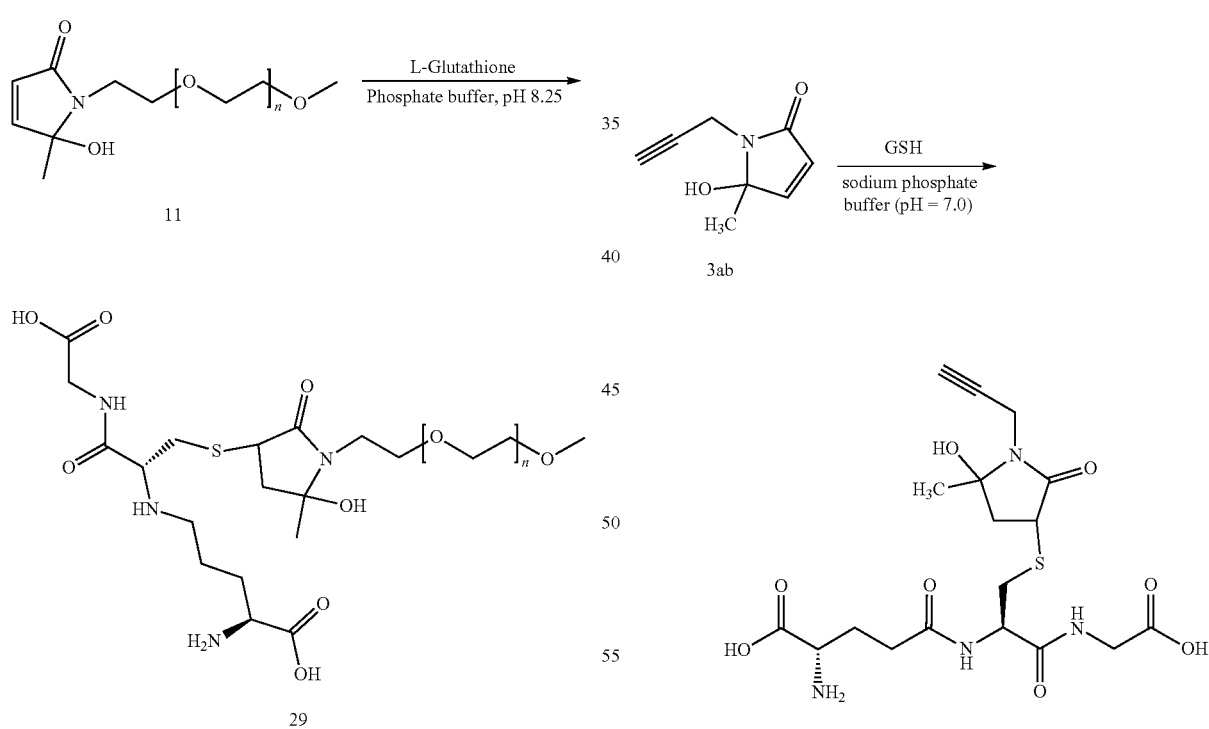

11.13 mg of 11 was dissolved in 1 mL pH 8.25 phosphate buffer (0.1M), 2.31 mg (0.007 mmol) of L-glutathione was added. The mixture was shaken, progress was monitored by HPLC. For this experiment an excess of 21 was used, all of the L-glutathione was coupled.

MS analysis: exact mass calculated (compound (n=34)+H+): 2020.1166, masses detected: 2020.0.

This example provides a synthesis route for a compound of the invention in which the $R_1$, $R_2$ and/or $R_3$ groups represent a carbon-containing moiety (i.e. alkyl moiety); a PEG moiety (biomolecule), and a thiol containing moiety.

Example 8: Follow-Up Compounds

This example provides a synthesis route for follow-up compounds of the invention, suitable for subsequent thiol addition.

Dehydration to the 5-ylidenepyrrol-2 (5H)-ones
General procedure for the preparation of 5-ylidenepyrrol-2 (5H)-ones
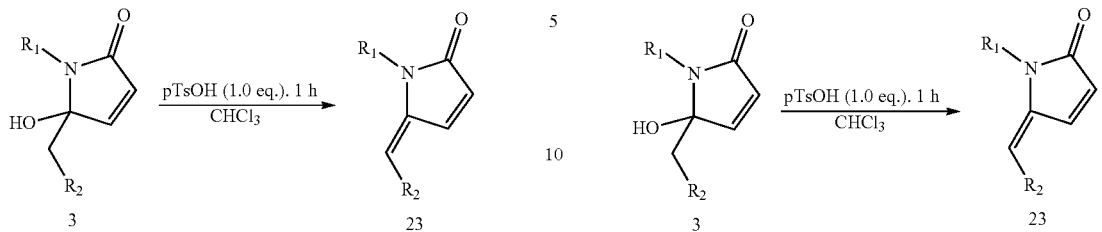
| Entry | Lactam | Dehydrated lactam | Isolated yield [%] |
|---|---|---|---|
| 1 | 3aa | 23aa | 30 |
| 2 | 3ab | 23ab | 60 |
| 3 | 3ba | 23ba | 55 |
| 4 | 3da | 23da | 31 |
| 5 | 3ea | 23ea | 61 |

To the crude mixture of the α,β-unsaturated γ-lactam 3aa (0.5 mmol, 45 μL of 1a) or the purified lactams 3ab (0.15 mmol, 22 mg), 3ba (0.51 mmol, 132 mg), 3da (0.36 mmol, 87 mg) and 3ea (0.05 mmol, 12.5 mg), p-TsOH (0.5 mmol, 95 mg for 3aa, 3da or 0.15 mmol, 28 mg for 3ab or 0.51 mmol, 97 mg for 3ba or 0.05 mmol, 10 mg for 3ea2) was added in CHCl$_3$ (2 mL) and the mixtures were stirred for 1 h. After completion of the reactions, as indicated by tlc analysis, the mixtures were concentrated in vacuo. Doubly oxidised lactams 23aa and 23da, were purified by flash column chromatography (silica gel, petroleum ether: EtOAc, 5:1-2:1 for 23aa or 1:1 for 23da), whereas for 23ab, 23ba and 23ea the crude mixtures was characterised.

1-Benzyl-5-methylene-1H-pyrrol-2 (5H)-one (23aa)

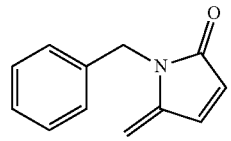

Yield 30% (28 mg). $^1$H NMR (500 MHz, CHCl$_3$): δ=7.30 (m, 2H), 7.24 (t, J=7.3 Hz, 1H), 7.19 (d, J=7.4 Hz, 2H), 7.00 (d, J=5.8 Hz, 1H), 6.27 (dd, J$_1$=5.8 Hz, J$_2$=0.8 Hz, 1H), 4.28 (m, 3H), 4.79 (d, J=1.6 Hz, 1H) ppm; $^{13}$C NMR (125 MHz, CDCl$_3$): δ=170.4, 145.1, 137.5, 137.0, 128.6 (2C), 127.3, 126.9 (2C), 124.9, 97.6, 42.6 ppm.

5-Methylene-1-(prop-2-yn-1-yl)-1H-pyrrol-2 (5H)-one (23ab)

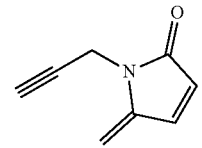

Yield 60% (12 mg). $^1$H NMR (500 MHz, CHCl$_3$): δ=7.01 (d, J=5.8 Hz, 1H), 6.20 (dd, J$_1$=5.8 Hz, J$_2$=1.1 Hz, 1H), 5.12 (t, J=2.0 Hz, 1H), 4.94 (d, J=2.0 Hz, 1H), 4.41 (d, J=2.6 Hz, 2H), 2.21 (t, J=2.6 Hz, 1H) ppm; $^{13}$C NMR (125 MHz, CDCl$_3$): δ=169.2, 144.2, 137.8, 124.7, 97.7, 77.8, 71.8, 28.2 ppm.

(E)-1-Benzyl-5-pentylidene-1H-pyrrol-2 (5H)-one (23ba)

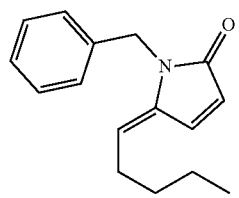 [SMILES: CCCC/C=C1\C=CC(=O)N1Cc1ccccc1]

Yield 55% (68 mg). $^1$H NMR (500 MHz, CHCl$_3$): δ=7.28 (m, 3H), 7.22 (m, 1H), 7.16 (m, 2H), 6.24 (dd, J$_1$=6.0 Hz, J$_2$=1.7 Hz, 1H), 5.33 (td, J$_1$=8.3 Hz, J$_2$=1.1 Hz, 1H), 4.83 (s, 2H), 2.25 (q, J=7.6 Hz, 2H), 1.34 (m, 2H), 1.23 (m, 2H), 0.85 (t, J=7.3 Hz, 3H) ppm; $^{13}$C NMR (125 MHz, CDCl$_3$): δ=170.1, 139.2, 137.3, 132.6.7, 128.5 (2C), 127.1, 126.7 (2C), 123.8, 116.8, 42.5, 32.1, 27.2, 21.9, 13.7 ppm.

(E)-ethyl 3-(1-benzyl-5-oxo-1H-pyrrol-2 (5H)-ylidene) propanoate (23da)

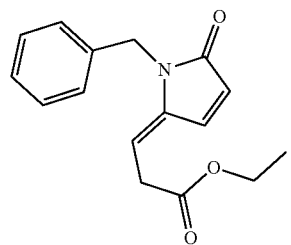 [SMILES: CCOC(=O)C/C=C1\C=CC(=O)N1Cc1ccccc1]

Yield 31% (30 mg). $^1$H NMR (500 MHz, CDCl$_3$): δ=7.29 (m, 2H), 7.25 (d, J=6.0 Hz, 1H), 7.22 (t, J=3.7 Hz, 1H), 7.19 (d, J=7.3 Hz, 2H), 6.31 (dd, J$_1$=6.0 Hz, J$_2$=1.5 Hz, 1H), 5.45 (td, J$_1$=8.1 Hz, J$_2$=0.9 Hz, 1H), 4.84 (s, 2H), 4.11 (q, J=7.2 Hz, 2H), 3.27 (d, J=8.1 Hz, 2H), 1.21 (t, J=7.2 Hz, 3H) ppm; $^{13}$C NMR (125 MHz, CDCl$_3$): δ=170.3, 170.0, 141.1, 137.0, 132.4, 128.6 (2C), 127.3, 127.0 (2C), 125.2, 106.2, 61.2, 42.6, 33.0, 14.1 ppm.

(E)-1-Benzyl-5-(but-3-en-1-ylidene)-1H-pyrrol-2 (5H)-one (23ea)

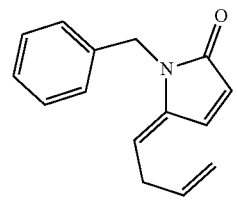 [SMILES: C=CC/C=C1\C=CC(=O)N1Cc1ccccc1]

Yield 61% (7 mg). $^1$H NMR (500 MHz, CDCl$_3$): δ=7.30 (m, 4H), 7.20 (d, J=7.4 Hz, 1H), 6.30 (dd, J$_1$=5.9 Hz, J$_2$=1.5 Hz, 1H), 5.83-5.75 (m, 1H), 5.35 (d, J=7.3 Hz, 2H), 5.01 (dd, J$_1$=10.2 Hz, J$_2$=1.4 Hz, 1H), 4.91 (dd, J$_1$=17.2 Hz, J$_2$=1.5 Hz, 1H), 4.87 (s, 2H), 3.03 (dd, J$_1$=7.9 Hz, J$_2$=6.2 Hz, 2H) ppm; $^{13}$C NMR (125 MHz, CDCl$_3$): δ=170.1, 140.0, 137.3, 135.5, 132.6, 128.6 (2C), 127.2, 126.8 (2C), 124.5, 116.1, 112.8, 42.6, 31.3 ppm.

First thiol addition to the 5-ylidenepyrrol-2 (5H)-ones

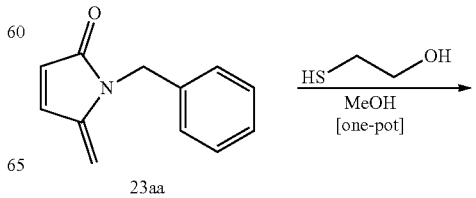

-continued

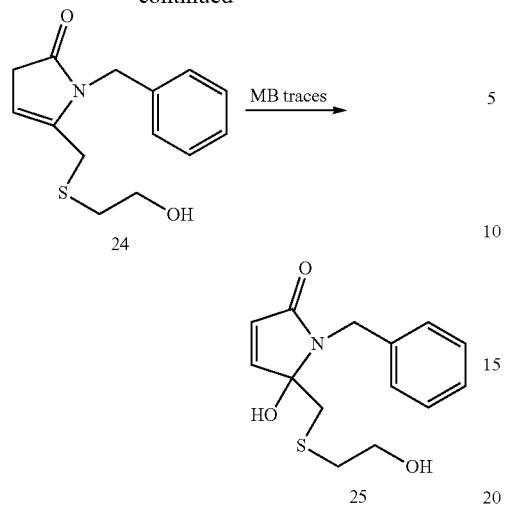

1-benzyl-5-hydroxy-5-(((2-hydroxyethyl)thio)methyl)-1H-pyrrol-2 (5H)-one (25)

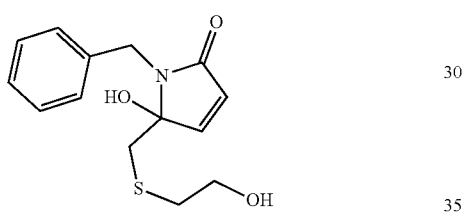

The purified lactam containing trace amounts of MB 23aa (0.09 mmol, 16 mg) was dissolved in MeOH (2 mL) and mercaptoethanol (0.11 mmol, 8 μL) was added. Reaction was left for 18 h stirring and then the mixture was concentrated in vacuo. Conjugate 25 was purified by flash column chromatography (silica gel, petroleum ether: EtOAc, 2:1→1:1→1:2).

Yield 29% (7 mg). $^1$H NMR (500 MHz, CHCl$_3$): δ=7.33 (m, 3H), 7.29 (m, 2H), 7.12 (d, J=6.0 Hz, 1H), 6.21 (d, J=6.0 Hz, 1H), 4.70 (d, J=15.6 Hz, 1H), 4.41 (d, J=15.6 Hz, 1H), 3.74-3.65 (m, 2H), 2.91 (d, J=14.1 Hz, 1H), 2.73 (m, 1H), 2.59 (m, 2H) ppm; $^{13}$C NMR (125 MHz, CDCl$_3$): δ=169.6, 148.6, 138.0, 128.6 (2C), 128.0 (2C), 127.5, 92.3, 61.3, 41.8, 39.1, 36.9 ppm;

Example 9: Overview of Possibilities Using the Bioconjugation Reagents of the Invention This example provides some exemplary applications of the bioconjugation reagents of the present invention, although the invention is certainly not limited hereto:

Synthesis of Sulfhydryl-Reactive Crosslinkers

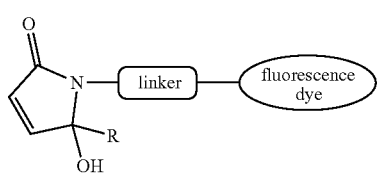

-continued

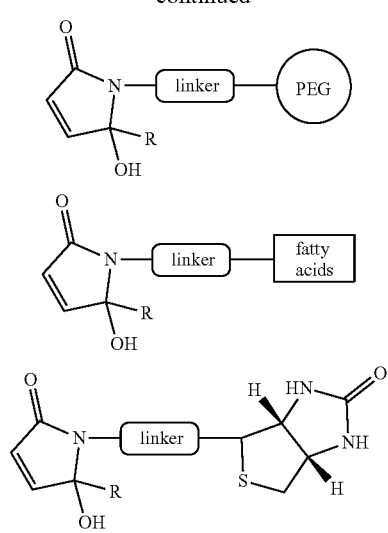

Synthesis of Homobisfunctional Crosslinkers

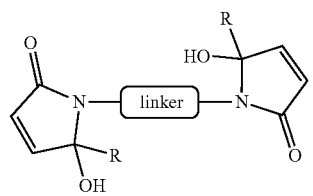

Synthesis of Heterobisfunctional Crosslinkers

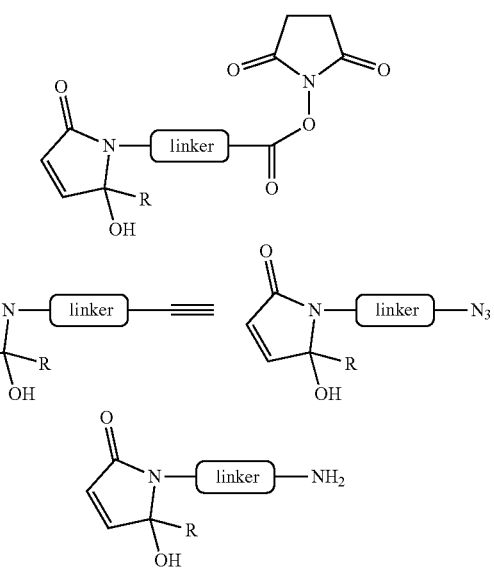

Detailed Synthesis Route

This example provides a synthesis route for a compound of the invention in which the R$_1$ and/or R$_2$ groups represent a carbon-containing moiety (i.e. amide moiety) and an ester moiety (functional moiety) i.e. NHS ester.

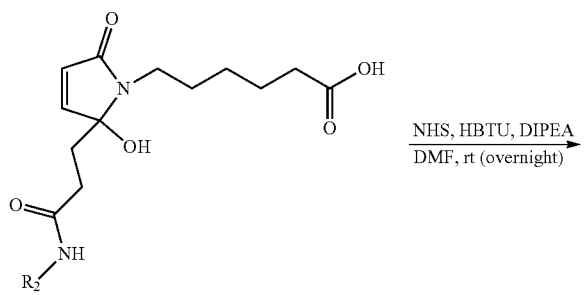

$R_2 = C_{18}H_{35}$ (9)
$R_2 = C_{12}H_{25}$ (10)

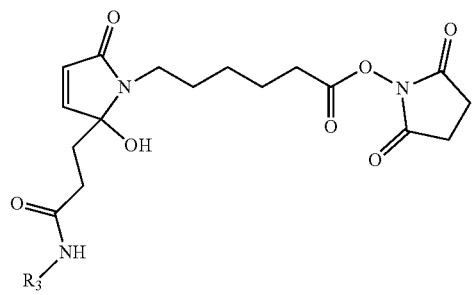

$R_3 = C_{18}H_{35}$ (26)
$R_3 = C_{12}H_{25}$ (27)

Compound 26 was synthesised from 9 (0.0693 mmol, 0.037 g) and N-hydroxy-succinimide (0.1386 mmol, 0.016 g). The following solvent system for the TLC-analysis should be used to check the progress of the reaction. 80% EtOAc/20% MeOH. A reversed phase automatic column (generic C18 4 g, a gradient elution with water to 100% acetonitrile) gave the desired product (0.0193 g, 44%) as pink-red oil.

1H NMR (400 MHz, MeOD) δ 6.97 (d, J=6.0 Hz, 1H, CHCHCONR2), 6.05 (d, J=6.0 Hz, 1H, CHCHCONR2), 5.35 (dd, J=12.4, 7.7 Hz, 2H, CH2CHCHCH2), 3.23-3.05 (m, 4H, CONRCH2CH2 and CONHCH2CH2), 2.83 (s, 4H, RN(COCH2)2), 2.65 (t, J=7.3 Hz, 2H, CqCH2CH2CONHR), 2.12-1.94 (m, 6H, CH2CHCHCH2 and CONRCH2CH2CH2CH2COONR2), 1.73 (ddd, J=20.5, 14.2, 7.2 Hz, 2H, CqCH2CH2CONHR), 1.52-1.40 (m, 4H, CONRCH2CH2CH2CH2CH2), 1.30 (d, J=9.4 Hz, 26H, CONRCH2CH2CH2CH2CH2 and CONHCH2(CH2) 6CH2 (CH) 2CH2 (CH2) 6CH3), 0.90 (t, J=6.8 Hz, 3H, CONHCH2(CH2) 6CH2 (CH) 2CH2 (CH2) 6CH3).

13C NMR (101 MHz, MeOD) δ 174.99, 172.37, 170.33, 151.59, 131.17, 127.56, 94.12, 41.26, 39.24, 33.83, 33.28, 32.45, 31.72, 31.47, 31.10, 30.59, 29.63, 28.35, 28.23, 27.62, 26.79, 25.56, 23.95, 14.67.

LCMS: m/z [M+H−H2O] calculated for compound 26:614.4007, found: 614.3.

Compound 27 was prepared from 10 (0.167 mmol, 0.0755 g) and N-hydroxysuccinimde (0.334 mmol, 0.038 g). A reversed phase automatic column (generic C18 4 g, gradient elution of water and acetonitrile, presence: 83% acetonitrile) gave the desired product (0.059 g, 64%) as a green oil.

1H NMR (400 MHz, MeOD) δ 6.97 (d, J=6.0 Hz, 1H, CHCHCONR2), 6.05 (d, J=6.0 Hz, 1H, CHCHCONR2), 3.22-3.06 (m, 4H, CONRCH2CH2 and CONHCH2CH2), 2.83 (s, 4H, RN(COCH2)2), 2.65 (t, J=7.4 Hz, 2H, CqCH2CH2CONHR), 2.06 (dd, J=19.5, 12.7 Hz, 2H, CONRCH2CH2CH2CH2CH2COONR2), 1.82-1.61 (m, 2H, CqCH2CH2CONHR), 1.52-1.39 (m, 4H, CONRCH2CH2CH2CH2CH2), 1.29 (s, 22H, CONHCH2 (CH2)10CH3 and CONRCH2CH2CH2CH2CH2), 0.90 (t, J=6.8 Hz, 3H, CONHCH2(CH2)10CH3).

13C NMR (101 MHz, MeOD) δ 174.03, 171.35, 169.69, 150.94, 126.92, 93.49, 40.33, 38.97, 32.70, 31.81, 31.05, 30.79, 30.33, 30.05, 29.91, 28.99, 27.59, 26.98, 26.07, 24.97, 23.34, 14.01.

LCMS: m/z [M+H−H2O] calculated for compound 27:532.3224, found: 532.2.

This example provides a synthesis route for a compound of the invention in which the $R_1$ and/or $R_2$ groups represent a carbon-containing moiety (i.e. alkyl) and an ester moiety (functional moiety) i.e. NHS ester.

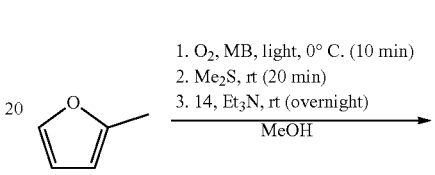

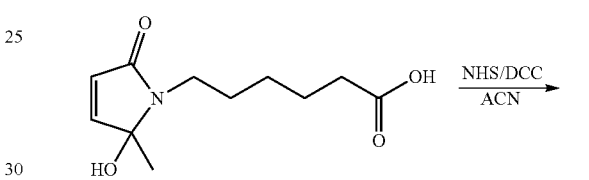

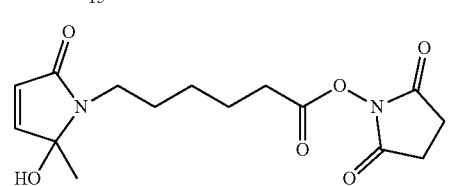

2-methylfuran (1.0 mmol, 90 µL) was dissolved in MeOH (10 mL) containing catalytic amounts of methylene blue (2 mol %, 7.5 mg). The solution was cooled with an ice bath. Oxygen was gently bubbled through the solution while irradiated with a xenon Variac Eimac Cermax 300 W lamp. The reaction was monitored by TLC. After completion of the reaction (10 min), the solution was warmed to rt and Me2S (2 mmol, 146 µL) was added. The reaction was stirred for 30 min. Then, 6-aminohexanoic acid (1.1 mmol, 145 mg) and Et3N (2 mmol, 140 µL) were added and the mixture was stirred overnight at rt. The solvent was removed via evaporation. The crude product was dissolved again in acetonitrile. N-Hydroxysuccinimide (1.1 mmol) was added en the mixture was cooled with an ice bath. 1 mmol DCC was added as a solution in acetonitrile and the reaction mixture was stirred for 2 h at 0° C. The mixture was warmed to rt and stirred overnight. The precipitation was filtered of and washed three times with cold acetonitrile. The reaction mixture was concentrated by evaporation and purified by prep RP-HPLC.

Calculated exact mass: 324.14, mass detected: 325.1 (=compound+H$^+$) and 307.1 (=compound+H$^+$−H2O).

Applications of Heterobisfunctional Crosslinkers

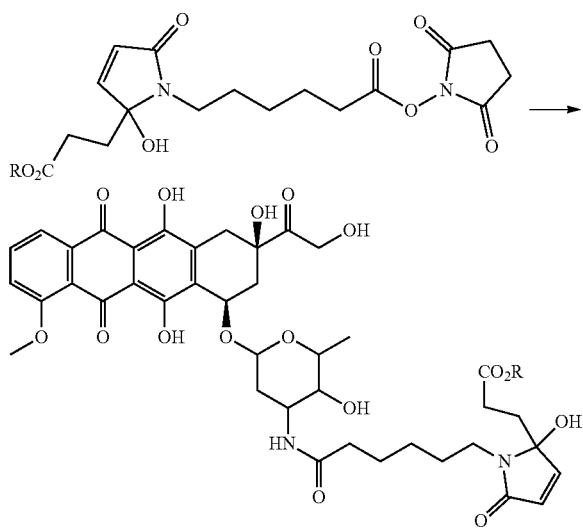

Example 10: Additional conjugations of 5-hydroxy-pyrrolidin-2-ones to thiols

General procedure:

The purified lactams were dissolved in acetonitrile (ACN) and H$_2$O, the pH was adjusted to 8 with NaOH and the thiol was added as a stock solution.

Synthesis of Compound 31

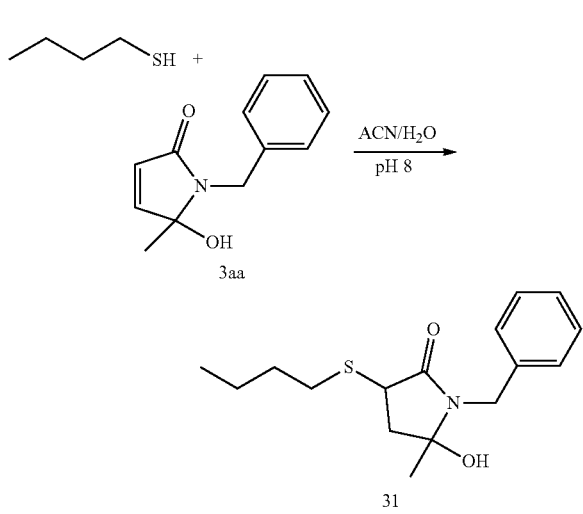

This example provides a compound of the invention in which the R$_1$, R$_2$ and R$_4$ groups represent a carbon-containing moiety (i.e. alkyl moiety); a (poly)aromatic moiety (functional group), and a saturated alkyl chain (functional group).

Compound 3aa (0.20 mmol, 40 mg) was dissolved in 5 mL ACN/H$_2$O (60/40) and the pH was adjusted to 8 with NaOH. Butane-thiol( ) was added as a ACN stock solution, the mixture was left to react for 1 hour at room temperature and concentrated in vacuo. The conjugate was purified by normal phase column chromatography (silica gel, Hexane:EtOAc, 5:1→7:3).

$^1$H NMR one isomer (400 MHz, ACN-d3): δ=7.33-7.20 (m, 5H), 4.51-4.29 (dd, 2H), 3.80 (s, 1H), 3.57 (dd, 1H), 2.83-2.67 (m, 2H), 2.64 (dd, 1H), 1.64-1.54 (m, 2H), 1.46-1.36 (m, 2H), 1.31 (s, 3H), 0.90 (t, 3H) ppm; $^{13}$C NMR (101 MHz, ACN-d3): δ=173.4, 140.1, 129.23 (2C), 128.46 (2C), 127.8, 43.86, 43.06, 42.31, 32.14, 31.65, 26.85, 22.68, 13.93 ppm.

Calculated exact mass: 293.14, masses found: 294.1 (compound+H$^+$) and 276.1 (compound+H$^+$–H$_2$O)

Synthesis of Compound 32

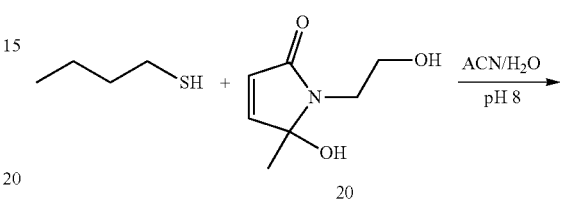

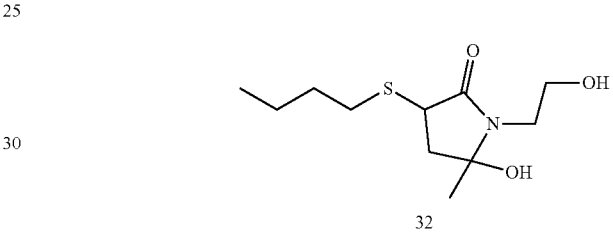

This example provides a compound of the invention in which the R$_1$, R$_2$ and R$_4$ groups represent a carbon-containing moiety (i.e. alkyl moiety); alkyl chain (functional group), and a saturated alkyl chain (functional group).

Compound 20 (0.50 mmol, 78 mg) was dissolved in 5 mL ACN/H$_2$O (50/50) and the pH was adjusted to 8 with NaOH. Butane-thiol (0.55 mmol, 99 mg) was added as a ACN stock solution, the mixture was left to react for 1 hour at room temperature and concentrated in vacuo. The conjugate was purified by preparative RP-HPLC.

$^1$H NMR one isomer (400 MHz, DMSO-d6): δ=5.91 (s, 1H), 4.78 (t, 1H), 3.56 (t, 1H) 3.45 (q, 2H) 3.31-3.05 (m, 2H), 2.66 (m, 2H) 2.51 (q, 1H), 1.82 (q, 1H), 1.51 (m, 2H), 1.35 (m, 2H), 1.33 (s, 3H), 0.87 (t, 3H) ppm; $^{13}$C NMR (101 MHz, DMSO-d6): δ=58.9, 43.0, 41.6, 41.2, 31, 30, 26.2, 21.5, 13.6 ppm.

Calculated exact mass: 247.12, masses found: 248.1 (compound+H$^+$) and 230.1 (compound+H$^+$–H$_2$O)

Synthesis of Compound 33

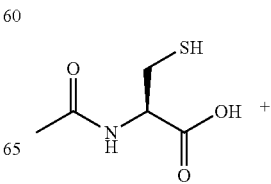

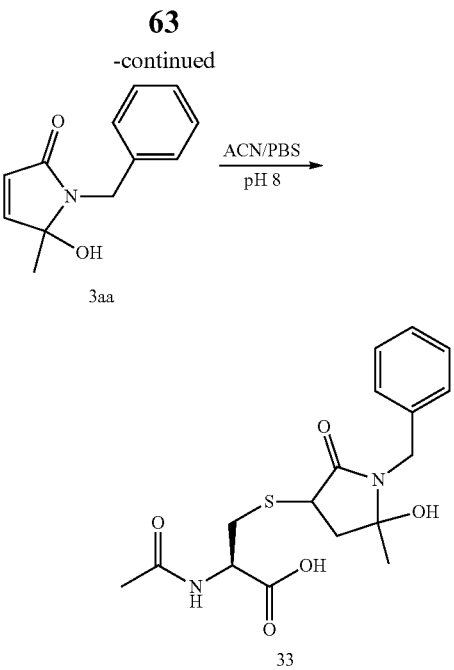

3aa

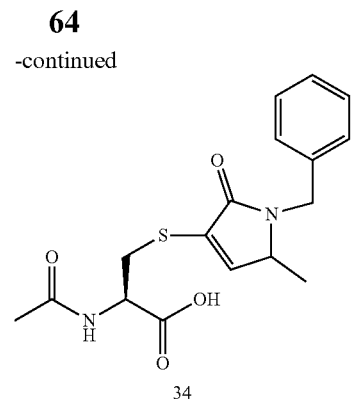

34

Compound 33 (15 mg) was dissolved in H₂O/ACN (50/50) containing 0.01% TFA and shaken overnight at room temperature. Crude product was analysed by LC-MS and NMR.

Calculated exact mass: 348.1, observed mass: 347.1 (compound−H⁺).

Example 11: Conjugations of 5-hydroxy-pyrrolidin-2-ones to biomolecules containing thiols General Procedure for the Conjugation to Glutathione These examples provide a synthesis route towards compounds of the invention.

Unsaturated lactams (3aa, 3ab, 20) were dissolved in aqueous solution (1.0 mL) followed by addition of GSH (1.3 equiv.). Reactions were incubated at room temperature and their progress was monitored by RP-HPLC. RP-HPLC analyses were performed as described previously using a Phenomenex Luna C18 column (250×4.6 mm, 5 μm particle size at 35° C.). A flow rate of 1 ml/min was used with the following solvent system: 0.1% TFA in H₂O (A) and MeCN (B). The column was flushed for 3 min with 100% A, then a gradient from 0 to 100% B over 15 min, followed by 5 min of flushing with 100% B.

Conjugation of Compound 3Aa with GSH

This example provides a compound of the invention in which the R₁, R₂ and R₄ groups represent a carbon-containing moiety (i.e. alkyl moiety); a (poly)aromatic moiety (functional group), and a cysteine moiety (biomolecule).

Compound 3aa (0.073 mmol, 15 mg) was dissolved in 10 mL ACN/PBS buffer (50/50) and the pH was adjusted to 8 with NaOH. N-Acety-L-Cysteine (0.073 mmol, 12 mg) was added and left to react for 3 hours. The reaction mixture was concentrated in vacuo and purified by preparative RP-HPLC.

Mixture of isomers was analysed by NMR:

1H NMR one isomer (400 MHz, DMSO-d6): δ=7.73 (d, 1H), 7.34-7.17 (m, 5H), 4.48-4.18 (m, 2H), 4.14 (m, 1H), 3.77 (m, 1H), 3.03 (m, 2H), 2.47-1.92 (m, 2H), 1.84 (s, 3H), 1.23 (s, 3H) ppm; ¹³C NMR (101 MHz, DMSO-d6): δ=173.25, 172.33, 169, 138.8, 127.36 (5C), 87.3, 53.5, 42.9, 41.9, 41.6, 41.3, 33.8, 27.5, 22.8 ppm.

Calculated exact mass: 366.12, masses found: 365.1 (compound−H⁺).

Synthesis of Compound 34

This example provides a compound of the invention in which the R₁, R₂ and R₄ groups represent a carbon-containing moiety (i.e. alkyl moiety); a (poly)aromatic moiety (functional group), and a cysteine moiety (biomolecule).

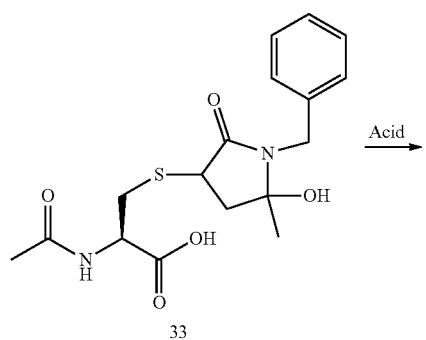

33

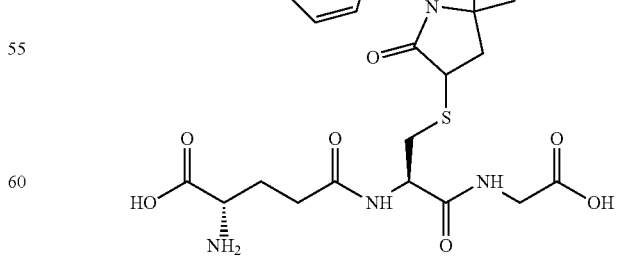

The reaction was accomplished according to the general experimental procedure described above, utilizing the lactam 3aa (0.010 μmol, 2 mg) and GSH (0.013 μmol, 4 mg)

in 5% (vol/vol) CH₃CN/1 M phosphate buffer pH 8.0 (1.0 mL). Reaction progress was monitored by HPLC (data not shown) and formation of the desired conjugate was confirmed by LC-MS analysis.

Calculated exact mass: 510.18, masses found: 509.1 (compound–H⁺).

Conjugation of Compound 3Ab with GSH

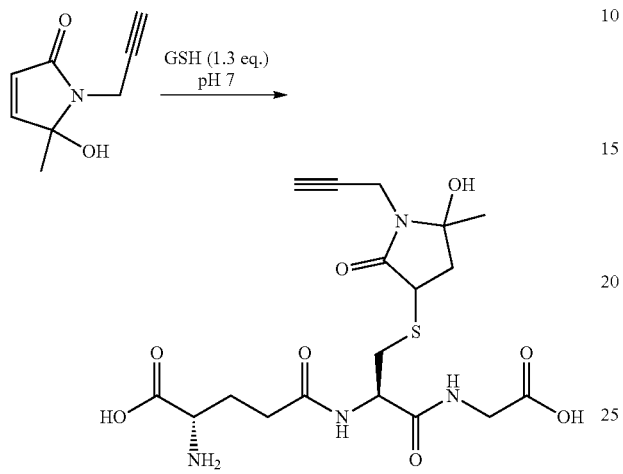

The reaction was accomplished according to the general experimental procedure described above, utilizing the lactam 3ab (0.013 µmol, 2 mg) and GSH (0.017 µmol, 5 mg) in 1 M phosphate buffer of pH 7.2 (1.0 mL). Reaction progress was monitored by HPLC (data not shown) and formation of the desired conjugate was confirmed by LC-MS.

Calculated exact mass: 458.15, masses found: 457.0 (compound–H⁺).

Conjugation of Compound 20 with GSH

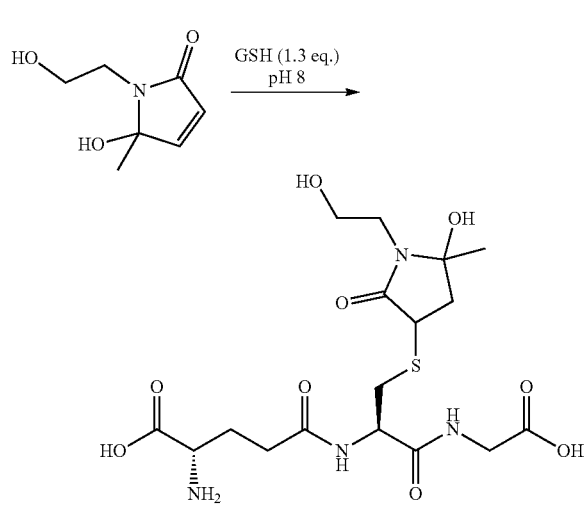

The reaction was accomplished according to the general experimental procedure described above, utilizing the lactam 20 (0.013 µmol, 2 mg) and GSH (0.017 µmol, 5 mg) in 1 M phosphate buffer of pH 8.0 (1.0 mL). Reaction progress was monitored by HPLC and formation of the desired conjugate was confirmed by LC-MS analysis which is shown below.

Calculated exact mass: 464.16, masses found: 463.0 (compound–H⁺).

General Procedure for the Conjugation to Alphabody Protein MB23

Pre-Reduction

TCEP-HCl (0.023 mg, 0.08 µmol, 2 eq.) was added to 100 µL of MB23 (c=4.6 mg/mL in 50 mM MES pH 6.0, 0.5 M NaCl) and shaken at r.t. for 60 minutes. After this time, the protein was separated from TCEP-HCl and buffer exchanged into 10 mM Tris, PH 7.4 by means of a Micro BioSpin 6 column (Bio-Rad). Reduced protein was analysed by LC-MS.

Calculated mass 11468.61, observed mass 11469.

Conjugation of Building Block 3Aa to Alphabody MB23

This example provides a synthesis route towards a compound of the invention.

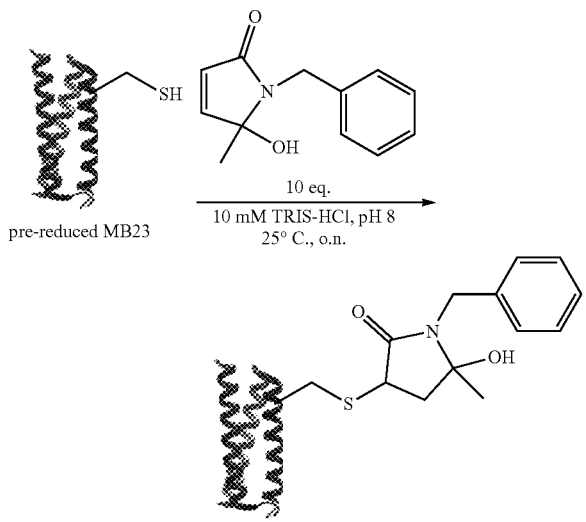

MB23 was first reduced with TCEP to remove any dimeric species formed during storage following the procedure described above. To 150.25 µL of reduced MB23 (0.25 mg, 21.8 nmol, c=1.21 mg/mL in 10 mM Tris-HCl, pH 8) was added 5HP2O building block 3aa (1.125 µL from 40 mg/mL solution in DMSO, 0.218 µmol, 10 eq.), and the reaction was allowed to shake at 25° C. overnight. Solvent was removed by speed vac and conjugated MB23 was resuspended in 250 µL H₂O (c=1 mg/mL) for LCMS analysis.

Calculated mass 11671.7, observed mass 11671.98 (conjugated protein) and 11653.66 (conjugated protein—H₂O).

Conjugation of Building Block 3Ab to Alphabody MB23

This example provides a synthesis route towards a compound of the invention.

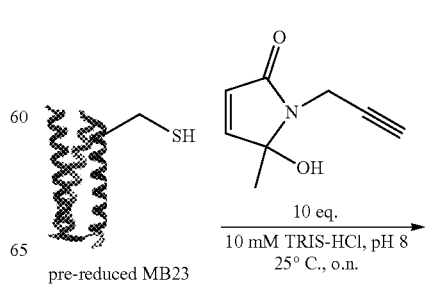

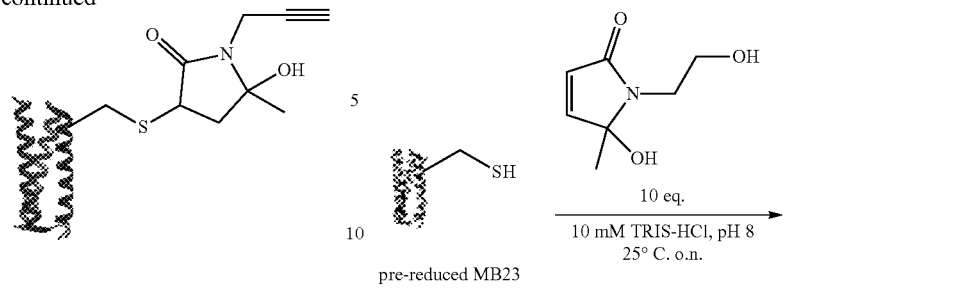

MB23 was first reduced with TCEP to remove any dimeric species formed during storage following the procedure described above. To 150.25 μL of reduced MB23 (0.25 mg, 21.8 nmol, c=1.21 mg/mL in 10 mM Tris-HCl, pH 8) was added 5HP2O building block 3ab (3.29 μl from 10 mg/mL solution in DMSO, 0.218 μmol, 10 eq.), and the reaction was allowed to shake at 25° C. overnight. Solvent was removed by speed vac and conjugated MB23 was resuspended in 250 μL H$_2$O (c=1 mg/mL) for LCMS analysis.

Calculated mass 11620, observed mass 11619.9 (conjugated protein).

Conjugation of Building Block 15 to Alphabody MB23

This example provides a synthesis route towards a compound of the invention.

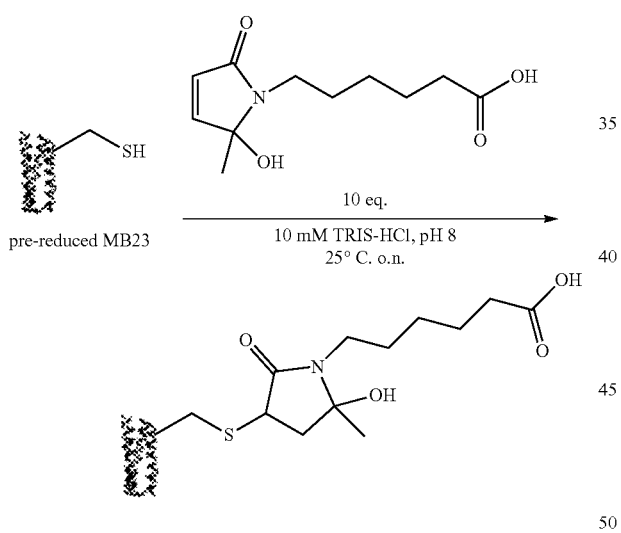

MB23 was first reduced with TCEP to remove any dimeric species formed during storage following the procedure described above. To 207.25 μL of reduced MB23 (0.25 mg, 21.8 nmol, c=1.21 mg/mL in 10 mM Tris-HCl, pH 8) was added 5HP2O building block 15 (1.666 μL from 30 mg/mL solution in DMSO, 0.218 μmol, 10 eq.), and the reaction was allowed to shake at 25° C. overnight. Solvent was removed by speed vac and conjugated MB23 was resuspended in 250 μL H$_2$O (c=1 mg/mL) and analysed by LC-MS.

Calculated mass 11696, observed mass 11696 (conjugated protein) and 11678 (conjugated protein-H$_2$O).

Conjugation of Building Block 20 to Alphabody MB23

This example provides a synthesis route towards a compound of the invention.

MB23 was first reduced with TCEP to remove any dimeric species formed during storage following the procedure described above. To 150.25 μL of reduced MB23 (0.25 mg, 21.8 nmol, c=1.21 mg/mL in 10 mM Tris-HCl, pH 8) was added 5HP2O building block 6 (4.28 μl from 8 mg/mL solution in 10% DMSO/H$_2$O, 0.218 μmol, 10 eq.), and the reaction was allowed to shake at 25° C. overnight. After this time, the protein was separated from excess 5HP2O reagent by a MicroSpin 6 column from BioRad. Protein conjugate was analysed by LC-MS.

Calculated mass 11625, observed mass 11625 (conjugated protein), 11607 (conjugated protein—H$_2$O) and 11589 (conjugated protein—2×H$_2$O).

Procedure for the Conjugation to Bovine Serum Albumin (BSA)

This example provides a synthesis route towards a compound of the invention.

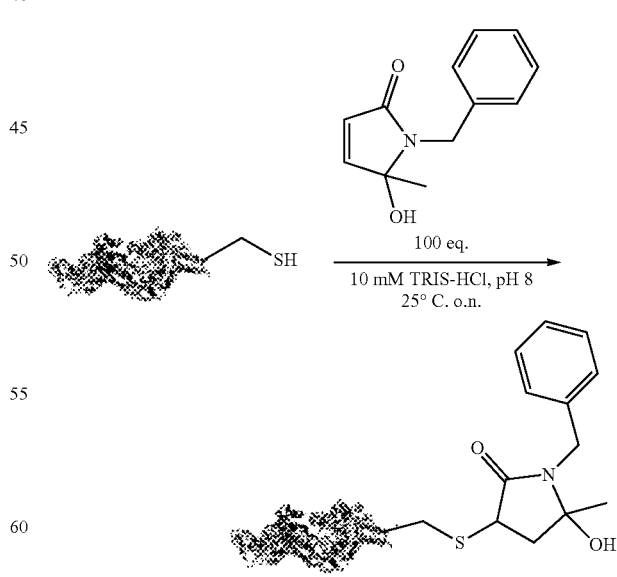

To 207 μL of BSA (0.25 mg, 3.75 nmol, 1.21 mg/mL in 10 mM TRIS-HCl pH 8) was added 3.8 μL of 5HP2O building block 3aa (0,152 mg, c=40 mg/mL solution in DMSO, 0.75 μmol) and the reaction was allowed to shake overnight at 35° C. After conjugation, the protein was separated from excess 5HP2O building block by a MicroSpin 6 column from BioRad and analysed by LC-MS.

Calculated mass 66420, observed mass 66606 (conjugated protein—H₂O)

Procedure for the Conjugation to Reduced Trastuzumab Antibody

Pre-Reduction

Figure 4A:
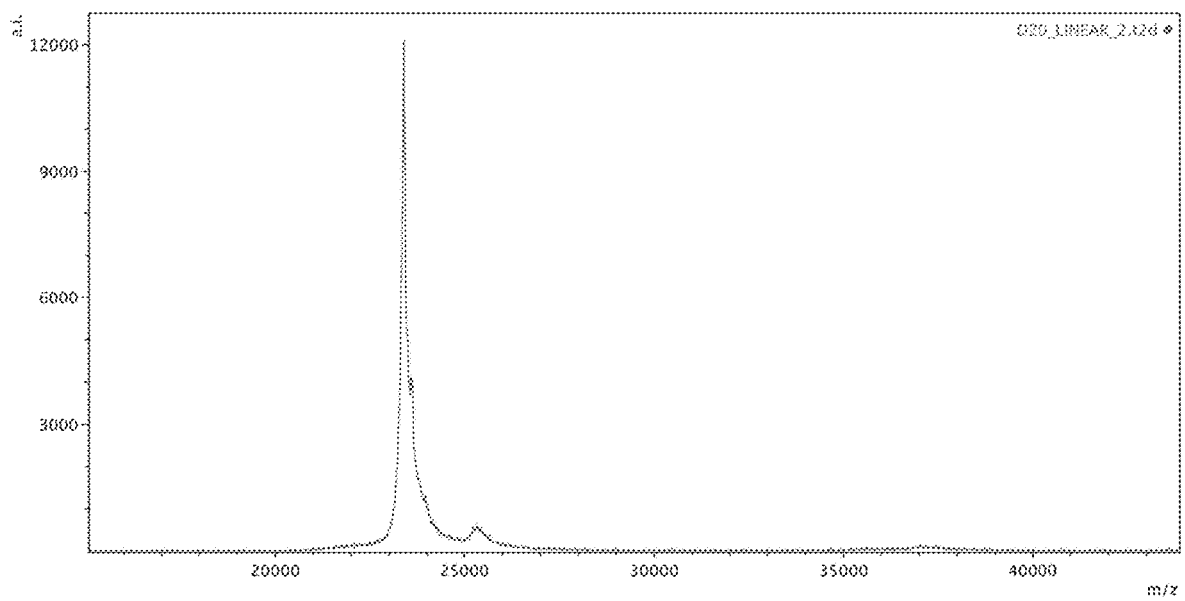
FIG. 4A: Shows the associated spectrum of reduced Trastuzumab (light chain only) which was analysed by MALDI-TOF.

TCEP-HCl (0.0008 mg, 0.0028 µmol, 10 eq.) was added to 80 µL of Trastuzumab (c=0.5 mg/mL in 11.9 mM PBS buffer at pH 8, 137 mM NaCl, 2.7 mM KCl) and shaken at 37° C. for 3 hours. After this time, the protein was separated from TCEP-HCl and buffer exchanged into 10 mM Tris, pH 7.4 by means of a Micro BioSpin 6 column (Bio-Rad). Reduced Trastuzumab was analysed by MALDI-TOF (FIG. 4A).

Conjugation of Building Block 3Aa to Light Chain of Trastuzumab Antibody

Figure 4B:
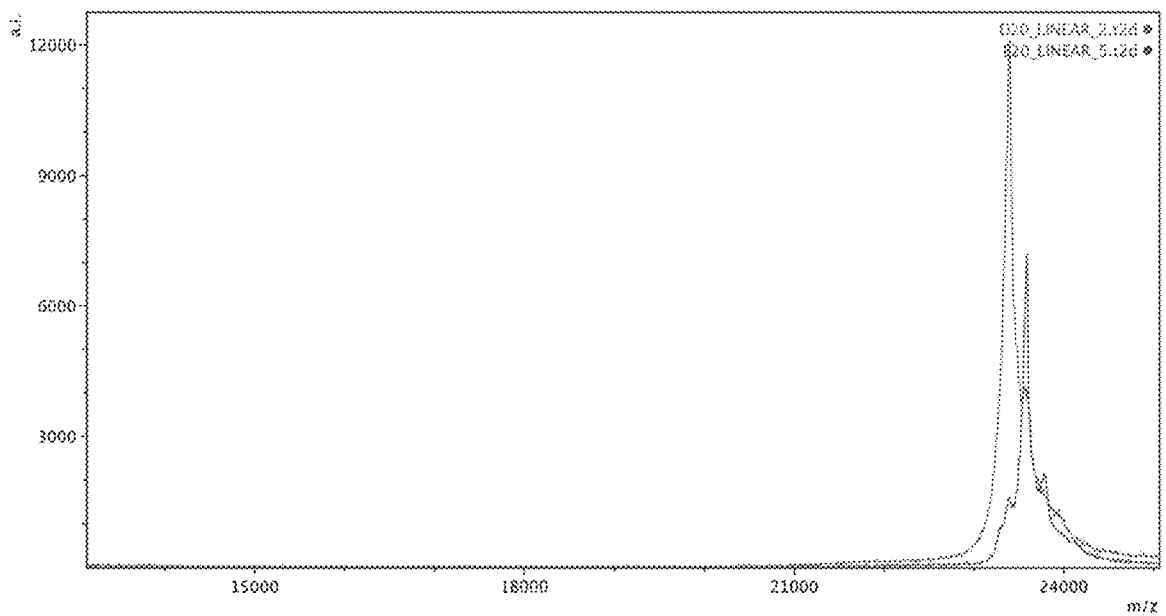
FIG. 4B: Shows the associated spectrum together with the non-conjugated light-chain of Trastuzumab as separated from excess 5HP$_2$O building block by a MicroSpin 6 column from BioRad and analysed by MALDI-TOF.

Trastuzumab was first reduced with TCEP following the procedure described above. To 80 µL of reduced Trastuzumab (0.04 mg, 0.28 nmol, c=0.5 mg/ml in 10 mM Tris-HCl, pH 7.4) was added 5HP2O building block 3aa (0.142 µL from 40 mg/mL solution in DMSO, 0.028 µmol, 100 eq.), and the reaction was allowed to shake at 37° C. overnight. After conjugation, the Trastuzumab was separated from excess 5HP2O building block by a MicroSpin 6 column from BioRad and analysed by MALDI-TOF. The associated spectrum is shown below together with non-conjugated light-chain. The observed difference corresponds to the mass of a building block of the invention (FIG. 4B).

Conjugation of Building Block 20 to Light Chain of Trastuzumab Antibody

Trastuzumab was first reduced with TCEP following the procedure described above. To 110 µL of reduced Trastuzumab (0.11 mg, 0.76 nmol, c=1 mg/ml in 10 mM Tris-HCl, pH 7.4) was added 5HP2O building block 20 (1.32 µL from 9 mg/mL solution in 10% DMSO/H₂O, 0.076 µmol, 100 eq.), and the reaction was allowed to shake at 37° C. overnight. After conjugation, the Trastuzumab was separated from excess 5HP2O building block by a MicroSpin 6 column from BioRad and analysed by MALDI-TOF (data not shown).

Example 12: Example: Stability Studies

Stability Studies of the 5-hydroxy-1H-pyrrol-2(5H)-one Building Blocks of Type 3

This example provides stability tests of compounds of the present invention.

Figure 5:
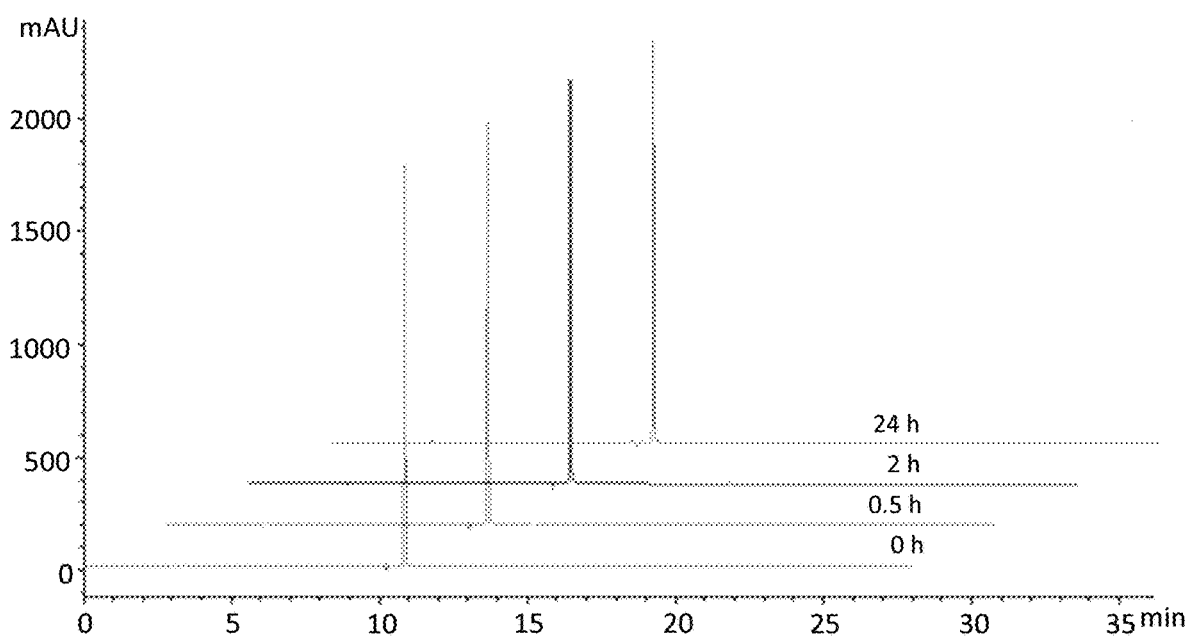
FIG. 5: Representative HPLC-based hydrolytic stability analysis of compound 20 for one buffer.

Compound 20 was dissolved at a 6.75 mM concentration using the following buffers: A) MES (pH=6.0; 0.1 M), B) sodium phosphate buffer (pH=7.0; 0.1 M), C) sodium borate buffer (pH=8.0; 0.1 M) incubated at 37° C. and shacked in dark for 24 h. The stability was checked using RP-HPLC [Phenomenex Luna C18 column using a flow rate of 1 mL/min; H₂O method: 3 minutes column flushing with 100% H₂O, then a gradient from 0 to 100% ACN in 20 minutes, followed by 5 minutes of flushing with 100% ACN]. Representative HPLC chromatogram is shown for one buffer (FIG. 5).

Stability Studies of the 5-hydroxy-4-((2-hydroxyethyl)thio)-pyrrolidin-2-ones of Type 4

This example provides stability tests of compounds of the present invention.

Figure 6:
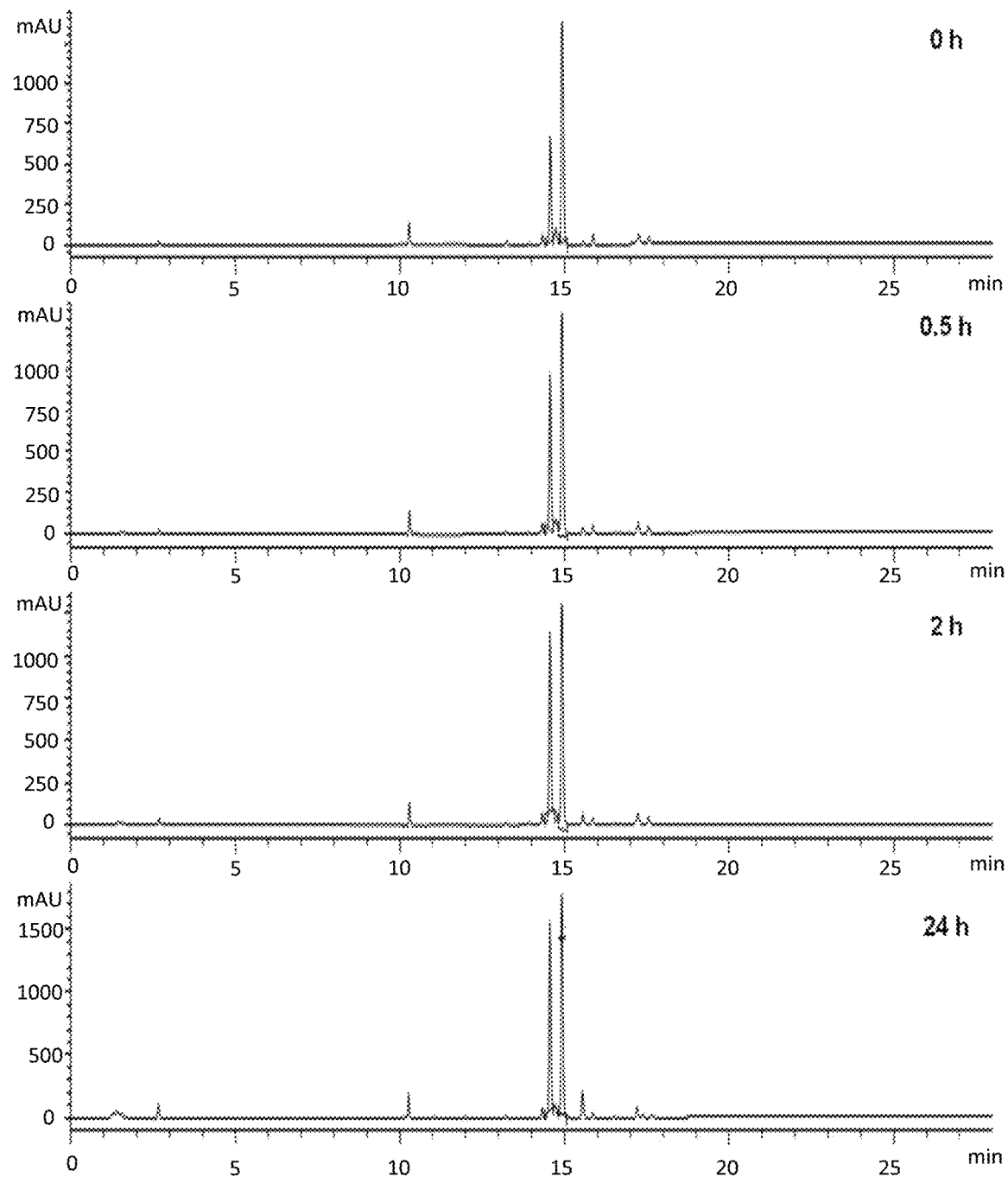
FIG. 6: Representative HPLC-based hydrolytic stability analysis of compound 4aa for one buffer.

Compound 4aa was dissolved at a 2 mM concentration using the following buffers: A) MES (pH=6.0; 0.1 M), B) sodium phosphate buffer (pH=7.0; 0.1 M), C) sodium borate buffer (pH=8.0; 0.1 M) incubated at 37° C. and shaked in dark for 24 h. The stability was checked using RP-HPLC [Phenomenex Luna C18 column using a flow rate of 1 mL/min; H₂O method: 3 minutes column flushing with 100% H₂O, then a gradient from 0 to 100% ACN in 20 minutes, followed by 5 minutes of flushing with 100% ACN]. Representative HPLC chromatogram is shown for one buffer (FIG. 6).

Glutathione Exchange Experiment

This example provides a stability experiment of the compound of the invention towards competing sulfhydryl groups.

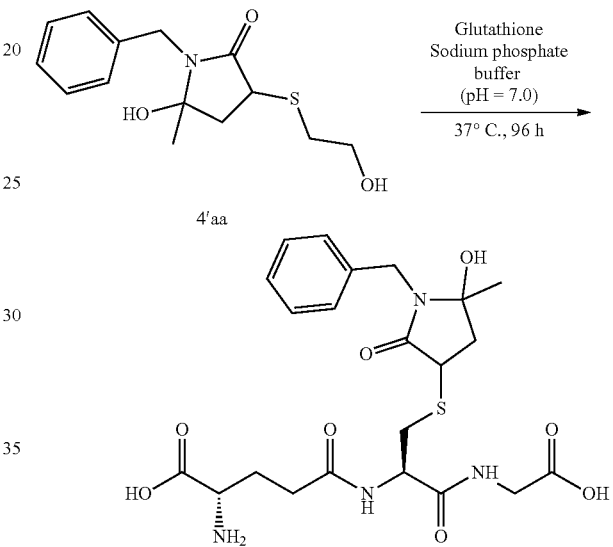

Figure 7:
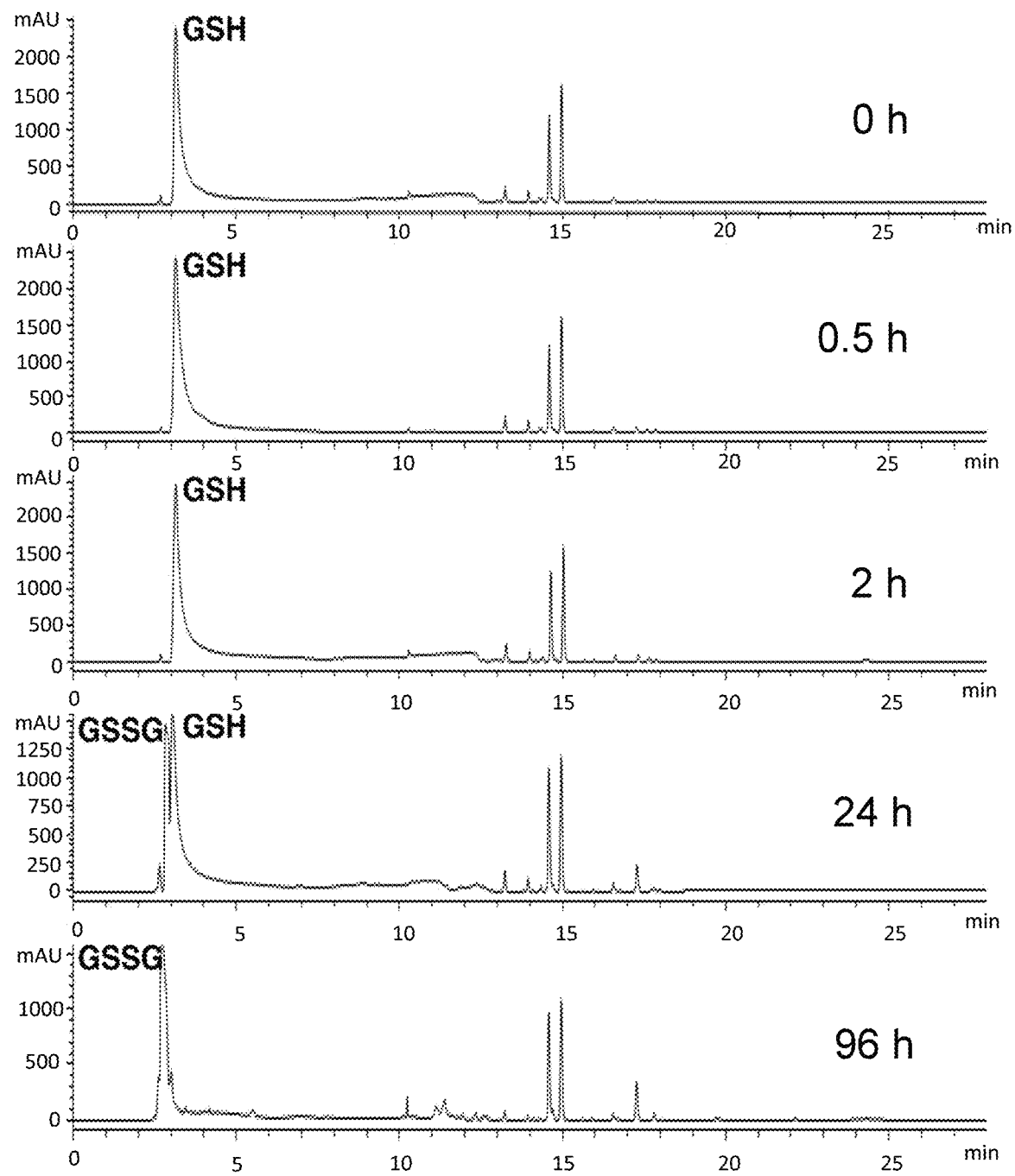
FIG. 7: Representative HPLC-based thiol exchange stability analysis of compound 4aa for one buffer.

Compound 4aa was incubated in a 0.1 M sodium phosphate buffer at pH 7 with 10 equiv of glutathione, incubated at 37° C. and shaken for 96 hours. The stability was checked using RP-HPLC [Phenomenex Luna C18 column using a flow rate of 1 mL/min; H₂O method: 3 minutes column flushing with 100% H₂O, then a gradient from 0 to 100% ACN in 20 minutes, followed by 5 minutes of flushing with 100% ACN]. From the analysis of the reaction mixture we conclude that no GSH exchange reaction takes place and the original conjugated compound 4'aa is stable. Representative HPLC chromatogram is shown (FIG. 7).

Stability of Alphabody Protein Conjugate

This example provides a stability experiment of the compound of the invention.

Alphabody conjugate was dissolved in a 10 mM TRIS buffer at pH 7, 8 and 9, and shaken at room temperature for 6 days. The stability was checked using LC-MS.

Calculated mass 11671, observed mass 11671 (conjugated protein), 11653 (conjugated protein—H₂O) and 11636 (conjugated protein—2×H₂O).

Glutathione Exchange Experiment on Alphabody Protein Conjugate

This example provides a stability experiment of the compound of the invention towards competing sulfhydryl groups.

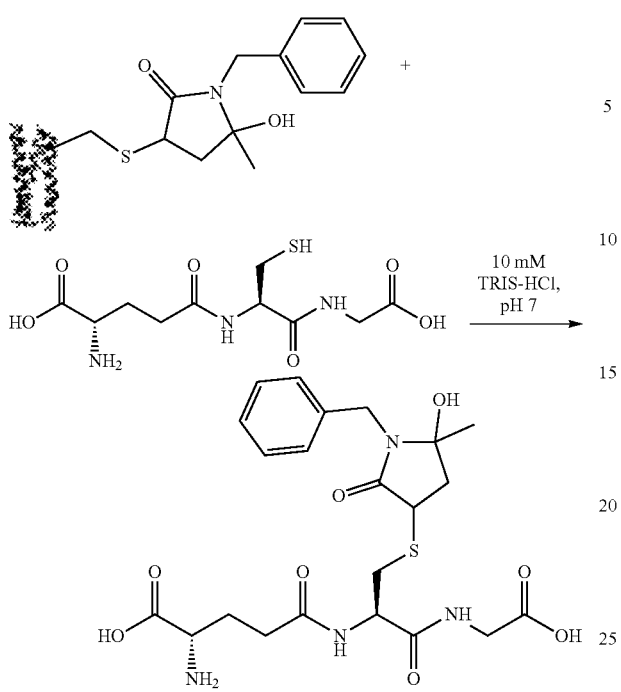

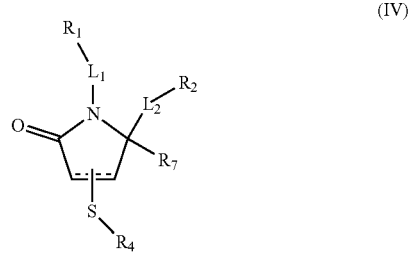

Figure 8:
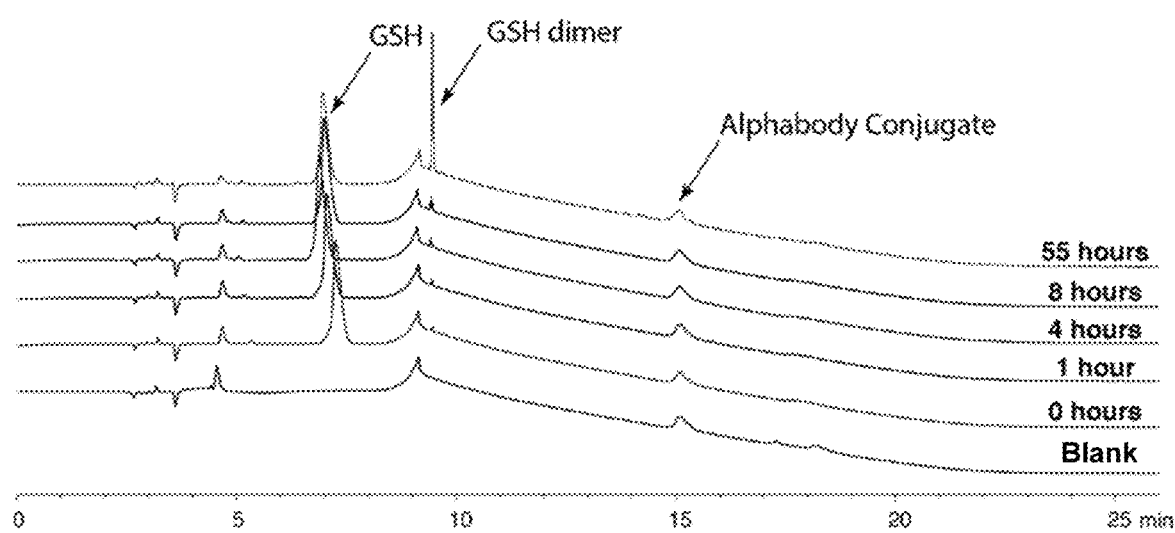
FIG. 8: Representative HPLC-based stability analysis of alphabody-protein conjugate.

Alphabody conjugate was incubated in a 10 mM TRIS buffer at pH 7.4 with 100 equiv of glutathione, incubated at 35° C. and shaken for 5 days. The stability was checked using RP-HPLC [Phenomenex Luna C18 column using a flow rate of 1 mL/min; H$_2$O method: 3 minutes column flushing with 100% H$_2$O, then a gradient from 0 to 100% ACN in 20 minutes, followed by 5 minutes of flushing with 100% ACN] (FIG. 8).

The invention claimed is:

1. A compound according to formula (IV):

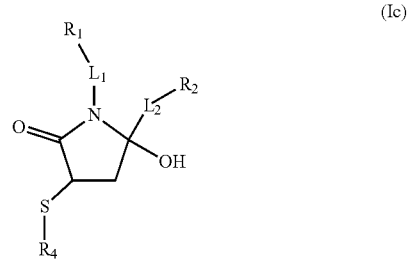

(IV)

where:
L$_1$ is a C$_1$-C$_{20}$ alkyl;
L$_2$ is absent;
R$_1$ represents any carbon-containing moiety selected from the group consisting of small molecules, carboxylic acids, esters, ethers, amides, maleimides, alkynes, azides, tetrazines, dienes, small heterocycles, alkoxyamines, aromatics, polyaromatics, and saturated or unsaturated alkyl chains;
R$_2$ represents a saturated or unsaturated C$_1$-C$_{20}$ alkyl;
R$_4$ is selected from the group consisting of small molecules, biomolecules, and macromolecules; and
R$_7$ is —OH.

2. The compound of claim 1, wherein the biomolecule is selected from the group consisting of peptides, oligonucleotides, proteins, dyes, drugs, small molecules, metal complexes, fatty acids, nucleic acids, carbohydrates, biotins, PEG, synthetic polymers, and natural polymers.

3. The compound of claim 1, wherein the macromolecule is selected from the group consisting of oligonucleotides, proteins, dyes, drugs, metal complexes, fatty acids, nucleic acids, carbohydrates, synthetic polymers, and natural polymers.

4. A pharmaceutical composition comprising the compound of claim 1 and one or more pharmaceutically acceptable excipients, carriers, or diluents.

5. The compound of claim 1, wherein the compound according to formula (IV) is represented by formula (Ic):

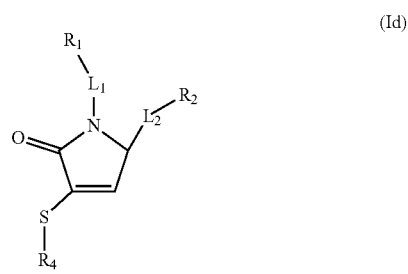

(Ic)

where L$_1$, L$_2$, R$_1$, R$_2$, and R$_4$ are as defined in formula (IV).

6. A pharmaceutical composition comprising the compound of claim 5 and one or more pharmaceutically acceptable excipients, carriers, or diluents.

7. The compound of claim 1, wherein the compound according to formula (IV) is represented by formula (Id):

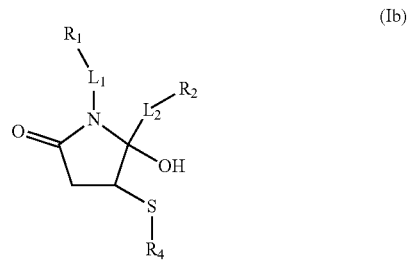

(Id)

where L$_1$, L$_2$, R$_1$, R$_2$, and R$_4$ are as defined in formula (IV).

8. A pharmaceutical composition comprising the compound of claim 7 and one or more pharmaceutically acceptable excipients, carriers, or diluents.

9. The compound of claim 1, wherein the compound according to formula (IV) is represented by formula (Ib):

(Ib)

where $L_1$, $L_2$, $R_1$, $R_2$, and $R_4$ are as defined in formula (IV).

10. A pharmaceutical composition comprising the compound of claim 9 and one or more pharmaceutically acceptable excipients, carriers, or diluents.

11. A method for preparing the compound of claim 5, the method comprising: reacting a compound of formula (II):

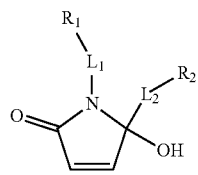

(II)

in which $L_1$, $L_2$, $R_1$, and $R_2$ are as defined in formula (Ic), with HS—$R_4$, in which $R_4$ is as defined in formula (Ic), in an organic or aqueous solvent in the presence of a catalytic amount of EDTA-Na$_4$, or in an aqueous solution without a catalyst, to obtain the compound of formula (Ic).

12. A method for preparing the compound of claim 7, the method comprising: subjecting a compound of formula (Ic):

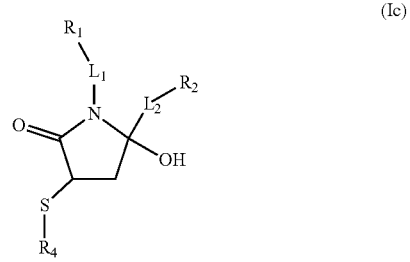

(Ic)

in which $L_1$, $L_2$, $R_1$, $R_2$, and $R_4$ are as defined in formula (Id), to an acid treatment or a temperature increase to obtain the compound of formula (Id).

* * * * *